United States Patent
Zheng et al.

(10) Patent No.: US 12,534,740 B2
(45) Date of Patent: Jan. 27, 2026

(54) METHODS AND COMPOSITIONS FOR SELECTIVE GENERATION OF DOPAMINERGIC PRECURSORS

(71) Applicants: Tongji University, Shanghai (CN); Board of Regents of the University of Nebraska, Lincoln, NE (US)

(72) Inventors: Jialin Zheng, Shanghai (CN); Changhai Tian, Omaha, NE (US)

(73) Assignees: Tongji University, Shanghai (CN); Board of Regents of the University of Nebraska, Lincoln, NE (US)

( * ) Notice: Subject to any disclaimer, the term of this patent is extended or adjusted under 35 U.S.C. 154(b) by 1047 days.

(21) Appl. No.: 17/578,059

(22) Filed: Jan. 18, 2022

(65) Prior Publication Data

US 2022/0213502 A1 Jul. 7, 2022

Related U.S. Application Data

(62) Division of application No. 15/503,649, filed as application No. PCT/CN2015/087503 on Aug. 19, 2015, now Pat. No. 11,261,461.

(60) Provisional application No. 62/038,914, filed on Aug. 19, 2014.

(51) Int. Cl.
*C12N 15/86* (2006.01)
*A61K 35/12* (2015.01)
*C12N 5/0793* (2010.01)

(52) U.S. Cl.
CPC .............. *C12N 15/86* (2013.01); *A61K 35/12* (2013.01); *C12N 5/0619* (2013.01); *C12N 2501/60* (2013.01); *C12N 2510/00* (2013.01)

(58) Field of Classification Search
CPC .. C12N 15/86; C12N 5/0619; C12N 2501/60; C12N 2510/00; A61K 35/12
See application file for complete search history.

(56) References Cited

PUBLICATIONS

Sheng, Chao. Direct Conversion of Mouse Somatic Cells into Multipotent Neural Stem/Progenitor Cells and Mature Dopaminergic Neurons by Defined Factors. Chinese Doctoral Dissertations Fulltext Database Med and Health Sci, Mar. 15, 2013. (Year: 2013).*
Tian, C., Li, Y., Huang, Y., Wang, Y., Chen, D., Liu, J., Deng, X., Sun, L., Anderson, K., Qi, X. and Li, Y., 2015. Selective generation of dopaminergic precursors from mouse fibroblasts by direct lineage conversion. Scientific reports, 5(1), p. 12622. (Year: 2015).*

* cited by examiner

*Primary Examiner* — Fereydoun G Sajjadi
*Assistant Examiner* — Masudur Rahman
(74) *Attorney, Agent, or Firm* — Weisun Rao; Lili Huang; Venture Partner, LLC

(57) ABSTRACT

The present invention provides methods of transdifferentiating a somatic cell, e.g., a fibroblast, to an induced dopaminergic precursor cell (iDP) in vitro. The methods include ectopically expressing genes of (1) one or both of Brn2 and Brn4, or a variant thereof, (2) Sox2, or a variant thereof, and (3) one or both of Foxa2 and Lmx1a, or a variant thereof, in the somatic cell, and methods for treating a neurodegenerative disease, such as Parkinson's disease, with the iDP.

9 Claims, 19 Drawing Sheets

Specification includes a Sequence Listing.

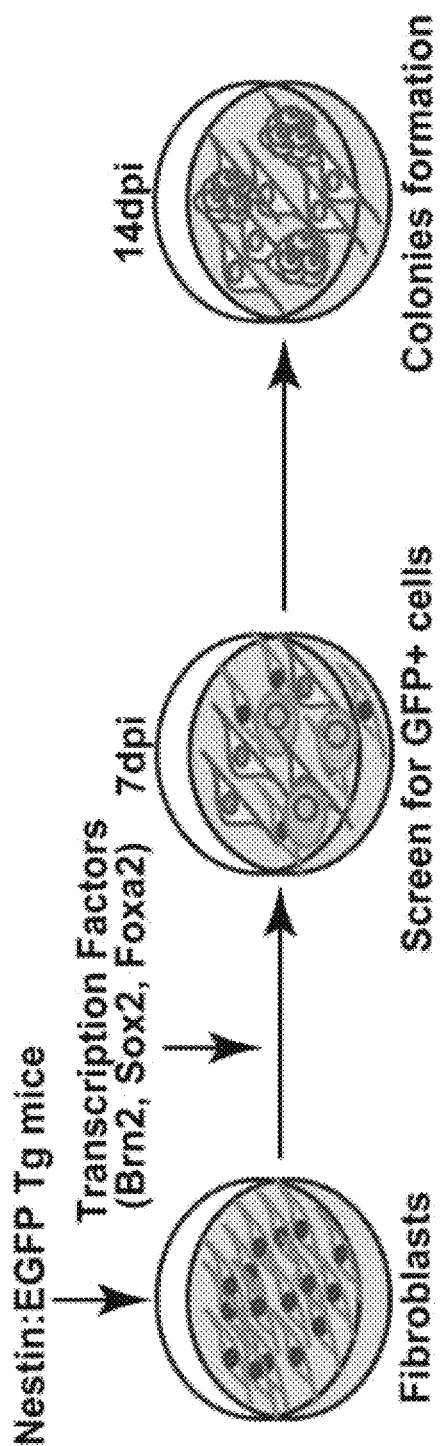
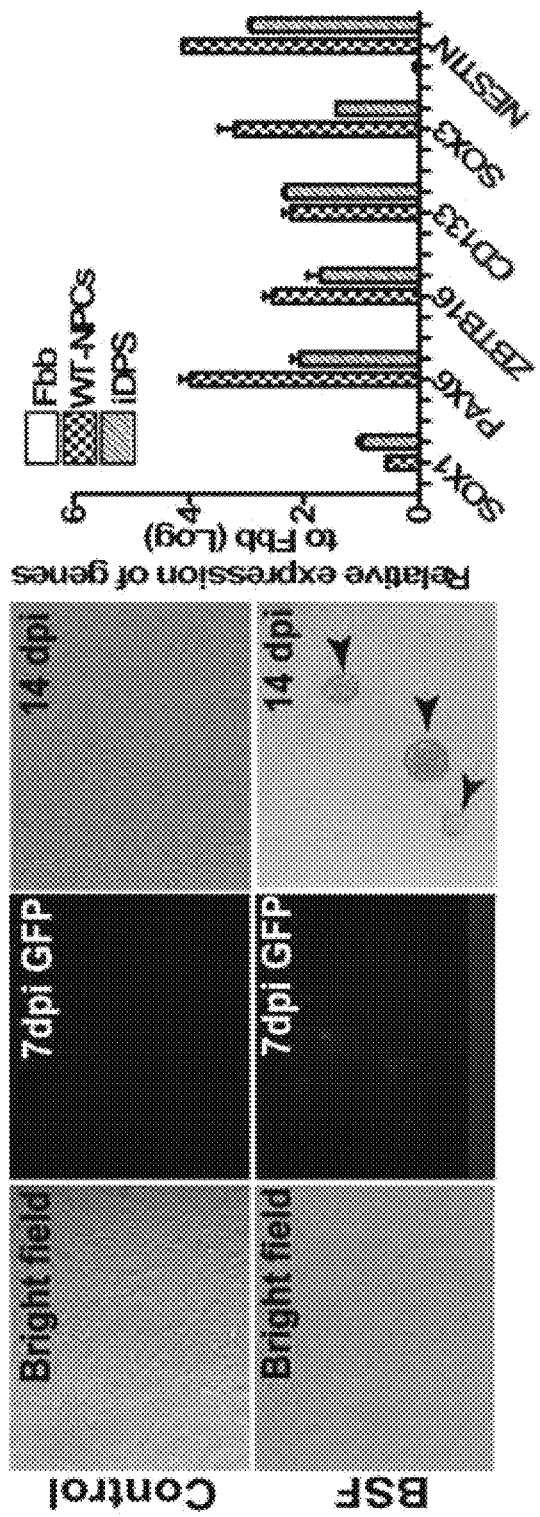
Fig. 1A
Fig. 1B
Fig. 1C

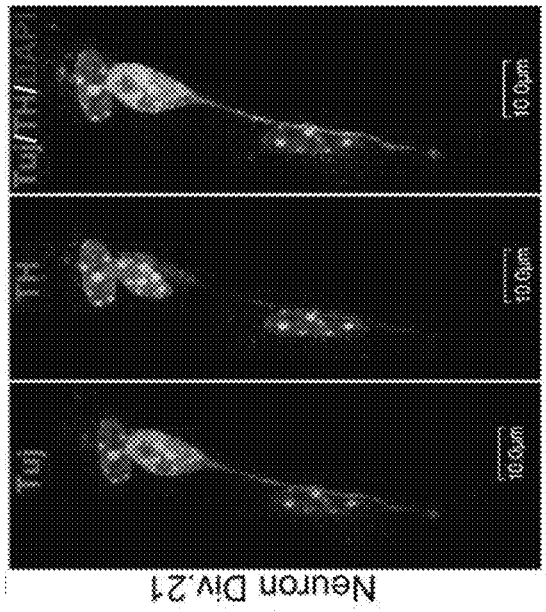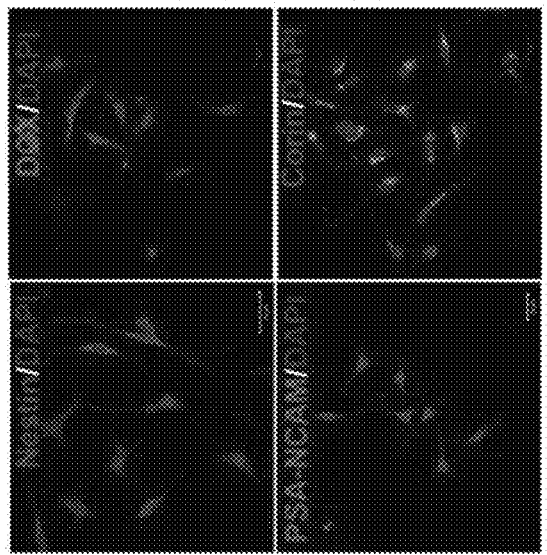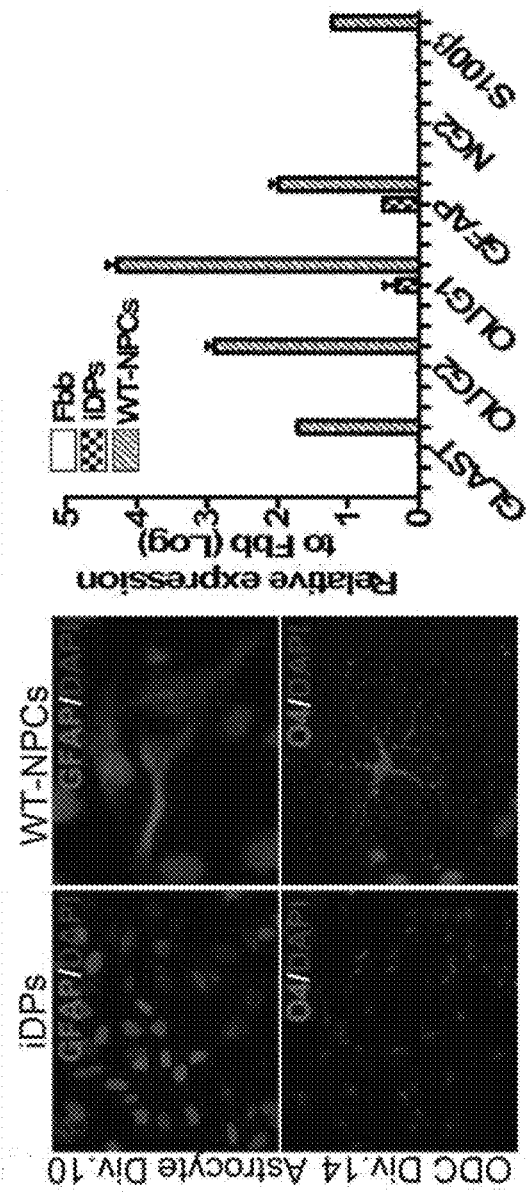
Fig. 2A
Fig. 2B
Fig. 2C
Fig. 2D

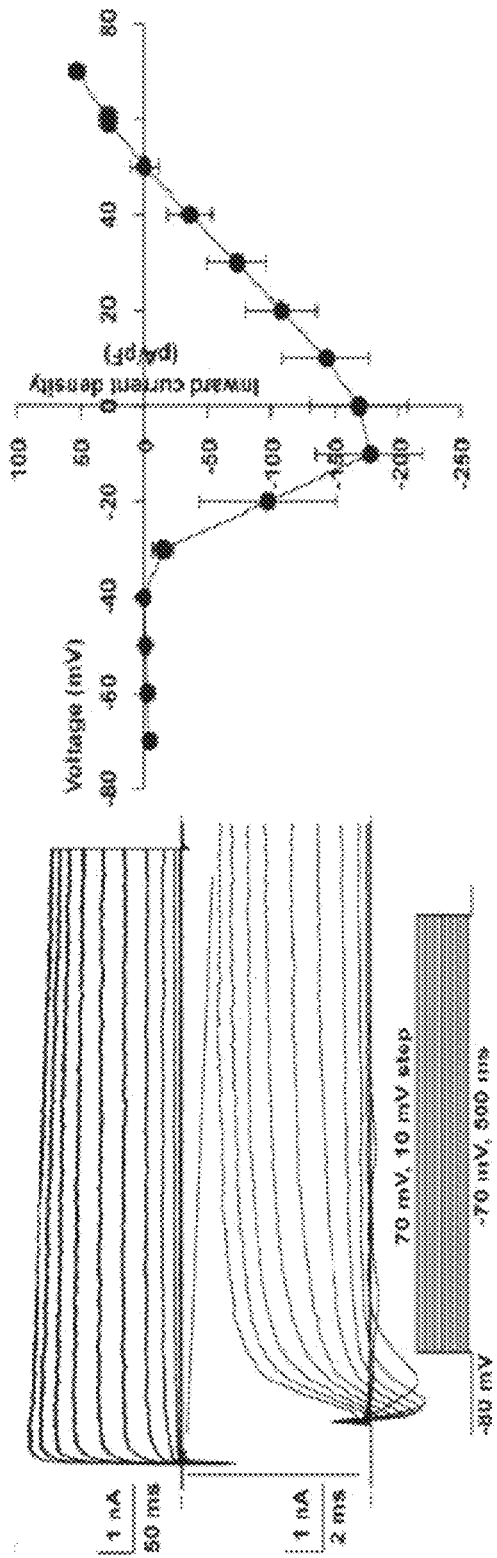
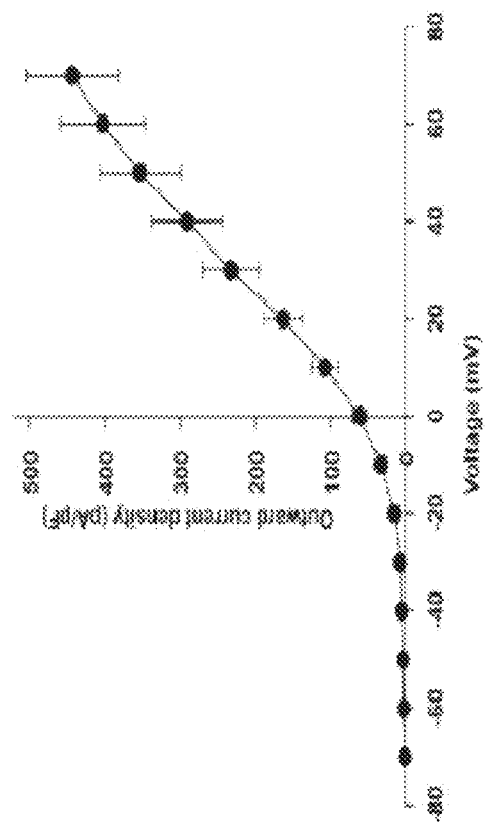
Fig. 4B
Fig. 4C
Fig. 4D

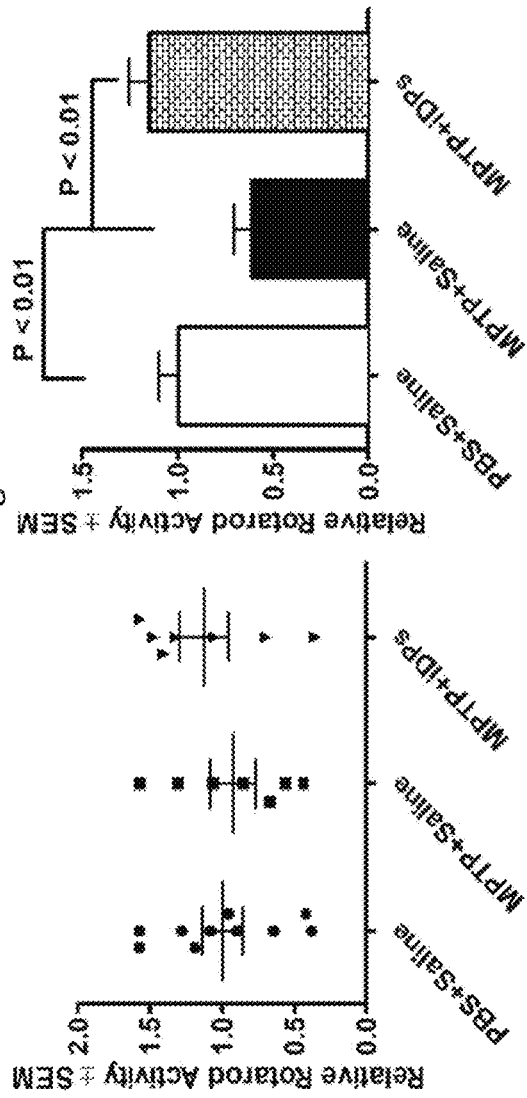
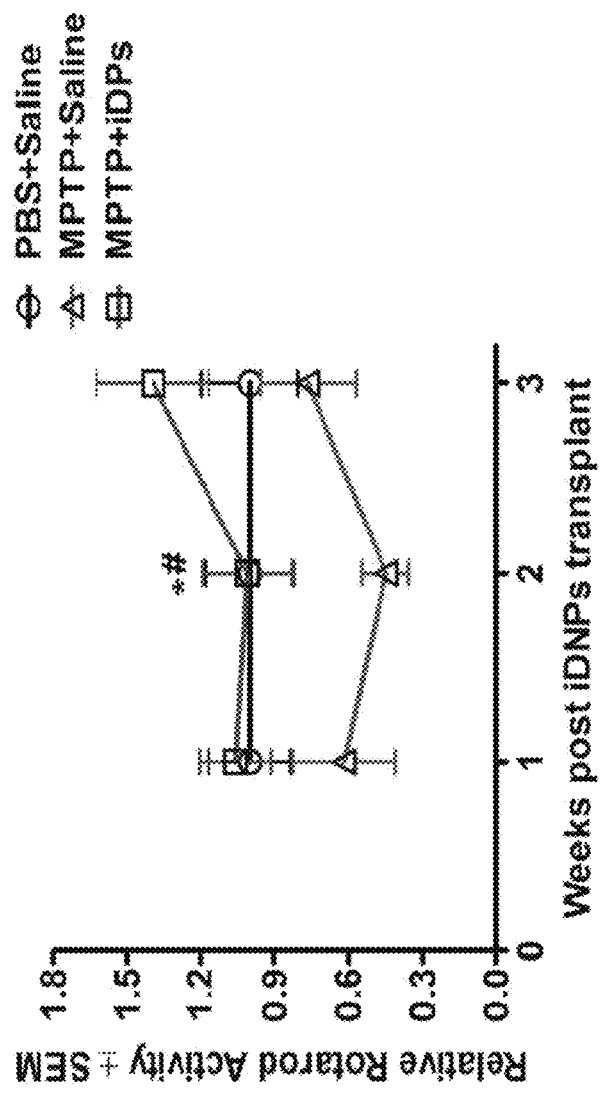
Fig. 7A
Fig. 7B
Fig. 7C

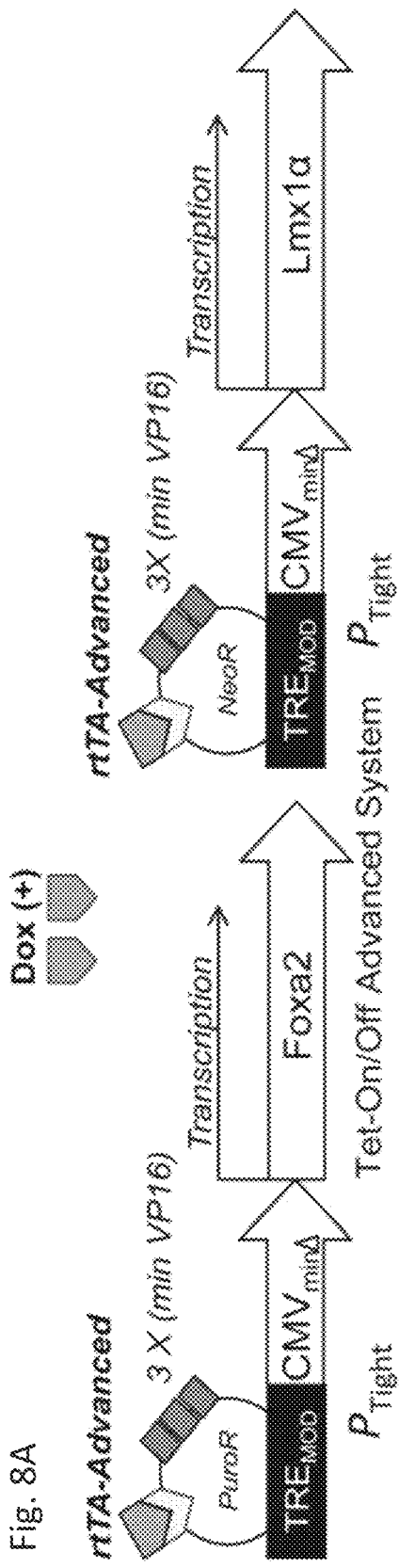
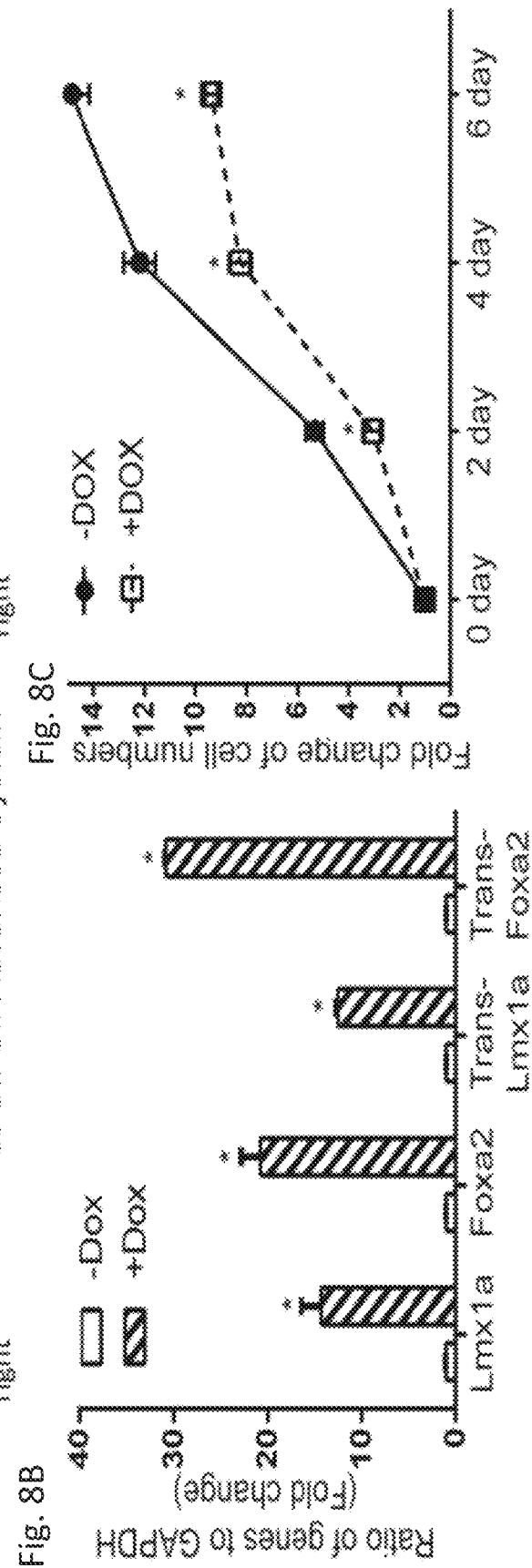

SEQUENCE LISTING

<160> NUMBER OF SEQ ID NOS: 74

<210> SEQ ID NO 1
<211> LENGTH: 1338
<212> TYPE: DNA
<213> ORGANISM: Mus musculus

<400> SEQUENCE: 1

```
atggcgaccg cagcgtctaa ccactacagc ctgctcacct ccagcgcctc catcgtacat      60
gccgagccgc ctggcggcat gcagcagggc gcaggggget accgcgaggc gcagagcctg     120
gtgcagggcg actacggcgc gctgcagagc aacgggcacc cgctcagcca cgctcaccag     180
tggatcaccg cgctgtccca cggcggcggc ggcggggggcg gcggcggcgg tggaggaggc     240
gggggaggcg gcggggagg cggcgacggc tccccgtggt ccaccagccc cctaggccag     300
ccggacatca agccctcggt ggtggtacag cagggtggcc gaggcgacga gctgcacggg     360
ccaggagcgc tgcagcaaca gcatcaacag caacagcaac agcagcagca gcagcagcag     420
cagcagcagc agcaacagca gcagcaacaa cagcgaccgc cacatctggt gcaccacgct     480
gccaaccacc atcccgggcc cggggcatgg cggagtgcgg cggctgcagc tcacctccct     540
ccctccatgg gagcttccaa cggcggtttg ctctattcgc agccgagctt cacggtgaac     600
ggcatgctgg gcgcaggagg gcagccggct gggctgcacc accacggcct gagggacgcc     660
cacgatgagc cacaccatgc agaccaccac ccgcatccgc actctcaccc acaccagcaa     720 ccgccccgc cacctccccc acaaggccca ccgggccacc caggcgcgca ccacgacccg     780
cactcggacg aggacacgcc gacctcagac gacctggagc agttcgccaa gcaattcaag     840
cagaggcgga tcaaactcgg atttactcaa gcagacgtgg ggctggcgct tggcaccctg     900
tacggcaacg tgttctcgca gaccaccatc tgcaggtttg aggccctgca gctgagcttc     960
aagaacatgt gcaagctgaa gcctttgttg aacaagtggt tggaagaggc agactcatcc    1020
tcgggcagcc ccaccagcat agacaagatc gcagcgcaag ggcgcaaacg gaaaaagcgg    1080
acctccatcg aggtgagcgt caaggggggt ctggagagcc atttcctcaa atgccctaag    1140
ccctcggccc aggagatcac ctccctcgcg gacagcttac agctggagaa ggaggtggtg    1200
agagtttggt tttgtaacag gagacagaaa gagaaaagga tgacccctcc cggagggact    1260
ctgccgggcg ccgaggatgt gtatgggggt agtagggaca cgccaccaca ccacgggtg    1320 cagacgcccg tccagtga                                                 1338
```

<210> SEQ ID NO 2
<211> LENGTH: 1086
<212> TYPE: DNA
<213> ORGANISM: Mus musculus

<400> SEQUENCE: 2

```
atggccacag ctgcctcgaa tccctacagc attctcagtt ccagctccct tgtccatgcg      60
gactccgcgg gcatgcagca gggaagtcct ttccgcaatc ctcagaaact tctccaaagt     120
gactacttgc agggagttcc cagcaatggg catcccctcg gcatcactg ggtgaccagt      180
cttagcgacg ggggcccgtg gtcctccaca ttggccacca gcccctgga ccagcaagac      240
gtgaagccgg gacgcgaaga tctgcaactg ggcgcaatca tccatcaccg ctcgccgcac     300
gtagcccacc actcgccgca cactaaccat ccgaacgcct ggggagcgag ccctgctcca     360
aactcgtcca tcacgtccag cggccaaccc ctcaatgtgt actcgcagcc aggcttcacc     420
gtgagcggta tgctggagca gggggactc actccaccac cagctgctgc ctccacacag      480
agcctgcatc cagtgctccg ggagcctcca gaccatggtg agctgggctc gcaccactgc     540
caggaccact ctgatgaaga gactccaacc tctgatgagt tggaacagtt cgccaaacaa     600
ttcaaacaaa gaagaatcaa gttgggcttc acgcaagccg acgtggggct ggcactgggc     660
acactgtatg gcaacgtgtt ctcgcagact accatctgca ggttcgaggc cttacaactg     720
agcttcaaga acatgtgcaa gctgaaaccg ctattaaata gtggctgga ggaggctgat      780
tcatccacag gaagcccgac cagcattgac aagatcgctg ctcaaggccg caaacgcaag     840
aagcgaacct ccatcgaggt gagtgtcaag ggcgtactgg aaacacattt cctcaagtgt     900
cccaagcctg cagcgcagga gatctcctcg ctggcagaca gtctccagtt ggagaaagaa     960
gtggtgcgtg tctggttctg taatagaaga caaaagaaa aagaatgac tccgccaggg     1020
gatcagcagc cacacgaggt ttattcgcac acggtgaaaa cagacgcgtc ctgccacgat    1080
ctctga                                                               1086
```

<210> SEQ ID NO 3
<211> LENGTH: 969
<212> TYPE: DNA
<213> ORGANISM: Mus musculus

<400> SEQUENCE: 3

```
atgtataaca tgatggagac ggagctgaag ccgccgggcc cgcagcaagc ttcgggggc      60
ggcggcggag gaggcaacgc cacggcggcg gcgaccggcg gcaaccagaa gaacagcccg     120
gaccgcgtca agaggcccat gaacgccttc atggtatggt cccggggggca gcggcgtaag     180
atggcccagg agaaccccaa gatgcacaac tcggagatca gcaagcgcct gggcgcggag     240
tggaaacttt tgtccgagac cgagaagcgg ccgttcatcg acgaggccaa gcggctgcgc     300
gctctgcaca tgaaggagca cccggattat aaataccggc cgcggcggaa aaccaagacg     360
ctcatgaaga aggataagta cacgcttccc ggaggcttgc tggcccccgg cgggaacagc     420
atggcgagcg gggttggggt gggcgccggc ctgggtgcgg gcgtgaacca gcgcatggac     480
agctacgcgc acatgaacgg ctggagcaac ggcagctaca gcatgatgca ggagcagctg     540
ggctaccccg agcacccggg cctcaacgct cacggcgcgg cacagatgca accgatgcac     600
cgctacgacg tcagcgccct gcagtacaac tccatgacca gctcgcagac ctacatgaac     660
ggctcgccca cctacagcat gtcctactcg cagcagggca cccccggtat ggcgctgggc     720
tccatgggct ctgtggtcaa gtccgaggcc agctccagcc ccccgtggt tacctcttcc     780
tcccactcca gggcgccctg ccaggccggg gacctccggg acatgatcag catgtacctc    840
cccgcgccca agtgccgga gccgctgcg cccagtagac tgcacatggc ccagcactac     900
cagagcggcc cggtgcccgg cacggccatt aacggcacac tgcccctgtc gcacatgtga    960
``` gggctggac 969

<210> SEQ ID NO 4
<211> LENGTH: 1398
<212> TYPE: DNA
<213> ORGANISM: Mus musculus

<400> SEQUENCE: 4

| | | | | | |
|---|---|---|---|---|---|
| atgcactcgg | cttccagtat | gctgggagcc | gtgaagatgg | aagggcacga | gccatccgac | 60 |
| tggagcagct | actacgcgga | gcccgagggc | tactcttccg | tgagcaacat | gaacgccggc | 120 |
| ctggggatga | atggcatgaa | cacatacatg | agcatgtccg | cggctgccat | gggcggcggt | 180 |
| tccggcaaca | tgagcgcggg | ctccatgaac | atgtcatcct | atgtgggcgc | tggaatgagc | 240 |
| ccgtcgctag | ctggcatgtc | cccgggcgcc | ggcgccatgg | cgggcatgag | cggctcagcc | 300 |
| ggggcggccg | gcgtggcggg | catgggacct | cacctgagtc | cgagtctgag | cccgctcggg | 360 |
| ggacaggcgg | ccggggccat | gggtggcctt | gcccctacg | ccaacatgaa | ctcgatgagc | 420 |
| cccatgtacg | ggcaggccgg | cctgagccgc | gctcgggacc | caagacata | ccgacgcagc | 480 |
| tacacacacg | ccaaacctcc | ctactcgtac | atctcgctca | tcaccatggc | catccagcag | 540 |
| agccccaaca | agatgctgac | gctgagcgag | atctatcagt | ggatcatgga | cctcttccct | 600 |
| ttctaccggc | agaaccagca | gcgctggcag | aactccatcc | gccactctct | ctccttcaac | 660 |
| gactgctttc | tcaaggtgcc | ccgctcgcca | gacaagcctg | gcaagggctc | cttctggacc | 720 |
| ctgcacccag | actcgggcaa | catgttcgag | aacggctgct | acctgcgccg | ccagaagcgc | 780 |
| ttcaagtgtg | agaagcaact | ggcactgaag | gaagccgcgg | gtgcggccag | tagcggaggc | 840 |
| aagaagaccg | ctcctgggtc | ccaggcctct | caggctcagc | tcggggaggc | cgcgggctcg | 900 |
| gcctccgaga | ctccggcggg | caccgagtcc | ccccattcca | gcgcttctcc | gtgtcaggag | 960 |
| cacaagcgag | gtggcctaag | cgagctaaag | ggagcacctg | cctctgcgct | gagtcctccc | 1020 |
| gagccggcgc | cctcgcctgg | gcagcagcag | caggctgcag | cccacctgct | gggcccacct | 1080 |
| caccacccag | gcctgccacc | agaggcccac | ctgaagcccg | agcaccatta | cgccttcaac | 1140 |
| caccccttct | ctatcaacaa | cctcatgtcg | tccgagcagc | aacatcacca | cagccaccac | 1200 |
| caccatcagc | cccacaaaat | ggacctcaag | gcctacgaac | aggtcatgca | ctacccaggg | 1260 |
| ggctatggtt | cccccatgcc | aggcagcttg | gccatgggcc | cagtcacgaa | caaagcgggc | 1320 |
| ctggatgcct | cgcccctggc | tgcagacact | tcctactacc | aaggagtgta | ctccaggcct | 1380 |
| attatgaact | catcctaa | | | | | 1398 |

<210> SEQ ID NO 5
<211> LENGTH: 1153
<212> TYPE: DNA
<213> ORGANISM: Mus musculus

<400> SEQUENCE: 5

| | | | | | |
|---|---|---|---|---|---|
| atgttggacg | gcctgaagat | ggaggagaac | tttcaaagtg | cgattgagac | ctcggcatct | 60 |
| ttctcctctt | tgctgggcag | agcggtgagc | cccaagtctg | tctgcgaggg | ctgtcagcgg | 120 |
| gtcatctcgg | acaggtttct | gctgcggctc | aacgacagct | tctggcacga | gcaatgcgtg | 180 |
| cagtgtgcct | cctgcaaaga | gcccctggag | accacctgct | tctaccggga | caagaagctc | 240 |
| tactgcaagt | accactacga | gaaactgttt | gctgtcaaat | gtgggggctg | cttcgaggcc | 300 |
| attgcgccca | atgagtttgt | catgcgtgcc | cagaagagcg | tataccacct | gagctgcttc | 360 |

| | |
|---|---|
| tgctgctgcg tctgtgagcg acagctgcag aagggtgacg agtttgtcct gaaggagggc | 420 |
| cagctgctct gcaaagggga ctatgagaaa gaacggagc tgctgagcct ggtgagccct | 480 |
| gcggcctcag actcaggcaa aagcgatgat gaggagagcc tttgcaagtc agcccatggg | 540 |
| gcaggaaaag gagcatcaga ggacggcaag gaccataagc gacccaaacg tcccagaacc | 600 |
| atcctgacca ctcagcagag gagagcattc aaggcctcgt ttgaagtatc ctccaagccc | 660 |
| tgcagaaagg tgagggagac tctggctgcg gagacagggc tgagtgtccg tgtggttcag | 720 |
| gtgtggttcc agaaccagcg agccaagatg aagaagctgg cccggcgaca gcagcaacag | 780 |
| caacaggacc aacagaacac ccagaggctg acttctgctc agacaaatgg tagtgggaat | 840 |
| gcgggcatgg aagggatcat gaaccccctat acaacgttgc ccaccccaca gcagctgctg | 900 |
| gccattgaac agagcgtcta caactctgat cccttccgac agggtctcac cccaccccag | 960 |
| atgcctggag atcacatgca cccctatggt gctgaacctc ttttccatga cttggatagt | 1020 |
| gatgacacat ctctcagtaa cctgggagac tgcttcctgg caacctcaga agctgggccc | 1080 |
| ctgcagtcca gagtgggaaa ccccattgac catctgtact ccatgcagaa ttcctatttc | 1140 |
| acctcttgag tct | 1153 |

<210> SEQ ID NO 6
<211> LENGTH: 1332
<212> TYPE: DNA
<213> ORGANISM: Homo sapiens

<400> SEQUENCE: 6

| | |
|---|---|
| atggcgaccg cagcgtctaa ccactacagc ctgctcacct ccagcgcctc catcgtgcac | 60 |
| gccgagccgc ccggcggcat gcagcagggc gcgggggct accgcgaagc gcagagcctg | 120 |
| gtgcagggcg actacggcgc tctgcagagc aacggacacc cgctcagcca cgctcaccag | 180 |
| tggatcaccg cgctgtccca cggcggcggc ggcgggggcg gtggcggcgg cggggggggc | 240 |
| ggggcggcg gcggggcgg cggcgacggc tcccgtggt ccaccagccc cctgggccag | 300 |
| ccggacatca gccctcggt ggtggtgcag cagggcggcc gcggagacga gctgcacggg | 360 |
| ccaggcgccc tgcagcagca gcatcagcag cagcaacagc aacagcagca gcaacagcag | 420 |
| caacagcagc agcagcagca gcaacagcgg ccgccgcatc tggtgcacca cgccgctaac | 480 |
| caccacccgg gacccgggc atggcggagc gcggcggctg cagcgcacct cccacccctcc | 540 |
| atgggagcgt ccaacggcgg cttgctctac tcgcagccca gcttcacggt gaacggcatg | 600 |
| ctgggcgccg gcgggcagcc ggccggtctg caccaccacg gcctgcggga cgcgcacgac | 660 |
| gagccacacc atgccgacca ccacccgcac ccgcactcgc acccacacca gcagccgccg | 720 |
| ccccgccgc ccccgcaggg tccgcctggc cacccaggcg cgcaccacga cccgcactcg | 780 |
| gacgaggaca cgccgacctc ggacgacctg gagcagttcg ccaagcagtt caagcagcgg | 840 |
| cggatcaaac tgggatttac ccaagcggac gtggggctgg ctctgggcac cctgtatggc | 900 |
| aacgtgttct cgcagaccac catctgcagg tttgaggccc tgcagctgag cttcaagaac | 960 |
| atgtgcaagc tgaagccttt gttgaacaag tggttggagg aggcggactc gtcctcgggc | 1020 |
| agccccacga gcatagacaa gatcgcagcg caagggcgca gcggaaaaa gcggacctcc | 1080 |
| atcgaggtga gcgtcaaggg ggctctggag agccattttcc tcaaatgccc caagccctcg | 1140 |
| gcccaggaga tcacctccct cgcggacagc ttacagctgg agaaggaggt ggtgagagtt | 1200 |
| tggttttgta acaggagaca gaaagagaaa aggatgaccc ctcccggagg gactctgccg | 1260 |
| ggcgccgagg atgtgtacgg ggggagtagg gacactccac cacaccacgg ggtgcagacg | 1320 |

```
cccgtccagt ga                                                         1332
```

<210> SEQ ID NO 7
<211> LENGTH: 1086
<212> TYPE: DNA
<213> ORGANISM: Homo sapiens

<400> SEQUENCE: 7

```
atggccacag ctgcctcgaa tccctacagc attctcagtt ccacctccct agtccatgcg     60
gactctgcgg gcatgcagca ggggagtcct ttccgcaacc tcagaaaact tctccaaagt    120
gattacttgc agggagttcc cagcaatggg catcccctcg gcatcactg ggtgaccagt     180
ctgagcgacg ggggcccatg gtcctccaca ctggccacca gcccctggac cagcaggac    240
gtgaagcccg gcgcgaaga cctgcaactg ggtgcgatca tccatcaccg ctcgccacac    300
gtagcccacc actcaccgca cactaaccac cccaacgcct gggggccag cccggcaccg     360
aacccgtcta tcacgtcaag cggccaaccc ctcaacgtgt actcgcagcc tggcttcacc    420
gtgagcggca tgctggaaca cggggactc accccacctc cagctgccgc ctctgcacag    480
agcctgcacc cggtgctccg agagcccccg gatcacggcg aactgggctc gcaccattgc    540
caggatcact ccgacgagga gacgccaacc tctgatgagt tggaacagtt cgccaaacaa    600
ttcaaacaaa gaagaatcaa gttgggcttc acgcaggccg acgtggggtt ggcgctgggc    660
acactgtatg gtaacgtgtt ctcgcagacc accatctgca ggttcgaggc cttgcagctg    720
agcttcaaaa atatgtgcaa gctgaagccc ctgctgaaca gtggctgga ggaggcggat     780
tcgtccacag ggagcccgac cagcattgac aagatcgctg cacagggccg caagcgcaag    840
aagcggacct ccatcgaggt gagtgtcaag ggcgtactgg agacgcattt cctcaagtgt    900
cccaagcctg ccgcgcagga gatctcctcg ctggcagaca gcctccagtt ggagaaggaa    960
gtggtgcgtg tctggttctg taatcgaaga caaaaagaga aagaatgac tccgccaggg   1020
gatcagcagc cgcatgaggt ttattcgcac accgtgaaaa cagacacatc ttgccatgat   1080
ctctga                                                             1086
```

<210> SEQ ID NO 8
<211> LENGTH: 954
<212> TYPE: DNA
<213> ORGANISM: Homo sapiens

<400> SEQUENCE: 8

```
atgtacaaca tgatggagac ggagctgaag ccgccgggcc cgcagcaaac ttcgggggc      60
ggcggcggca actccaccgc ggcggcggcc ggcggcaacc agaaaaacag cccggaccgc    120
gtcaagcggc ccatgaatgc cttcatggtg tggtcccgcg gcagcggcg caagatggcc    180
caggagaacc ccaagatgca caactcggag atcagcaagc gcctgggcgc cgagtggaaa    240
cttttgtcgg agacggagaa gcggccgttc atcgacgagg ctaagcggct gcgagcgctg    300
cacatgaagg agcacccgga ttataaatac cggccccggc ggaaaaccaa gacgctcatg    360
aagaaggata gtacacgct gcccggcggg ctgctggccc ccggcggcaa tagcatggcg     420
agcgggtcg gggtgggcgc cggcctgggc gcggcgtga accagcgcat ggacagttac     480
gcgcacatga acggctggag caacggcagc tacagcatga tgcaggacca gctgggctac    540
ccgcagcacc cggcctcaa tgcgcacggc gcagcgcaga tgcagccccat gcaccgctac    600
gacgtgagcg ccctgcagta caactccatg accagctcgc agacctacat gaacggctcg    660
```

|  |  |  |
|---|---|---|
| cccacctaca gcatgtccta ctcgcagcag ggcacccctg gcatggctct tggctccatg | 720 |
| ggttcggtgg tcaagtccga ggccagctcc agcccccctg tggttacctc ttcctcccac | 780 |
| tccagggcgc cctgccaggc cggggacctc cgggacatga tcagcatgta tctcccggc | 840 |
| gccgaggtgc cggaacccgc cgcccccagc agacttcaca tgtcccagca ctaccagagc | 900 |
| ggcccggtgc ccggcacggc cattaacggc acactgcccc tctcacacat gtga | 954 |

<210> SEQ ID NO 9
<211> LENGTH: 1392
<212> TYPE: DNA
<213> ORGANISM: Homo sapiens

<400> SEQUENCE: 9

|  |  |
|---|---|
| atgcactcgg cttccagtat gctgggagcg gtgaagatgg aagggcacga gccgtccgac | 60 |
| tggagcagct actatgcaga gcccgagggc tactcctccg tgagcaacat gaacgccggc | 120 |
| ctggggatga acggcatgaa cacgtacatg agcatgtcgg cggccgccat gggcagcggc | 180 |
| tcgggcaaca tgagcgcggg ctccatgaac atgtcgtcgt acgtgggcgc tggcatgagc | 240 |
| ccgtccctgg cggggatgtc ccccggcgcg gcgccatgg cgggcatggg cggctcggcc | 300 |
| ggggcggccg gcgtggcggg catggggccg cacttgagtc ccagcctgag cccgctcggg | 360 |
| ggcaggcgg ccggggccat gggcggcctg gcccctacg ccaacatgaa ctccatgagc | 420 |
| cccatgtacg gcaggcggg cctgagccgc gcccgcgacc caagaccta caggcgcagc | 480 |
| tacacgcacg caaagccgcc ctactcgtac atctcgctca tcaccatggc catccagcag | 540 |
| agccccaaca agatgctgac gctgagcgag atcaccagt ggatcatgga cctcttcccc | 600 |
| ttctaccggc agaaccagca gcgctggcag aactccatcc gccactcgct ctccttcaac | 660 |
| gactgtttcc tgaaggtgcc ccgctcgccc gacaagcccg gcaagggctc cttctggacc | 720 |
| ctgcaccctg actcgggcaa catgttcgag aacggctgct acctgcgccg ccagaagcgc | 780 |
| ttcaagtgcg agaagcagct ggcgctgaag gaggccgcag gcgccgccgg cagcggcaag | 840 |
| aaggcggccg ccggagccca ggcctcacag gctcaactcg gggaggccgc cgggccggcc | 900 |
| tccgagactc cggcgggcac cgagtcgcct cactcgagcg cctccccgtg ccaggagcac | 960 |
| aagcgagggg gcctgggaga gctgaagggg acgccggctg cggcgctgag cccccagag | 1020 |
| ccggcgccct ctcccgggca gcagcagcag gccgcggccc acctgctggg cccgccccac | 1080 |
| cacccgggcc tgccgcctga ggcccacctg aagccggaac accactacgc cttcaaccac | 1140 |
| ccgttctcca tcaacaacct catgtcctcg gagcagcagc accaccacag ccaccaccac | 1200 |
| caccagcccc acaaaatgga cctcaaggcc tacgaacagg tgatgcacta ccccggctac | 1260 |
| ggttccccca tgcctggcag cttggccatg ggcccggtca cgaacaaaac gggcctggac | 1320 |
| gcctcgcccc tggccgcaga tacctcctac taccagggg tgtactcccg gcccattatg | 1380 |
| aactcctctt aa | 1392 |

<210> SEQ ID NO 10
<211> LENGTH: 402
<212> TYPE: DNA
<213> ORGANISM: Homo sapiens

<400> SEQUENCE: 10

|  |  |
|---|---|
| atgaagaagc tggccaggcg acagcagcag cagcagcaag atcagcagaa cacccagagg | 60 |
| ctgagctctg ctcagacaaa cggtggtggg agtgctggga tggaaggaat catgaacccc | 120 |
| tacacggctc tgcccacccc acagcagctc ctggccatcg agcagagtgt ctacagctca | 180 | gatcccttcc gacagggtct caccccaccc cagatgcctg gagaccacat gcacccttat    240 ggtgccgagc ccctttttcca tgacctggat agcgacgaca cctccctcag taacctgggt    300 gactgtttcc tagcaacctc agaagctggg cctctgcagt ccagagtggg aaacccatt    360 gaccatctgt actccatgca gaattcttac ttcacatctt ga    402

<210> SEQ ID NO 11
<211> LENGTH: 20
<212> TYPE: DNA
<213> ORGANISM: Unknown
<220> FEATURE:
<223> OTHER INFORMATION: Synthetic

<400> SEQUENCE: 11
gagtgtgacg tgcttccaga    20

<210> SEQ ID NO 12
<211> LENGTH: 20
<212> TYPE: DNA
<213> ORGANISM: Unknown
<220> FEATURE:
<223> OTHER INFORMATION: Synthetic

<400> SEQUENCE: 12
tggtcccagt tgatcatggc    20

<210> SEQ ID NO 13
<211> LENGTH: 19
<212> TYPE: DNA
<213> ORGANISM: Unknown
<220> FEATURE:
<223> OTHER INFORMATION: Synthetic

<400> SEQUENCE: 13
tgcgctgtcg ttatcggac    19

<210> SEQ ID NO 14
<211> LENGTH: 21
<212> TYPE: DNA
<213> ORGANISM: Unknown
<220> FEATURE:
<223> OTHER INFORMATION: Synthetic

<400> SEQUENCE: 14
ggtagcgatt cctctggaag g    21

<210> SEQ ID NO 15
<211> LENGTH: 19
<212> TYPE: DNA
<213> ORGANISM: Unknown
<220> FEATURE:
<223> OTHER INFORMATION: Synthetic

<400> SEQUENCE: 15
acggcctgaa gatggagga    19

<210> SEQ ID NO 16
<211> LENGTH: 21
<212> TYPE: DNA
<213> ORGANISM: Unknown
<220> FEATURE:
<223> OTHER INFORMATION: Synthetic

<400> SEQUENCE: 16
cagaaacctg tccgagatga c                                                    21

<210> SEQ ID NO 17
<211> LENGTH: 21
<212> TYPE: DNA
<213> ORGANISM: Unknown
<220> FEATURE:
<223> OTHER INFORMATION: Synthetic

<400> SEQUENCE: 17
ctgcacagta tggccgagat g                                                    21

<210> SEQ ID NO 18
<211> LENGTH: 19
<212> TYPE: DNA
<213> ORGANISM: Unknown
<220> FEATURE:
<223> OTHER INFORMATION: Synthetic

<400> SEQUENCE: 18
ccgggttatg tgagcccaa                                                       19

<210> SEQ ID NO 19
<211> LENGTH: 21
<212> TYPE: DNA
<213> ORGANISM: Unknown
<220> FEATURE:
<223> OTHER INFORMATION: Synthetic

<400> SEQUENCE: 19
tgctgctatg acttctttgc c                                                    21

<210> SEQ ID NO 20
<211> LENGTH: 19
<212> TYPE: DNA
<213> ORGANISM: Unknown
<220> FEATURE:
<223> OTHER INFORMATION: Synthetic

<400> SEQUENCE: 20
gcttcctgtg atcggccat                                                       19

<210> SEQ ID NO 21
<211> LENGTH: 21
<212> TYPE: DNA
<213> ORGANISM: Unknown
<220> FEATURE:
<223> OTHER INFORMATION: Synthetic

<400> SEQUENCE: 21
tggaggtgcc tatcagagag a                                                    21

<210> SEQ ID NO 22
<211> LENGTH: 22
<212> TYPE: DNA
<213> ORGANISM: Unknown
<220> FEATURE:
<223> OTHER INFORMATION: Synthetic

<400> SEQUENCE: 22
gtgagatcca gtaacgcatt ca                                                   22

<210> SEQ ID NO 23
<211> LENGTH: 19
<212> TYPE: DNA
<213> ORGANISM: Unknown

```
<220> FEATURE:
<223> OTHER INFORMATION: Synthetic

<400> SEQUENCE: 23
gcaaccgggt caagttggt                                                  19

<210> SEQ ID NO 24
<211> LENGTH: 20
<212> TYPE: DNA
<213> ORGANISM: Unknown
<220> FEATURE:
<223> OTHER INFORMATION: Synthetic

<400> SEQUENCE: 24
gtcgttggag tagttggggg                                                 20

<210> SEQ ID NO 25
<211> LENGTH: 20
<212> TYPE: DNA
<213> ORGANISM: Unknown
<220> FEATURE:
<223> OTHER INFORMATION: Synthetic

<400> SEQUENCE: 25
gacattcccg gacacacacc                                                 20

<210> SEQ ID NO 26
<211> LENGTH: 20
<212> TYPE: DNA
<213> ORGANISM: Unknown
<220> FEATURE:
<223> OTHER INFORMATION: Synthetic

<400> SEQUENCE: 26
ctcctcgtcc tcctcctcgt                                                 20

<210> SEQ ID NO 27
<211> LENGTH: 19
<212> TYPE: DNA
<213> ORGANISM: Unknown
<220> FEATURE:
<223> OTHER INFORMATION: Synthetic

<400> SEQUENCE: 27
caaggctgac gcacttgga                                                  19

<210> SEQ ID NO 28
<211> LENGTH: 20
<212> TYPE: DNA
<213> ORGANISM: Unknown
<220> FEATURE:
<223> OTHER INFORMATION: Synthetic

<400> SEQUENCE: 28
cttgccgttc ttcttgtcgc                                                 20

<210> SEQ ID NO 29
<211> LENGTH: 22
<212> TYPE: DNA
<213> ORGANISM: Unknown
<220> FEATURE:
<223> OTHER INFORMATION: Synthetic

<400> SEQUENCE: 29
tatctaaagc aaccgcctta cg                                              22
```

```
<210> SEQ ID NO 30
<211> LENGTH: 21
<212> TYPE: DNA
<213> ORGANISM: Unknown
<220> FEATURE:
<223> OTHER INFORMATION: Synthetic

<400> SEQUENCE: 30
aagtccatac ccgaagtggt c                                              21

<210> SEQ ID NO 31
<211> LENGTH: 22
<212> TYPE: DNA
<213> ORGANISM: Unknown
<220> FEATURE:
<223> OTHER INFORMATION: Synthetic

<400> SEQUENCE: 31
catcatcaag gactcctcac gg                                             22

<210> SEQ ID NO 32
<211> LENGTH: 19
<212> TYPE: DNA
<213> ORGANISM: Unknown
<220> FEATURE:
<223> OTHER INFORMATION: Synthetic

<400> SEQUENCE: 32
gacatcacca acggggacg                                                 19

<210> SEQ ID NO 33
<211> LENGTH: 19
<212> TYPE: DNA
<213> ORGANISM: Unknown
<220> FEATURE:
<223> OTHER INFORMATION: Synthetic

<400> SEQUENCE: 33
atgaagcgcc aggctaagg                                                 19

<210> SEQ ID NO 34
<211> LENGTH: 21
<212> TYPE: DNA
<213> ORGANISM: Unknown
<220> FEATURE:
<223> OTHER INFORMATION: Synthetic

<400> SEQUENCE: 34
ggtttgccgt ctttgactag g                                              21

<210> SEQ ID NO 35
<211> LENGTH: 25
<212> TYPE: DNA
<213> ORGANISM: Unknown
<220> FEATURE:
<223> OTHER INFORMATION: Synthetic

<400> SEQUENCE: 35
ctggaacagc aaaacaaggc gctgg                                          25

<210> SEQ ID NO 36
<211> LENGTH: 23
<212> TYPE: DNA
<213> ORGANISM: Unknown
<220> FEATURE:
<223> OTHER INFORMATION: Synthetic
```

```
<400> SEQUENCE: 36
tccagcctca ggttggtttc atc                                              23

<210> SEQ ID NO 37
<211> LENGTH: 21
<212> TYPE: DNA
<213> ORGANISM: Unknown
<220> FEATURE:
<223> OTHER INFORMATION: Synthetic

<400> SEQUENCE: 37
accaaaagca acggagaaga g                                                21

<210> SEQ ID NO 38
<211> LENGTH: 22
<212> TYPE: DNA
<213> ORGANISM: Unknown
<220> FEATURE:
<223> OTHER INFORMATION: Synthetic

<400> SEQUENCE: 38
ggcattccga aacaggtaac tc                                               22

<210> SEQ ID NO 39
<211> LENGTH: 19
<212> TYPE: DNA
<213> ORGANISM: Unknown
<220> FEATURE:
<223> OTHER INFORMATION: Synthetic

<400> SEQUENCE: 39
ccctgaagtc gaggagctg                                                   19

<210> SEQ ID NO 40
<211> LENGTH: 19
<212> TYPE: DNA
<213> ORGANISM: Unknown
<220> FEATURE:
<223> OTHER INFORMATION: Synthetic

<400> SEQUENCE: 40
ctgctgcacc tctaagcga                                                   19

<210> SEQ ID NO 41
<211> LENGTH: 20
<212> TYPE: DNA
<213> ORGANISM: Unknown
<220> FEATURE:
<223> OTHER INFORMATION: Synthetic

<400> SEQUENCE: 41
tcttccaccg catcccttct                                                  20

<210> SEQ ID NO 42
<211> LENGTH: 23
<212> TYPE: DNA
<213> ORGANISM: Unknown
<220> FEATURE:
<223> OTHER INFORMATION: Synthetic

<400> SEQUENCE: 42
ccgagtaggg taggataact tcg                                              23

<210> SEQ ID NO 43
```

```
<211> LENGTH: 21
<212> TYPE: DNA
<213> ORGANISM: Unknown
<220> FEATURE:
<223> OTHER INFORMATION: Synthetic

<400> SEQUENCE: 43
tccccagaac ccgatgatct t                                              21

<210> SEQ ID NO 44
<211> LENGTH: 19
<212> TYPE: DNA
<213> ORGANISM: Unknown
<220> FEATURE:
<223> OTHER INFORMATION: Synthetic

<400> SEQUENCE: 44
cgtggacgag gacacagtc                                                 19

<210> SEQ ID NO 45
<211> LENGTH: 21
<212> TYPE: DNA
<213> ORGANISM: Unknown
<220> FEATURE:
<223> OTHER INFORMATION: Synthetic

<400> SEQUENCE: 45
aggggttcag cttttcggat t                                              21

<210> SEQ ID NO 46
<211> LENGTH: 23
<212> TYPE: DNA
<213> ORGANISM: Unknown
<220> FEATURE:
<223> OTHER INFORMATION: Synthetic

<400> SEQUENCE: 46
agtgttatca ttctccgggg tag                                            23

<210> SEQ ID NO 47
<211> LENGTH: 21
<212> TYPE: DNA
<213> ORGANISM: Unknown
<220> FEATURE:
<223> OTHER INFORMATION: Synthetic

<400> SEQUENCE: 47
tggttgccct cattgatgtc t                                              21

<210> SEQ ID NO 48
<211> LENGTH: 19
<212> TYPE: DNA
<213> ORGANISM: Unknown
<220> FEATURE:
<223> OTHER INFORMATION: Synthetic

<400> SEQUENCE: 48
cccatcccca tcttcgtcc                                                 19

<210> SEQ ID NO 49
<211> LENGTH: 23
<212> TYPE: DNA
<213> ORGANISM: Unknown
<220> FEATURE:
<223> OTHER INFORMATION: Synthetic

<400> SEQUENCE: 49
```

-continued gagatgatca gcatgtacct gcc                    23

<210> SEQ ID NO 50
<211> LENGTH: 20
<212> TYPE: DNA
<213> ORGANISM: Unknown
<220> FEATURE:
<223> OTHER INFORMATION: synthetic

<400> SEQUENCE: 50
gtagtgctgt ggcagcgagt                         20

<210> SEQ ID NO 51
<211> LENGTH: 20
<212> TYPE: DNA
<213> ORGANISM: Unknown
<220> FEATURE:
<223> OTHER INFORMATION: synthetic

<400> SEQUENCE: 51
tggcaaacaa cctgcctatg                         20

<210> SEQ ID NO 52
<211> LENGTH: 21
<212> TYPE: DNA
<213> ORGANISM: Unknown
<220> FEATURE:
<223> OTHER INFORMATION: Synthetic

<400> SEQUENCE: 52
tgcacgagta tgaggaggtc t                       21

<210> SEQ ID NO 53
<211> LENGTH: 20
<212> TYPE: DNA
<213> ORGANISM: Unknown
<220> FEATURE:
<223> OTHER INFORMATION: synthetic

<400> SEQUENCE: 53
tgttgttggc gcaaatgtgg                         20

<210> SEQ ID NO 54
<211> LENGTH: 21
<212> TYPE: DNA
<213> ORGANISM: Unknown
<220> FEATURE:
<223> OTHER INFORMATION: synthetic

<400> SEQUENCE: 54
tgttccttga gcagataggg a                       21

<210> SEQ ID NO 55
<211> LENGTH: 20
<212> TYPE: DNA
<213> ORGANISM: Unknown
<220> FEATURE:
<223> OTHER INFORMATION: Synthetic

<400> SEQUENCE: 55
cagctcgaga gaacgcatca                         20

<210> SEQ ID NO 56
<211> LENGTH: 20
<212> TYPE: DNA

<213> ORGANISM: Unknown
<220> FEATURE:
<223> OTHER INFORMATION: Synthetic

<400> SEQUENCE: 56
acggggttct tgagttcagt                                          20

<210> SEQ ID NO 57
<211> LENGTH: 20
<212> TYPE: DNA
<213> ORGANISM: Unknown
<220> FEATURE:
<223> OTHER INFORMATION: synthetic

<400> SEQUENCE: 57
ctgggacttt gtgcgatgtg                                          20

<210> SEQ ID NO 58
<211> LENGTH: 22
<212> TYPE: DNA
<213> ORGANISM: Unknown
<220> FEATURE:
<223> OTHER INFORMATION: synthetic

<400> SEQUENCE: 58
cggtggaaga ggatctcaaa ca                                       22

<210> SEQ ID NO 59
<211> LENGTH: 21
<212> TYPE: DNA
<213> ORGANISM: Unknown
<220> FEATURE:
<223> OTHER INFORMATION: synthetic

<400> SEQUENCE: 59
ttctacgact atgactgcgg a                                        21

<210> SEQ ID NO 60
<211> LENGTH: 22
<212> TYPE: DNA
<213> ORGANISM: Unknown
<220> FEATURE:
<223> OTHER INFORMATION: synthetic

<400> SEQUENCE: 60
tgatggaagc ataattcctg cc                                       22

<210> SEQ ID NO 61
<211> LENGTH: 24
<212> TYPE: DNA
<213> ORGANISM: Unknown
<220> FEATURE:
<223> OTHER INFORMATION: synthetic

<400> SEQUENCE: 61
agctggagaa ggaggtggtg agag                                     24

<210> SEQ ID NO 62
<211> LENGTH: 31
<212> TYPE: DNA
<213> ORGANISM: Unknown
<220> FEATURE:
<223> OTHER INFORMATION: synthetic

<400> SEQUENCE: 62
cacctgctac ctgatatagg atagtccagt g                             31

```
<210> SEQ ID NO 63
<211> LENGTH: 24
<212> TYPE: DNA
<213> ORGANISM: Unknown
<220> FEATURE:
<223> OTHER INFORMATION: synthetic

<400> SEQUENCE: 63
agctggagaa ggaggtggtg agag                                              24

<210> SEQ ID NO 64
<211> LENGTH: 23
<212> TYPE: DNA
<213> ORGANISM: Unknown
<220> FEATURE:
<223> OTHER INFORMATION: synthetic

<400> SEQUENCE: 64
tttatcgtcg accactgtgc tgg                                               23

<210> SEQ ID NO 65
<211> LENGTH: 24
<212> TYPE: DNA
<213> ORGANISM: Unknown
<220> FEATURE:
<223> OTHER INFORMATION: synthetic

<400> SEQUENCE: 65
cctccgggac atgatcagca tgta                                              24

<210> SEQ ID NO 66
<211> LENGTH: 20
<212> TYPE: DNA
<213> ORGANISM: Unknown
<220> FEATURE:
<223> OTHER INFORMATION: synthetic

<400> SEQUENCE: 66
cggcatcacg gttttttgcgt                                                  20

<210> SEQ ID NO 67
<211> LENGTH: 24
<212> TYPE: DNA
<213> ORGANISM: Unknown
<220> FEATURE:
<223> OTHER INFORMATION: synthetic

<400> SEQUENCE: 67
cctccgggac atgatcagca tgta                                              24

<210> SEQ ID NO 68
<211> LENGTH: 23
<212> TYPE: DNA
<213> ORGANISM: Unknown
<220> FEATURE:
<223> OTHER INFORMATION: synthetic

<400> SEQUENCE: 68
tttatcgtcg accactgtgc tgg                                               23

<210> SEQ ID NO 69
<211> LENGTH: 27
<212> TYPE: DNA
<213> ORGANISM: Unknown
<220> FEATURE:
```

```
<223> OTHER INFORMATION: synthetic

<400> SEQUENCE: 69
tcaaccaccc cttctctatc aacaacc                                              27

<210> SEQ ID NO 70
<211> LENGTH: 26
<212> TYPE: DNA
<213> ORGANISM: Unknown
<220> FEATURE:
<223> OTHER INFORMATION: synthetic

<400> SEQUENCE: 70
tgggtagtgc atgacctgtt cgtagg                                               26

<210> SEQ ID NO 71
<211> LENGTH: 23
<212> TYPE: DNA
<213> ORGANISM: Unknown
<220> FEATURE:
<223> OTHER INFORMATION: synthetic

<400> SEQUENCE: 71
gatcccttcc gacagggtct cac                                                  23

<210> SEQ ID NO 72
<211> LENGTH: 20
<212> TYPE: DNA
<213> ORGANISM: Unknown
<220> FEATURE:
<223> OTHER INFORMATION: synthetic

<400> SEQUENCE: 72
agactgcctt gggaaaagcg                                                      20

<210> SEQ ID NO 73
<211> LENGTH: 27
<212> TYPE: DNA
<213> ORGANISM: Unknown
<220> FEATURE:
<223> OTHER INFORMATION: synthetic

<400> SEQUENCE: 73
tcaaccaccc cttctctatc aacaacc                                              27

<210> SEQ ID NO 74
<211> LENGTH: 20
<212> TYPE: DNA
<213> ORGANISM: Unknown
<220> FEATURE:
<223> OTHER INFORMATION: synthetic

<400> SEQUENCE: 74
agactgcctt gggaaaagcg                                                      20
```

METHODS AND COMPOSITIONS FOR SELECTIVE GENERATION OF DOPAMINERGIC PRECURSORS

CROSS REFERENCE TO RELATED APPLICATIONS

This application is a divisional application of U.S. application Ser. No. 15/503,649 filed on Feb. 13, 2017, which is the US national phase application of PCT/CN2015/087503 filed on Aug. 19, 2015, which claims priority to and the benefit of U.S. Application No. 62/038,914 filed on Aug. 19, 2014, the contents of which are incorporated herein by reference in their entirety.

STATEMENT OF GOVERNMENT SUPPORT

This invention was made with government support under R01 NS418580 and R01 NS061642 awarded by the National Institutes of Health. The government has certain rights in the invention. This invention was also made with government support under Grant Nos. 81271419, 81028007, and 81329002 from National Natural Science Foundation of China; and under Grant No. 2014CB965001 from National Basic Research Program of China. The Chinese government also has certain rights in the invention.

FIELD OF THE INVENTION

The invention in general relates to methods and compositions for transdifferentiation of a somatic cell, e.g., a fibroblast to a dopaminergic precursor. Particularly, the invention relates to an induced dopaminergic precursor (iDP) cell, master transcription factors (TFs) therefor, methods for making iDP cells, and methods and compositions for using them in, e.g., treating neurodegenerative diseases such as Parkinson's disease.

BACKGROUND OF THE INVENTION

Selective degeneration of functional neurons is a key pathogenic event in many neurodegenerative disorders. Cell replacement through transplantation of stem/progenitor cells represents a particularly promising therapeutic strategy for these diseases. One of the most sought after diseases for cell replacement is Parkinson's disease (PD), which is a prototypical illness characterized by the loss of dopaminergic (DA) neurons in the substantia nigra pars compacta (SNpc) and decreased DA innervation in the striatunn[1,2]. Recent breakthroughs in stem cell biology have established the feasibility of directly reprogramming cells of one lineage into another, e.g., neurons, by introducing crucial cell-fate determinants[3,4]. As a result of those advances, induced neurons' and induced neural stem cells (iNPCs)[10-13] have been successfully generated, and studies show that these cells hold therapeutic benefits. Direct reprogramming represents an important direction to obtain safe and less controversial cell sources for PD treatment. However, the low yield and non-proliferative nature of dopaminergic neurons derived from direct reprogramming limits broad application. Multipotent neural stem/progenitor cells (NSC/NPC), including iNPCs that give rise to all types of neural cells, may increase the yield of engraftable cells; however, specific and efficient induction of homogeneous DA neurons from NPCs/iNPCs remains a significant challenge. NSCs/NPCs often respond poorly to pre-patterning morphogens with low differentiation efficiency for specific neuronal subtypes, and are prone to a glial-restricted state[14]. Moreover, grafted NSCs/NPCs are more likely to terminally differentiate into astrocytes rather than functional neurons in response to injury[15,16]. Therefore, dopaminergic neuronal-lineage restricted precursors that hold great potential for DA neuronal differentiation are highly desirable for experimental PD treatment.

Thus, a need exists for dopaminergic precursors, in particularly in vitro induced dopaminergic precursors (iDP). Studies have previously revealed that Brn2/Brn4 and Sox2 are critical for the direct conversion of fibroblasts into induced neural progenitors[9,10,13,17], Strategically, various groups have been working on the direct reprogramming of somatic cells into region-specific iNPCs as well as subtype-specific iNPCs by expressing defined transcript factors in addition to Brn2/Brn4 and Sox[10,18]. The factors that directly reprogram somatic cells into neuronal lineage-restricted progenitors have been expanded to the combination of Brn2/Brn4 and Sox2 with c-Myc[19]. In addition, in the presence of Brn2 and Sox2, FoxG1, a transcription factor that is predominantly expressed in the forebrain, contributes to the acquisition of forebrain identity in iNPCs[10]. In contrast, the midbrain DA neurons that originated from the floor plate cells in the mesencephalon are critically regulated by transcriptional determinants such as Foxa2[20-22]. Furthermore, the development of DA neurons depends not only on initial Sonic hedgehog (SHH)/Fibroblast growth factor 8 (FGF8) and Wnt1 signaling pathway for the dopaminergic progenitors, but also on the cooperation of SHH-Foxa2 and Wnt1-Lmx1α pathways[23]. However, before the discovery herein, no complete panel of transcription factors have been identified to be able to transdifferentiate somatic cells into iDPs in vitro. In contrast, the derivation of engraftable DPs from human pluripotent stem cells has proven difficult due to low differentiation efficiency of DA neurons and primary DPs are not readily available.

SUMMARY OF THE INVENTION

In one aspect, the present invention provides an induced dopaminergic precursor (iDP), comprising ectopically expressed genes and/or proteins selected from: (1) one or both of Brn2 and Brn4, (2) Sox2, and (3) one or both of Foxa2 and Lmx1a, or a variant of any one or more of the foregoing, in a somatic cell that is not dopaminergic precursor. The gene or its variant can be the full-length gene, a fragment thereof or the cDNA, optionally under the control of a constitutive or conditional promoter.

In some embodiments, the iDP includes ectopically expressed Brn2, Sox2 and Foxa2, or a variant of any one or more of the foregoing. The ectopically expressed genes can be expressed from one or more vectors carrying them, or the ectopically expressed proteins can be expressed from one or more mRNA encoding them. In various embodiments, the iDP is a dopaminergic neuronal lineage-restricted progenitors and does not differentiate into a glial cell. In certain embodiments, differentiation of the iDP is independent of morphogens selected from SHH and FGF8. The iDP in some examples can further include ectopically expressed L-Myc, which is optionally conditionally expressed under the control of doxycycline. In some embodiments, the somatic cell is a fibroblast. The somatic cell can be present in vitro.

The iDP disclosed and claimed herein can be used in a treatment of a neurodegenerative disease selected from Parkinson's disease, depression, dementia and schizophrenia.

In another aspect, provided herein is a population of the iDPs disclosed herein, wherein more than 80% or more than 90% of the iDPs are capable of differentiating into dopaminergic neurons.

In yet another aspect, a method of transdifferentiating a somatic cell to an iDP is provided, comprising ectopically expressing genes selected from: (1) one or both of Brn2 and Brn4, (2) Sox2 and (3) one or both of Foxa2 and Lmx1a, or a variant of any one or more of the foregoing, in a somatic cell that is not dopaminergic precursor.

In some embodiments, the method includes ectopically expressing Brn2, Sox2 and Foxa2, or a variant of any one or more of the foregoing, in the somatic cell. The somatic cell may be a fibroblast. The somatic cell can be present in vitro. The somatic cell can be obtained from a patient in need of cell or tissue replacement therapy with iDP. The patient can have Parkinson's disease, depression, dementia or schizophrenia.

Also provided herein is a method of treating a neurodegenerative disease, comprising administering to a patient in need thereof the iDP disclosed herein.

A further aspect relates to a method of identifying an agent that regulates dopaminergic neuron development, comprising subjecting a population of the iDPs disclosed herein to a test agent, wherein a change in differentiation of the iDPs to dopaminergic neuron is indicative of a regulatory role of the test agent in dopaminergic neuron development. In some embodiments, the change is one or more of: cell growth, cell survival, or gene expression change in one or more of tyrosine hydroxylase (TH), Sox1, PAX6, ZBTB16, Sox3, CD133, Nestin, Aldh1A1, Corin (Lrp4), Lmx1a, Msx1, Ngn2, Otx2, Mash1, Pitx3 and Nkx6.1, ploysialic acid-neural cell adhesion molecule (PSA-NCAM), and/or doublecortin (DCX). In certain embodiments, the iDPs are transdifferentiated from a patient's somatic cells, wherein the patient has Parkinson's disease, depression, dementia or schizophrenia, and wherein the method identifies agents for the treatment of Parkinson's disease, depression, dementia or schizophrenia.

Another aspect relates to a composition comprising one or more vectors carrying isolated genes selected from: (1) one or both of Brn2 and Brn4, (2) Sox2 and (3) one or both of Foxa2 and Lmx1a, or a variant of any one or more of the foregoing. In some embodiments, the one or more vectors can carry Brn2, Sox2 and Foxa2, or a variant of any one or more of the foregoing. The vector is a viral vector.

It is to be understood that both the foregoing general description and the following detailed description are exemplary and explanatory only and are not restrictive or limiting the scope of the invention described and claimed herein.

BRIEF DESCRIPTION OF THE FIGURES

FIG. 1A-FIG. 1E. Generation of induced dopaminergic precursors from mouse skin fibroblasts by defined factors Schematic procedure for iDP generation by ectopic overexpression of three transcription factors (Brn2, Sox2 and Foxa2, BSF) (FIG. 1A). Kinetics of iDP generation monitored by GFP occurrence at 7 dpi and clone formation at 14 dpi (indicated by arrows) (FIG. 1B). The expression of a specific set of neural progenitor marker genes (FIG. 1C), ventral mesencephalon (VM) related genes (FIG. 1D), and telencephalon related genes (FIG. 1E) by real-time RT-PCR analysis, and GAPDH-specific primer pairs were used for internal control. Fibroblasts (Fbb) are served as negative control, and primary neural progenitors (WT-NPCs) and forebrain neural progenitors (NPs) served as positive controls. #denotes $p<0.05$ compared to Fbb and iDPs.

FIG. 2A-FIG. 2D. Characterizations of iDPs iDPs cultures were subjected to immunostaining for Nestin (green), Corin (green), DCX and PSA-NCAM (red), and DAPI (blue) (FIG. 2A). iDPs cultured on PLO/laminin-coated coverslips were subjected to dopaminergic neuronal differentiation in the presence of SHH and FGF8, and then immunostaining was performed with antibodies against βIII-Tubulin (green) and Tyrosine hydroxylase (TH, red), and nuclear staining with DAPI (blue) (FIG. 2B). mRNAs were collected from Fbb, WT-NPCs and iDPs, and then subjected to real-time RT-PCR analysis with primers specific for glial-lineage identity (see Table 2), and GAPDH-specific primer pairs were used for internal control (FIG. 2C). WT-NPCs and iDPs cultured on coated coverslips were differentiated with astrocyte medium for 10 days and oligodendrocyte medium for 14 days, respectively, and then subjected to immunostaining with GFAP and O4 (red), and nuclear staining with DAPI (blue) (FIG. 2D). (Scale bars: 20 μm).

FIG. 4A-FIG. 4F. DA neurons derived from iDPs expressed mature neuron markers and exhibited electrophysiological properties iDPs cultured on PLO/laminin-coated coverslips were terminally differentiated in the presence of BDNF, GDNF, IGF1, TGF-β3, dbcAMP and ascorbic acid for 3 weeks, and then subjected to immunostaining with mature DA neuron markers, including MAP2, TH, AADC, DAT and VMAT2 antibodies, and nuclear staining with DAPI (blue) (FIG. 4A). Cells were hyperpolarized to −80 mV for 500 ms before applying depolarizing pulses to elicit inward Na$^+$ and outward K$^+$ currents (FIG. 4B), statistic results showed voltage-dependent inward Na$^+$ and outward K$^+$ currents (FIG. 4C, FIG. 4D). The representative traces of membrane potential changes and action potentials elicited by step-current injections (whole-cell recording, current-clamp mode) generated by DA neurons after 3 weeks of iDP differentiation (FIG. 4E), and statistic result of action potentials was presented in FIG. 4F (n=5). (Scale bars: 20 μm)

FIG. 6A: The training, pretesting, MPTP administration, iDPs inoculation, testing of motor functions, and experimental end point for sacrifice of the mice are shown in the timeline. FIG. 6B: One week after MPTP intoxication, GDP$^+$ iDPs were intracranially injected into the striatum of C57BL/6 mice. Free-floating sections of brain specimens were prepared 3 weeks after iDPs engraftment. Representative photomicrographs of striatum after PBS injection (FIG. 6B, panel a), MPTP intoxication with saline IC injection (FIG. 6B, panel b), and MPTP with iDPs IC injection (FIG. 6B, panel c) were shown. Striatal TH$^+$ densities of DA termini were quantified and data represent means±SEM of striatal densities (FIG. 6B, panel d). Four striatal sections from each mouse were used for analysis. N=10 mice for saline IC injection group; N=7 mice for MPTP group and MPTP with iDPs IC injection group. Survival and differentiation of GFP iDPs following IC injection into the striatum of mice were evaluated 3 weeks post-IC injection. The grafted cells were detected by immunostaining with antibodies against GFP, TH and GFAP (red), and nuclear staining with DAPI (blue). (FIG. 6C, Scale bars: 20 μm)

FIG. 7A-FIG. 7C. iDPs improve rotarod performance in MPTP-intoxicated mice

Mice were tested twice a week with rotarod motor function tests for 3 weeks following iDPs engraftment. FIG. 7A: Pre-MPTP performance values for all mice group were determined with rotarod. FIG. 7B: Weekly performance values for all mice group at week 2 were shown. FIG. 7C: Weekly performance values for all mice group at week 1-3 were shown. Data represent means±SEM of each group normalized to baseline rotarod performance. Statistical analysis was performed using two-tailed Student's t tests. N=10 mice for saline IC injection group; N=7 mice for MPTP group and MPTP with iDPs IC injection group.

FIG. 8A-FIG. 8E. Ectopic expression of Lmx1a and Foxa2 inhibits the proliferation of 5F-iNPCs and confers the mesencephalic regional identity on 5F-iNPCs Schematic diagram of Tet-On/Off advanced system for Lmx1α and Foxa2 overexpression in 5F-iNPCs (FIG. 8A). Infected 5F-iNPCs were treated with Dox (+) and Dox (−) media for 4 days, and the total and transgene levels of Lmx1a and Foxa2 in 5F-iNPCs were investigated through real-time RT-PCR with specific primers (see Table 2) (FIG. 8B). 1×10$^5$ 5F-iNPCs were cultured in the 6-well plate with or without Dox, respectively, and the cell numbers were counted at day 2, day 4, and day 6 (FIG. 8C). 5F-iNPCs were cultured with or without Dox (1 μg/ml) for 4 days, and mRNA were collected and then subjected to real-time RT-PCR with specific primers for glial lineage, neuronal lineage and dopaminergic neuron-related genes (FIG. 8D-FIG. 8E). GAPDH-specific primer pairs were used for internal control. *denotes p<0.05.

Real-time RT-PCR analysis of iDPs employing specific primer pairs for the detection of transgenic genes (FIG. 10A) and endogenous genes (FIG. 10B) used for iDP generation including Brn2, Sox2 and Foxa2. GAPDH-specific primer pairs were used for internal control; Fbb served as negative control and WT-NPCs served as positive control for endogenous detection.

Figure 11B:
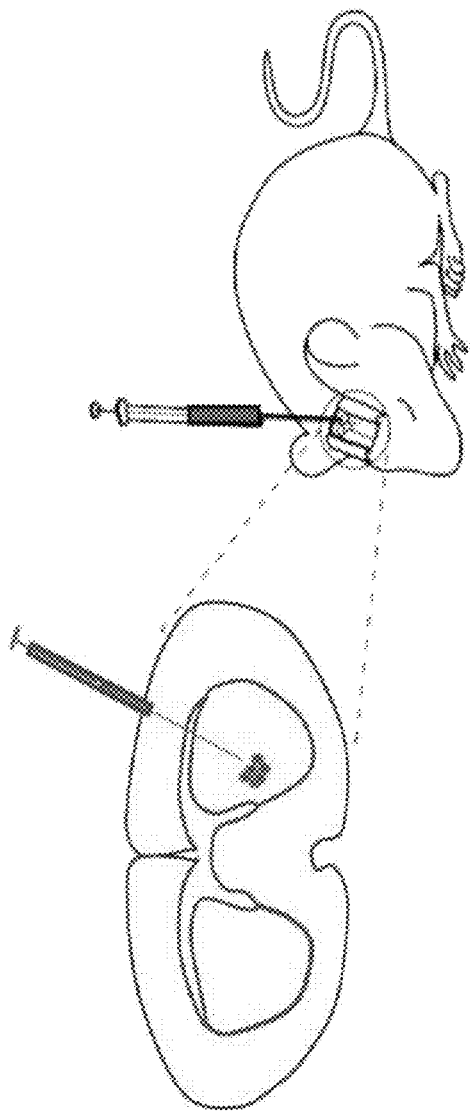
Figure 11D:
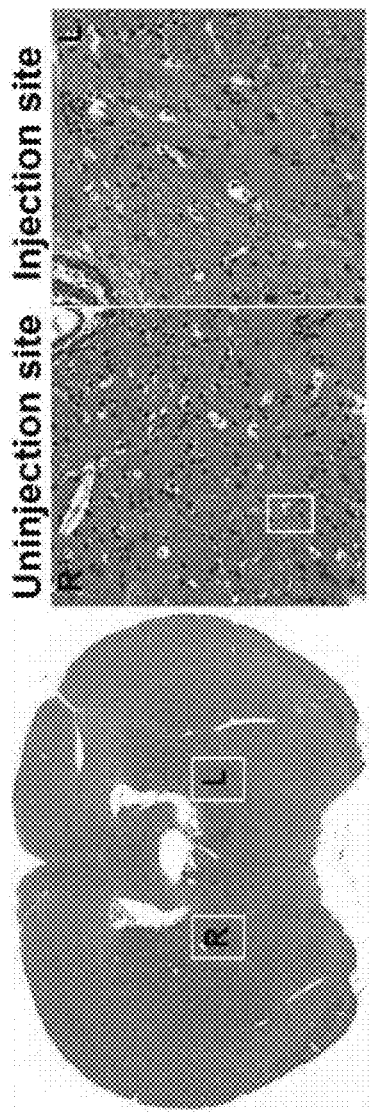
Figure 11A:
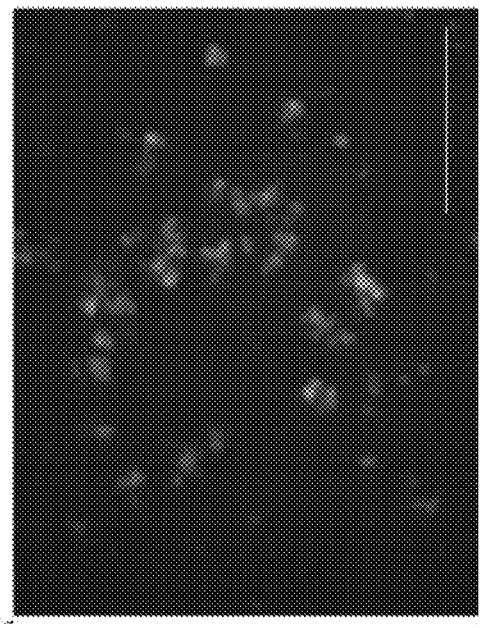
Figure 11C:
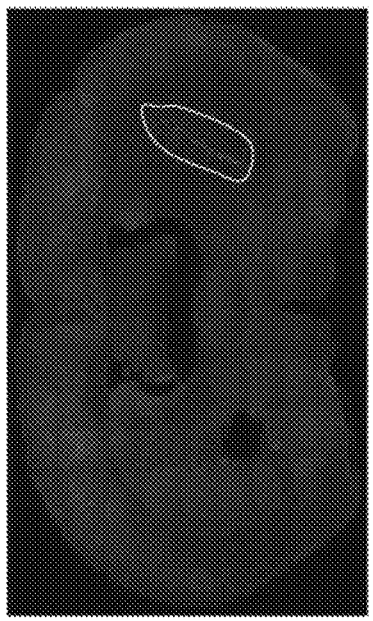

FIG. 11A-FIG. 11D. Cell injection, survival and safe evaluation of iDPs in SCID mice iDPs were infected with pLenti-CMV-GFP-Puroviruses and screened with puromycin (FIG. 11A). Schematic diagram of stereotactic injection of GFP-labeled iDPs in SCID mice (FIG. 11B). GFP-labeled iDPs were intracranially injected into the striatum of SCID mouse brain and images were captured using Leica confocal microscope and Metamorph analysis software (Molecular Devices) (FIG. 11C). Paraffin sections of formlin-fixed brain specimens were prepared 6 weeks after injection, and hematoxylin and eosin (H.E) staining shows tissues in injected (L, Left) and un-injected (R, Right) sides by Ventana's Coreo Au Slider Scanner (FIG. 11D).

Figure 12A:
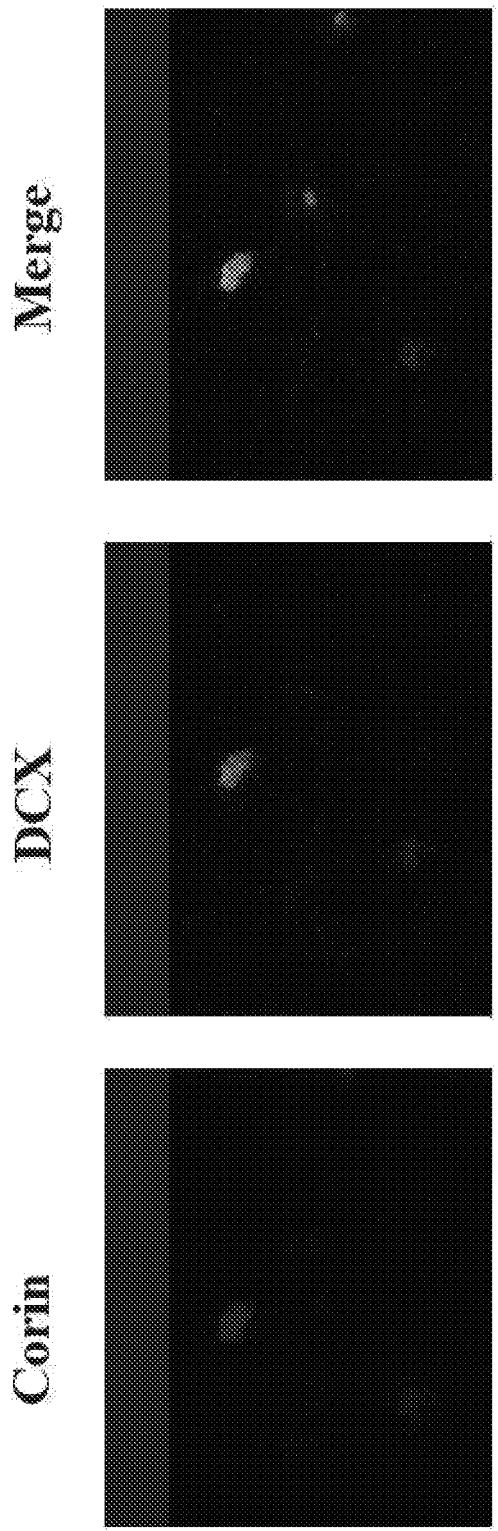
Figure 12B:
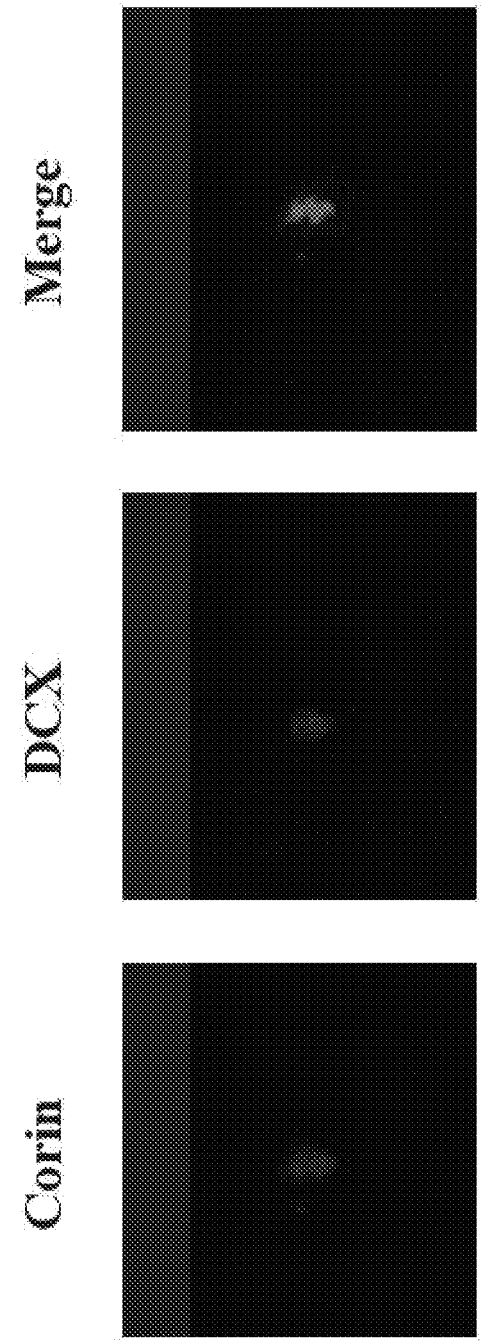

FIG. 12A-FIG. 12B. Characterizations of iDPs derived from a PD patient (FIG. 12A) and a 105d fetus (FIG. 12B). Colocalization of Corin (left panel) and DCX (middle panal) in iDPs cells.

DETAILED DESCRIPTION OF THE INVENTION

Compositions and methods for transdifferentiation of a somatic cell, e.g., a fibroblast to a dopaminergic precursor (DP) are disclosed herein. In one aspect, it was surprisingly discovered, for the first time in vitro, that the specification of midbrain identity and dopaminergic neural fate can be achieved by the ectopic expression of Brn2 (and/or Brn4) and Sox2 with Foxa2 (and/or Lmx1a) during the direct reprogramming of terminally differentiated cells. It is particularly unexpected that a high percentage (e.g., more than 80% or more than 90%) of the cells can be transdifferentiated into iDPs in cells ectopically expressing Brn2, Sox2 and Foxa2. In some embodiments, the addition of Foxa2 (and/or Lmx1a) into the reprogramming procedure initiated by Brn2 (and/or Brn4) and Sox2 successfully converts adult skin fibroblasts into neural progenitors with a midbrain identity and selective dopaminergic differentiation potential. As a result, the induced DPs (iDPs) are dopaminergic neuronal-restricted in vitro and in vivo, and do not form tumors or neural overgrowths in the brain. Moreover, grafted iDPs in the striatum of MPTP mouse model differentiated terminally into DA neurons rather than astrocytes, and functionally alleviate PD symptoms. Furthermore, L-Myc expression can be engineered in the iDPs under the control of an inducer, e.g., doxycycline (Dox), such that the iDPs can be safely expanded to the desired yield for transplantation, providing a useful cell source for PD treatment.

In some embodiments, Brn2 (and/or Brn4), Sox2 and Foxa2 (and/or Lmx1a) are the master transcription factors that can be used to induce transdifferentiation of a somatic cell to iDP by, e.g., ectopically expressing the master transcription factors in the somatic cell. The resulting iDPs not only exhibit the properties of primary dopaminergic progenitors, but also exclusively possess the dopaminergic neuronal lineage-restricted potential. The iDPs can be used in a cell or tissue replacement therapy for the treatment of a neurodegenerative disease such as Parkinson's disease, schizophrenia, depression and dementia. In some embodiments, autologous somatic cells obtained from a patient are subject to transdifferentiation, so that the resulting cells can be transplanted back to the same patient to minimize immune response that might otherwise be mounted against the cells and to avoid the potential need for immunosuppression.

Some of the advantages of the present disclosure over the currently available technologies include the following:

1. The ectopic expression of certain transcription factors disclosed herein can lead to exclusive dopaminergic neuronal lineage-restricted progenitors that do not differentiate into glial cells. In contrast, most of the existing stem cells have been found to differentiate into glial cells. Thus, the iDPs of the present disclosure provide increased therapeutic efficiency compared to other technologies.

2. Unlike other precursors, the differentiation of the iDPs of the present disclosure is, surprisingly, independent of morphogens such as SHH and FGF8. In contrast, other precursors studied to date all require morphogens to induce differentiation.

3. The iDPs disclosed herein have higher potential and efficiency of dopaminergic neuron generation (e.g., more than 80% or more than 90%), compared to currently available technologies which only range from 5% to 60%.

4. The iDPs can be further modified (e.g., by transducing L-Myc expression) so as to have limited proliferation, reducing tumorigenicity after cell transplantation.

Definitions

For convenience, certain terms employed herein, in the specification, examples and appended claims are collected here. Unless otherwise defined, all technical and scientific terms used herein have the same meaning as commonly understood by one of ordinary skill in the art to which this disclosure belongs.

The term "transdifferentiation" or "transdifferentiating" is used interchangeably herein with the phrase "reprogramming" and refers to the conversion of one differentiated somatic cell type into a different differentiated somatic cell type.

As used herein, the term "minimum level" of a gene expression refers to an amount of gene expression that is at or near the lower end of the detection limit for an assay or a method used. The minimum level is often determined by comparison to a reference or control group and is defined as a level that is substantially lower than a reference or control, such as less than or equal to 10% of the expression level of the reference or control group.

As used herein, the term "somatic cell" refers to any cells forming the body of an organism, as opposed to germline cells. In mammals, germline cells include the gametes (spermatozoa and ova) which fuse during fertilization to produce a cell called a zygote, from which the entire mammalian embryo develops. Every other cell type in the mammalian body—apart from the sperm and ova, the cells from which they are made (gametocytes) and undifferentiated stem cells—is a somatic cell: internal organs, skin, bones, blood, and connective tissue are all made up of somatic cells. Unless otherwise indicated the methods for direct conversion of a somatic cell, e.g., fibroblast to an iDP cell can be performed both in vivo and in vitro (where in vivo is practiced when a somatic cell, e.g., fibroblast, is present within a subject, and where in vitro is practiced using isolated somatic cell, e.g., fibroblast, maintained in culture).

The term "dopaminergic precursor" or "dopaminergic progenitor" or "DP" refers to post-mitotic cells that migrate ventrally from the ventricular zone along radial glia to their final destinations in the tegmental mantle layer. During their migration, they start to express tyrosine hydroxylase (TH), the rate-limiting enzyme in dopamine synthesis, and eventually differentiate into dopaminergic neurons. A group of the dopaminergic neurons are involved in control of voluntary movement and are severely affected in Parkinson's disease. Another group of the dopaminergic neurons are involved in regulation of emotion-related behavior and are affected in depression and schizophrenia. Thus, iDP cells can be used to treat these diseases by, e.g., transplantation or cell replacement therapy.

As used herein, the term "endogenous DP cell" refers to a DP cell in vivo or a DP cell produced by differentiation of an embryonic stem cell into a DP cell, and exhibiting a DP cell phenotype. The phenotype of a DP cell is well known by persons of ordinary skill in the art, and includes, for example, gene expression signature, e.g., tyrosine hydroxylase (TH), Sox1, PAX6, ZBTB16, Sox3, CD133, Nestin, Aldh1A1, Corin (Lrp4), Lmx1a, Msx1, Ngn2, Otx2, Mash1, Pitx3 and Nkx6.1, ploysialic acid-neural cell adhesion molecule (PSA-NCAM), doublecortin (DCX), and/or dopaminergic neuronal lineage-restricted differentiation potential.

The term "induced dopaminergic precursor cell" or "iDP cell" as used herein refers to a DP or DP-like cell having one or more DP characteristics (e.g., morphology, gene expression, and function) produced by direct conversion from a somatic cell, e.g., a fibroblast.

The term "ectopic" refers to a substance present in a cell or organism other than its native or natural place and/or level. For example, the term "ectopic expression" refers to the expression of a gene in an abnormal or non-natural place (e.g., cell, tissue or organ), and/or at an abnormal (increased or decreased) level in an organism or in vitro culture.

The term "expression" refers to the cellular processes involved in producing RNA and proteins, including where applicable, but not limited to, for example, transcription, translation, folding, modification and processing. "Expression products" include RNA transcribed from a gene and polypeptides obtained by translation of mRNA transcribed from a gene.

As used herein, "Brn2", "Brn4", "Sox2", "Foxa2" and "Lmx1a" refer to Genbank accession Nos.: NM_005604 (human), NM_000307 (human), NM_003106.3 (human), NM_021784.4 (human), and NM_001174069.1 (human), respectively. These terms also encompass species variants, homologues, allelic forms, mutant forms, and equivalents thereof, including conservative substitutions, additions, deletions therein not adversely affecting the structure or function. In addition to naturally-occurring allelic variants of the sequences that may exist in the population ("wild-type sequences"), it will be appreciated that, as is the case for virtually all proteins, a variety of changes can be introduced into the wild-type sequences without substantially altering the functional (biological) activity of the polypeptides. Such variants are included within the scope of the terms "Brn2", "Brn4", "Sox2", "Foxa2" and "Lmx1a". Mouse and human Brn2, Brn4, Sox2, Foxa2 and Lmx1a sequences are listed in Table 1 below.

TABLE 1

Exemplary Sequences

| Gene | Mouse | Human |
|---|---|---|
| Brn2 | SEQ ID NO.: 1 | SEQ ID NO.: 6 |
| Brn4 | SEQ ID NO.: 2 | SEQ ID NO.: 7 |
| Sox2 | SEQ ID NO.: 3 | SEQ ID NO.: 8 |
| Foxa2 | SEQ ID NO.: 4 | SEQ ID NO.: 9 |
| Lmx1a | SEQ ID NO.: 5 | SEQ ID NO.: 10 |

As used herein, the term a "variant" in referring to a polypeptide could be, e.g., a polypeptide at least 80%, 85%, 90%, 95%, 98%, or 99% identical to full length polypeptide. The variant could be a fragment of full length polypeptide, e.g., a fragment of at least 10 or at least 20 contiguous amino acids of the wild type version of the polypeptide. In some embodiments, a variant is a naturally occurring splice variant. The variant could be a polypeptide at least 80%, 85%, 90%, 95%, 98%, or 99% identical to a fragment of the polypeptide, wherein the fragment is at least 50%, 60%, 70%, 80%, 85%, 90%, 95%, 98%, or 99% as long as the full length wild type polypeptide or a domain thereof having an activity of interest such as the ability to directly convert fibroblasts to iDP cells. In some embodiments the domain is at least 100, 200, 300, or 400 amino acids in length, beginning at any amino acid position in the sequence and extending toward the C-terminus. Variations known in the art to eliminate or substantially reduce the activity of the protein are preferably avoided. In some embodiments, the variant lacks an N- and/or C-terminal portion of the full length polypeptide, e.g., up to 10, 20, or 50 amino acids from either terminus is lacking. In some embodiments the polypeptide has the sequence of a mature (full length) polypeptide, by which is meant a polypeptide that has had one or more portions such as a signal peptide removed during normal intracellular proteolytic processing (e.g., during co-translational or post-translational processing). In some embodiments wherein the protein is produced other than by purifying it from cells that naturally express it, the protein is a chimeric polypeptide, by which is meant that it contains portions from two or more different species. In some embodiments wherein a protein is produced other than by purifying it from cells that naturally express it, the protein is a derivative, by which is meant that the protein comprises additional sequences not related to the protein so long as those sequences do not substantially reduce the biological activity of the protein.

One of skill in the art will be aware of, or will readily be able to ascertain, whether a particular polypeptide variant, fragment, or derivative is functional using assays known in the art. For example, the ability of a variant of a Brn2, Brn4, Sox2, Foxa2 and/or Lmx1a polypeptide to convert a somatic cell, e.g., fibroblast to an iDP can be assessed using the assays as disclose herein. Other convenient assays include measuring the ability to activate transcription of a reporter construct containing a Brn2, Brn4, Sox2, Foxa2 and/or Lmx1a variant operably linked to a nucleic acid sequence encoding a detectable marker such as florescent protein or luciferase. One assay involves determining whether the Brn2, Brn4, Sox2, Foxa2 and/or Lmx1a variant induces a somatic cell, e.g., fibroblast to become an iDP cell or express markers of a DP cell or exhibit functional characteristics of a DP cell as disclosed herein. Determination of such expression of DP markers can be determined using any suitable method, e.g., immunoblotting or real-time quantitative reverse transcription (RT)-PCR. Such assays may readily be adapted to identify or confirm activity of agents that directly convert a somatic cell, e.g., fibroblast to an iDP cell. In certain embodiments of the disclosure a functional variant or fragment has at least 50%, 60%, 70%, 80%, 90%, 95% or more of the activity of the full length wild type polypeptide.

As used herein, the term "operably linked" means that the regulatory sequences necessary for expression of the coding sequence are placed in the DNA molecule in the appropriate positions relative to the coding sequence so as to effect expression of the coding sequence. This same definition is sometimes applied to the arrangement of coding sequences and transcription control elements (e.g. promoters, enhancers, and termination elements) in an expression vector. The term "operably linked" includes having an appropriate start signal (e.g., ATG) in front of the polynucleotide sequence to be expressed, and maintaining the correct reading frame to permit expression of the polynucleotide sequence under the control of the expression control sequence, and production of the desired polypeptide encoded by the polynucleotide sequence.

As used herein, the term "viral vectors" refers to the use of viruses, or virus-associated vectors as carriers of a nucleic acid construct into a cell. Constructs may be integrated and packaged into non-replicating, defective viral genomes like Adenovirus, Adeno-associated virus (AAV), or HeDPs simplex virus (HSV) or others, including retroviral and lentiviral vectors, for infection or transduction into cells. The vector may or may not be incorporated into the cell's genome. The constructs may include viral sequences for transfection, if desired. Alternatively, the construct may be incorporated into vectors capable of episomal replication, e.g. EPV and EBV vectors.

As used herein, the term "transcription factor" refers to a protein that binds to specific parts of DNA using DNA binding domains and is part of the system that controls the transfer (or transcription) of genetic information from DNA to RNA.

The terms "decrease", "reduced", "reduction", "decrease" or "inhibit" are all used herein generally to mean a decrease by a statistically significant amount. However, for avoidance of doubt, "reduced", "reduction" or "decrease" or "inhibit" means a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (i.e. absent level as compared to a reference sample), or any decrease between 10-100% as compared to a reference level.

The terms "increased", "increase" or "enhance" or "activate" are all used herein to generally mean an increase by a statically significant amount; for the avoidance of any doubt, the terms "increased", "increase" or "enhance" or "activate"

means an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

The terms "subject" and "individual" and "patient" are used interchangeably herein, and refer to an animal, for example, a human from whom cells can be obtained and/or to whom treatment, including prophylactic treatment, with the cells as described herein, is provided. For treatment of those conditions or disease states which are specific for a specific animal such as a human subject, the term subject refers to that specific animal. The "non-human animals" and "non-human mammals" as used interchangeably herein, includes mammals such as rats, mice, rabbits, sheep, cats, dogs, cows, pigs, and non-human primates. The term "subject" also encompasses any vertebrate including but not limited to mammals, reptiles, amphibians and fish. However, advantageously, the subject is a mammal such as a human, or other mammals such as a domesticated mammal, e.g., dog, cat, horse, and the like, or production mammal, e.g., cow, sheep, pig, and the like.

The terms "treat", "treating", "treatment", etc., as applied to an isolated cell, include subjecting the cell to any kind of process or condition or performing any kind of manipulation or procedure on the cell. As applied to a subject, the term "treating" refer to providing medical or surgical attention, care, or management to an individual. The individual is usually ill or injured, or at increased risk of becoming ill relative to an average member of the population and in need of such attention, care, or management. In some embodiments, the term "treating" and "treatment" refers to administering to a subject an effective amount of a composition, e.g., a composition comprising iDP cell or their differentiated progeny so that the subject has a reduction in at least one symptom of the disease or an improvement in the disease, for example, beneficial or desired clinical results. For purposes of this disclosure, beneficial or desired clinical results include, but are not limited to, alleviation of one or more symptoms, diminishment of extent of disease, stabilized (i.e., not worsening) state of disease, delay or slowing of disease progression, amelioration or palliation of the disease state, and remission (whether partial or total), whether detectable or undetectable. Treating can refer to prolonging survival as compared to expected survival if not receiving treatment. Thus, one of skill in the art realizes that a treatment may improve the disease condition, but may not be a complete cure for the disease. In some embodiments, treatment can be "prophylactic" treatment, where the subject is administered a composition as disclosed herein (e.g., a population of iDP cell or their progeny) to a subject at risk of developing a neurodegenerative disease as disclosed herein. In some embodiments, treatment is "effective" if the progression of a disease is reduced or halted. Those in need of treatment include those already diagnosed with a neurodegenerative disease or disorder, e.g., Parkinson's disease (PD), as well as those likely to develop a neurodegenerative disease or disorder due to genetic susceptibility or other factors such as family history, exposure to susceptibility factors, weight, age, diet and health.

As used herein the term "comprising" or "comprises" is used in reference to compositions, methods, and respective component(s) thereof, that are present in a given embodiment, yet open to the inclusion of unspecified elements.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth.

As used herein, the term "about" means within 20%, more preferably within 10% and most preferably within 5%.

As used herein, the word "a" can also mean "any."

As used herein, the term "or" can include the meanings of both "or" and "and"—depending on the context and underlying technical situation—and may be interchanged with "and/or."

It is understood that the detailed description and the examples provided herein are illustrative only and are not to be taken as limitations upon the scope of the invention. Various changes and modifications to the disclosed embodiments, which will be apparent to those of skill in the art, may be made without departing from the spirit and scope of the present disclosure. Further, all patents, patent applications, and publications identified are expressly incorporated herein by reference for the purpose of describing and disclosing, for example, the methodologies described in such publications that might be used in connection with the present disclosure. These publications are provided solely for their disclosure prior to the filing date of the present application. Nothing in this regard should be construed as an admission that the inventors are not entitled to antedate such disclosure by virtue of prior disclosure or for any other reason. All statements as to the date or representation as to the contents of these documents are based on the information available to the applicants and do not constitute any admission as to the correctness of the dates or contents of these documents.

Somatic Cells

While fibroblasts are generally used, essentially any primary somatic cell type can be substituted for a fibroblast with the methods described herein. Some non-limiting examples of primary cells include, but are not limited to, epithelial, endothelial, neuronal, adipose, cardiac, skeletal muscle, immune cells, hepatic, splenic, lung, circulating blood cells, gastrointestinal, renal, bone marrow, and pancreatic cells. The cell can be a primary cell isolated from any somatic tissue including, but not limited to brain, liver, lung, gut, stomach, intestine, fat, muscle, uterus, skin, spleen, endocrine organ, bone, etc.

Where the cell is maintained under in vitro conditions, conventional tissue culture conditions and methods can be used, and are known to those of skill in the art. Isolation and culture methods for various cells are well within the abilities of one skilled in the art.

Further, the parental cell can be from any mammalian species, with non-limiting examples including a murine, bovine, simian, porcine, equine, ovine, or human cell. For clarity and simplicity, the description of the methods herein refers to fibroblasts as the parental cells, but it should be understood that all of the methods described herein can be readily applied to other primary parent cell types. In some embodiments, the somatic cell is derived from a human individual.

In some embodiments, the methods and compositions of the present disclosure can be practiced on somatic cells that are fully differentiated and/or restricted to giving rise only to cells of that particular type. The somatic cells can be either partially or terminally differentiated prior to direct conversion to iDPs or other cell types of interest. In some embodiments, somatic cells which are trandifferentiated into iDPs or other cell types of interest are fibroblast cells.

Reprogramming (Transdifferentiation)

The process of altering the cell phenotype of a differentiated cell (i.e. a first cell), e.g., altering the phenotype of a somatic cell to a differentiated cell of a different phenotype (i.e. a second cell) is referred to as "reprogramming" or "transdifferentiation". Stated another way, cells of one type can be converted to another type in a process by what is commonly referred to in the art as transdifferentiation, direct reprogramming, cellular reprogramming or lineage reprogramming.

As disclosed herein, the present disclosure relates to compositions and methods for the direct conversion of a somatic cell, e.g., a fibroblast to iDP. Master transcription factors of iDP can include one or more of Brn2, Brn4, Sox2, Foxa2 and/or Lmx1a. In certain embodiments, the master TFs can be Brn2, Sox2 and Foxa2. In further embodiments, the master TFs can be Brn4, Sox2 and Foxa2. In some embodiments, the master TFs can be Brn2, Sox2, and Lmx1a. In some embodiments, the master TFs can be Brn4, Sox2, and Lmx1a. In some embodiments, the master TFs can be Brn2, Brn4, Sox2 and Foxa2. In some embodiments, the master TFs can be Brn2, Brn4, Sox2, and Lmx1a. In some embodiments, the master TFs can be Brn2, Brn4, Sox2, Foxa2 and Lmx1a.

By increasing expression level of certain master transcription factors in a somatic cell, transdifferentiation into DP can be induced. Various methods for increasing expression level known in the art can be used, including without limitation, contacting the somatic cell with an agent which increases the expression of the master transcription factors, such as a nucleotide sequence (e.g., encoding one or more of the master transcription factors), a protein, an aptamer, a small molecule, a ribosome, an RNAi agent, a peptide-nucleic acid (PNA), or analogues or variants thereof. In some embodiments, ectopic expression of the master transcription factors in the somatic cell induces transdifferentiation into DP. Ectopic expression can be achieved via introduction of a transgene of the transcription factor (carried by, e.g., a vector, e.g., a viral vector such as retrovirus, lentivirus, adenovirus, adeno-associated virus, and/or nanoparticles). Alternatively or additionally, endogenous gene expression can also be increased by modulating transcriptional machinery such as activating its corresponding promoters and/or enhancers, recruiting transcription factors and/or RNA polymerase to the promoter/enhancer region, de-activating silencers, decreasing or removing repressors, etc. In some embodiments, epigenetic modification of the chromatin structure can be used to enhance endogenous gene expression.

In some embodiments, nucleic acids encoding multiple master TFs (e.g., 2, 3, 4, or more) may be incorporated into a vector under control of separate promoters or under control of the same promoter. For example, a polycistronic vector in which nucleic acid sequences encoding the polypeptides are separated by 2A peptides or IRES sequences may be used. Those of ordinary skill in the art are aware of 2A peptides, IRES sequences, and their use to co-express multiple polypeptides in cells, where the multiple polypeptides are encoded by a single mRNA. See, e.g., US Patent Application Pub. No. 20120028821 for further description of 2A peptides and their use to co-express multiple polypeptides in cells. In some embodiments, a transgene comprising a nucleic acid encoding the TF(s) may be integrated at a selected location such as a safe harbor locus (e.g., the adeno-associated virus integration site 1 (AAVS1) in human cells. In some embodiments, integration of a nucleic acid at a selected location in the genome may be achieved using genome editing systems such as CRISPR/Cas9, TALENs, or zinc finger nucleases.

In some embodiments, ectopic expression of one or more master TFs may be achieved by introducing synthetic modified mRNA encoding the TF(s) into the cells. In some embodiments, synthetic modified mRNA comprises one or more nucleotides that are not normally found in naturally occurring mRNA encoding the master TFs. Such nucleotides may, for example, enhance stability and/or translation of the synthetic mRNA. Those of ordinary skill in the art are aware of suitable types of synthetic modified mRNA useful for expressing proteins in cells. See, e.g., US 2012/0046346 and WO 2011/130624, both of which are incorporated herein by reference in their entireties.

In certain embodiments, compositions and methods for transdifferentiation of a somatic cell, e.g., a fibroblast to a functional DP cell, referred to herein as an "induced DP (iDP) cell" are provided. In certain embodiments, the transdifferentiation of a somatic cell, e.g., fibroblast causes the somatic cell to assume a DP-like state. Transdifferentiation into iDP cells can be achieved by increasing expression level of one or more of: Brn2, Brn4, Sox2, Foxa2 and Lmx1a. In some embodiments, increased expression of at least two of, at least three of, at least four of, or at least five of Brn2, Brn4, Sox2, Foxa2 and Lmx1a induces transdifferentiation of somatic cells into iDP cells. In one example, Brn2/Brn4, Sox2, and Foxa2/Lmx1a are master TFs sufficient for establishment and/or maintenance of DP cell state.

Transdifferentiated cells have many clinical, therapeutic, and scientific applications. In some embodiments, the transdifferentiated cells can be transplanted to a patient in need of cell replacement therapy. The cells can be autologous to the patient, i.e., somatic cells from the patient can be first obtained, induced in vitro to transdifferentiate into iDPs, and then transplanted back to the same patient. In one example, iDP cells can be transplanted to treat Parkinson's disease or other diseases such as depression, schizophrenia and dementia. In other embodiments, transdifferentiated cells can be cultured in vitro and/or subject to various in vitro experiments as a model for improving viability and/or to study their properties, and can be used to produce a substance (e.g., a protein) of interest or to generate artificial tissue/organ.

In some embodiments, cells that express one or more of the master TFs described herein may be used in methods (e.g., screening methods) to identify agents (e.g., small molecules (organic molecules having a molecular weight of 1.5 kilodaltons or less), nucleic acids (e.g., RNAi agents, microRNAs), or polypeptides) that may be used in a method of generating iDP cells to increase the efficiency of direct reprogramming and/or used instead of one or more of the master TFs described herein (as a substitute for one or more of the master TFs described herein) and/or to increase the efficiency of direct reprogramming. For example, in certain embodiments a population of somatic cells expressing one or more of the master TFs described herein is contacted with a test agent, and the ability of the test agent to increase the efficiency and/or speed of direct reprogramming to iDP is determined. Efficiency of direct reprogramming can be measured as the number of colonies of transdifferentiated cells of iDP cells that arise from a given number of somatic cells of a different cell type (e.g., fibroblasts) that have modified to cause increased expression of one or more of the master TFs for the iDP.

In some embodiments, iDP cells (and/or dopaminergic neurons produced therefrom) may be used as model systems, which may be used, e.g., for testing the potential efficacy and/or toxicity of agents such as candidate therapeutic agents or otherwise to evaluate the effect of agents or environmental conditions on the cells.

iDP Production

Degeneration of midbrain dopaminergic (DA) neurons is a key pathological event of Parkinson's disease (PD). Limited adult dopaminergic neurogenesis has led to novel therapeutic strategies such as transplantation of dopaminergic precursors (DPs). However, this strategy is currently restrained by a lack of cell source, the tendency for the DPs to become a glial-restricted state, and the tumor formation after transplantation. Here, we demonstrate the direct conversion of mouse fibroblasts into induced DPs (iDPs) by ectopic expression of Brn2, Sox2 and Foxa2. Besides expression with neural progenitor markers and midbrain genes including Corin, Otx2 and Lmx1a, the iDPs were restricted to dopaminergic neuronal lineage upon differentiation. After transplantation into MPTP-lesioned mice, iDPs differentiated into DA neurons, functionally alleviated the motor deficits, and reduced the loss of striatal DA neuronal axonal termini. Importantly, no iDPs-derived astroctyes and neoplasia were detected in mouse brains after transplantation. We propose that the iDPs from direct reprogramming provides a safe and efficient cell source for PD treatment.

Figures 8D, 8E:
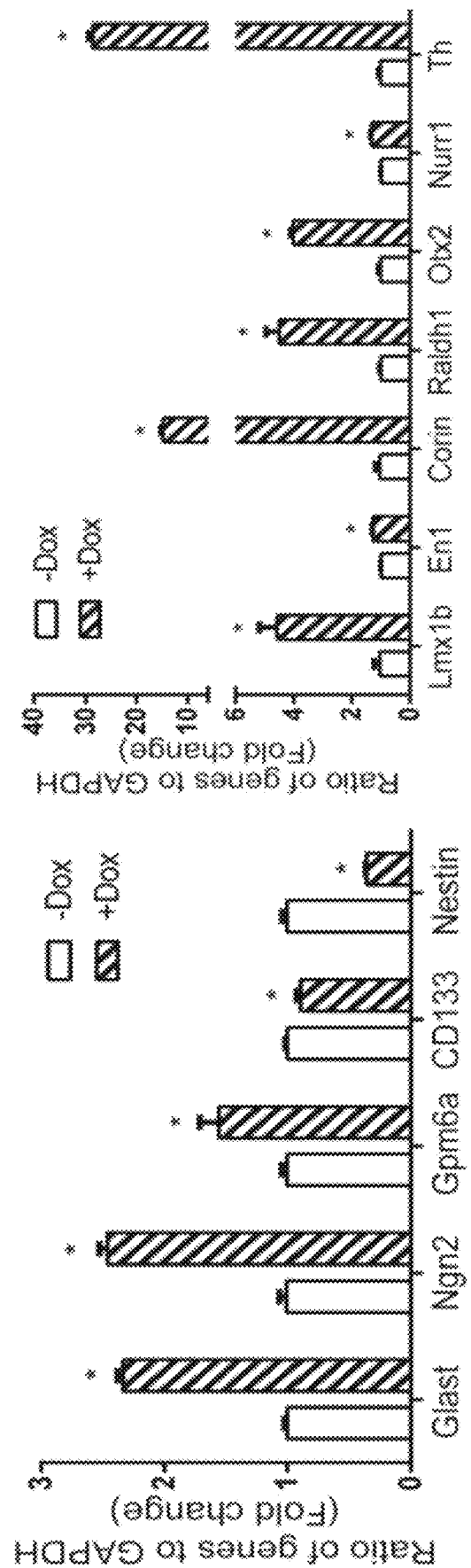
Figure 9A:
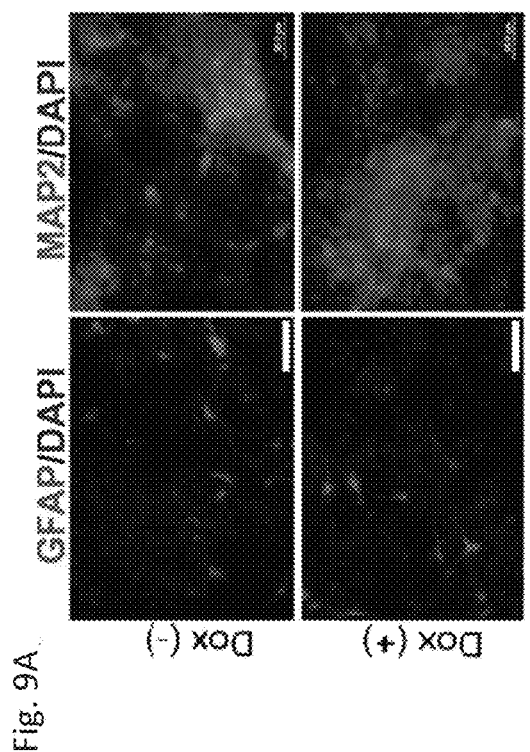
FIG. 9A-FIG. 9B. Overexpression of Lmx1α and Foxa2 increases the TH$^+$ cell population, but has minimum effect on gliogenesis 5F-iNPCs with Dox-regulatable Lmx1α and Foxa2 were treated either with or without Dox under astrocyte differentiation condition (DMEM/F-12 supplied with 10% FBS) for 10 days, and neuronal differentiation condition (DMEM/F12 with N2, GDNF, and BDNF) for 14 days. The differentiations of neurons and astrocytes were visualized through immunofluorescence staining with MAP2 and GFAP, respectively (FIG. 9A). 5F-iNPCs with Dox-regulatable Lmx1α and Foxa2 were differentiated into DA neurons in the presence of GDNF, BDNF, AA and either with or without Dox for 8 days. The immunofluorescence staining of MAP2 (red) and TH (green) were carried out (FIG. 9B, left panel), and the ratio of TH$^+$ to MAP2$^+$ was quantified (mean±SD) (FIG. 9B, right panel). * denotes p<0.05. (Scale bar: 50 μm)
Figure 9B:
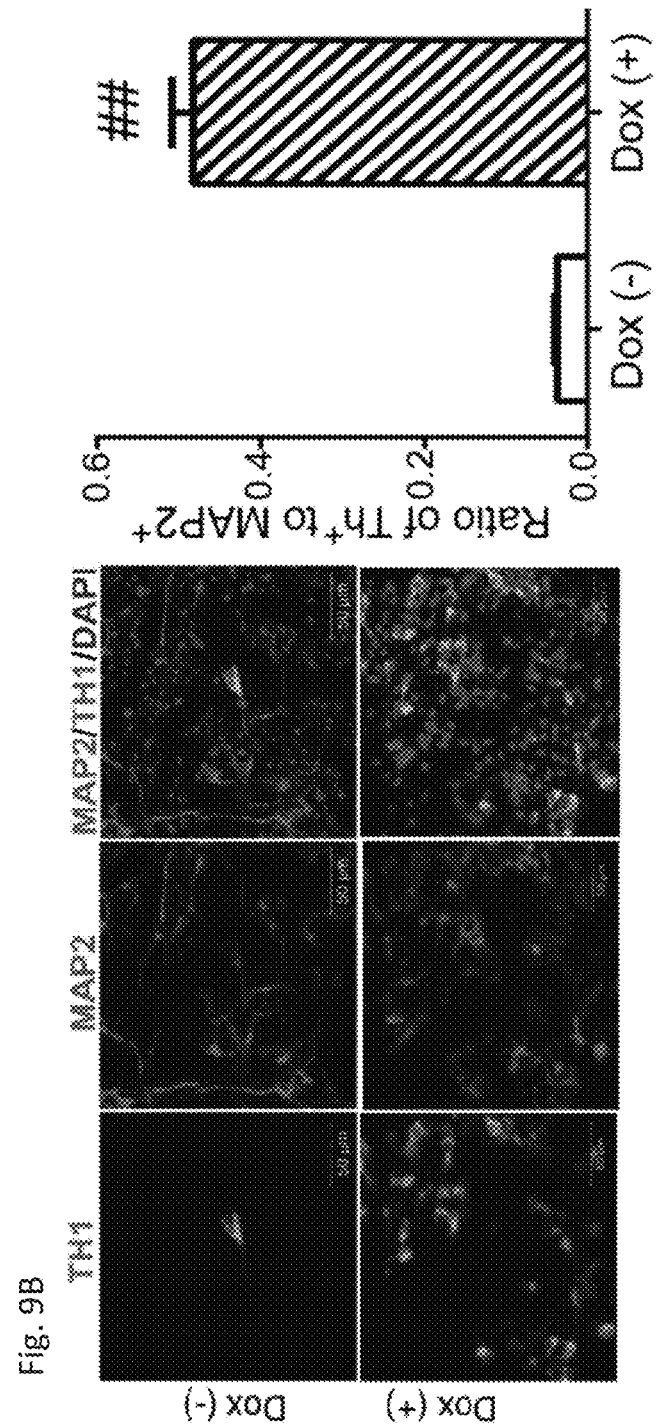

Foxa2 Cooperated with Brn2 and Sox2 to Convert Mouse Fibroblasts into Neural Progenitors with Midbrain Identity Our initial studies have shown that skin fibroblasts can be successfully converted into induced neural progenitors (5F-iNPCs) by a set of transcription factors, including Brn2, Sox2, TLX, Bmi1 and c-Myc[13]. However, the dopaminergic differentiation efficiency of 5F-iNPCs in response to SHH/FGF8 stimulation remains low (<5%). The direct reprogramming of somatic cells into region-specific iNPCs as well as subtype-specific iNPCs by overexpression of defined transcript factors has become our strategy. It has been suggested that Foxa2 and Lmx1a are the major mediators of SHH and Wnt1 signaling in midbrain DA neuron development, respectively[23]. The role of these factors in cellular reprogramming remains unclear. We utilized a Tet-On/Off system to express Foxa2 and Lmx1a in 5F-iNPCs. The cells that successfully incorporated Foxa2 and Lmx1a genes were further screened with the addition of antibiotics puromycin and neomycin in the culture (FIG. 8A). In the presence of Dox, the ectopic expressions of Foxa2 and Lmx1a were induced (FIG. 8B). As expected, both Foxa2- and Lmx1a-expression significantly reduced the proliferation of 5F-iNPCs (FIG. 8C). Furthermore, the differentiation-related genes, including Ngn2 and Gpm6a for neuronal lineage and Glast for glial lineage, were significantly up-regulated. In contrast, the neural stem cell makers, such as CD133 and Nestin, were down-regulated (FIG. 8D). Interestingly, the expressions of tyrosine hydroxylase (TH) and several key factors responsible for midbrain dopaminergic neuron development in 5F-iNPCs were dramatically increased in response to Foxa2 and Lmx1a overexpression (FIG. 8E), suggesting that both Foxa2 and Lmx1a play a positive role in the determination of DA neuronal fate. The effect of Foxa2 and Lmx1a on DA neuronal fate was further confirmed by immunocytochemistry. Foxa2 and Lmx1a overexpression did not affect astrocyte differentiation and neuronal maturation (FIG. 9A). Under neuronal differentiation conditions with SHH/FGF8, the population of TH+ cells was significantly increased following the overexpression of Foxa2 and Lmx1a (FIG. 9B, left panel). The percentage of TH+ cells to total MAP2+ cells was about 10-fold higher than those 5F-iNPCs without Foxa2 and Lmx1a overexpression (FIG. 9B, right panel). Together, these data suggested that Foxa2 may cooperate with Lmx1a to promote the mesencephalic dopaminergic neuron identity in iNPCs, without affecting the neuronal maturation and astrogliogenesis.

Figure 1E:
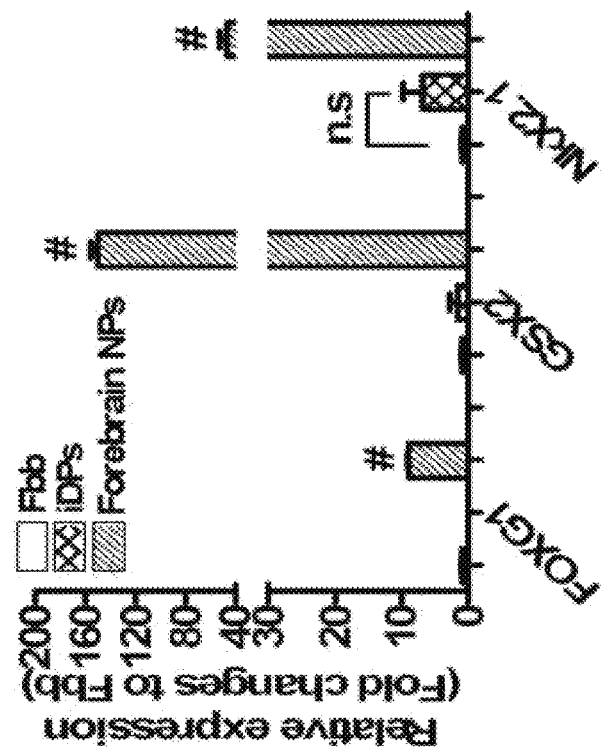
Figure 1D:
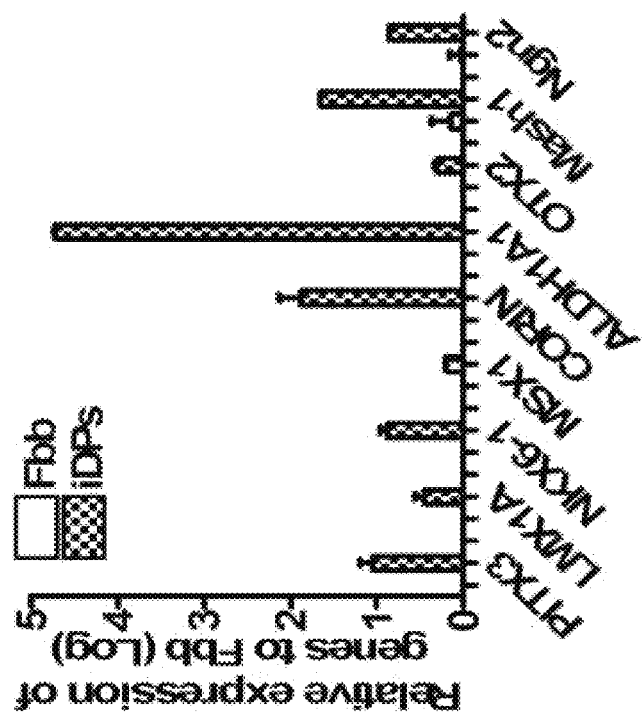
Figures 10A, 10B:
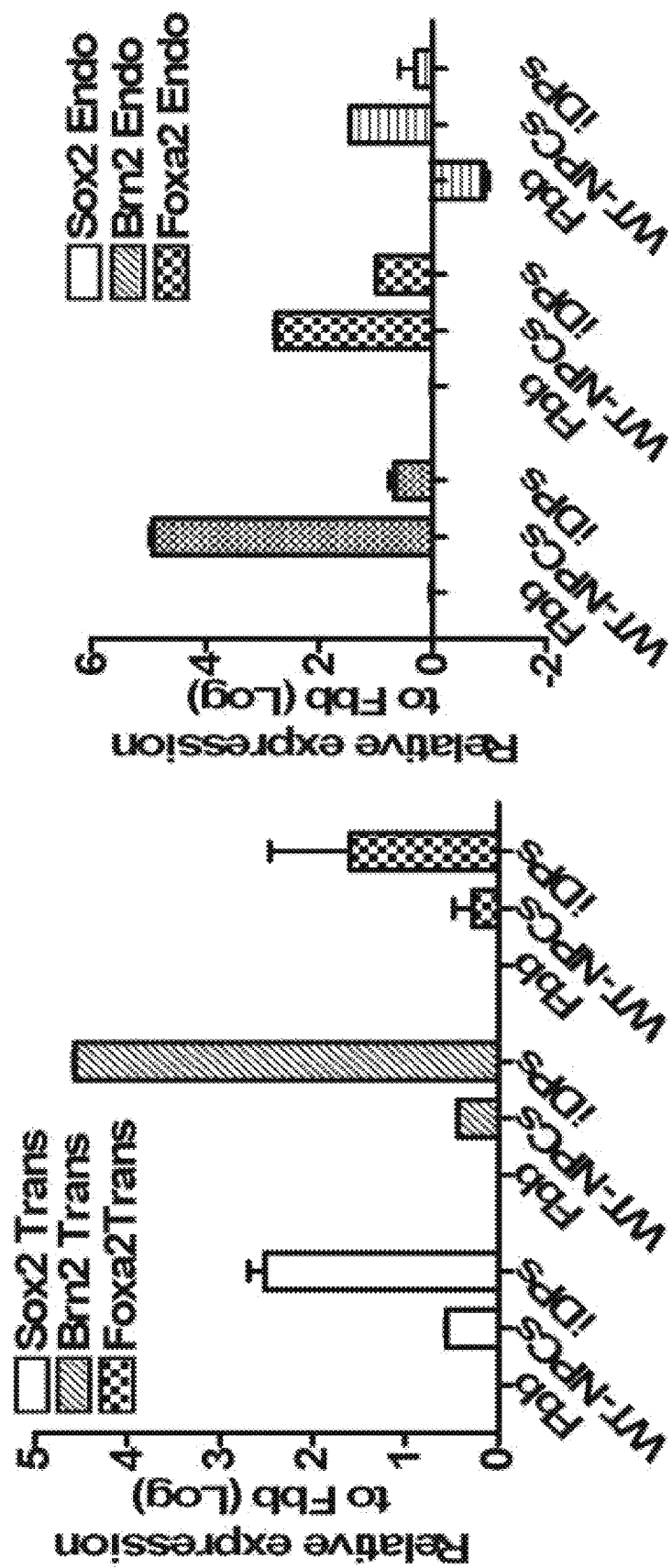
FIG. 10A-FIG. 10B. Analyses of transgenic and endogenous genes in iDPs

Although the specification and maturation of mesencephalic floor plate-originated midbrain DA neurons are primarily regulated by both Foxa2 and Lmx1a/b[24,25], recent evidence has demonstrated that Foxa2 can positively regulate Lmx1a/b and inhibit the expression of Nkx2.2 in neural progenitors[26]. This indicates that Foxa2 alone may suffice for the specification of mesencephalic dopaminergic progenitor identity. We examined this idea by determining the role of Foxa2, along with two known reprogramming factors Brn2 and Sox2, in the direct conversion of somatic cells into neural progenitors. We isolated and cultured adult dermal fibroblasts (SF) from Nestin-EGFP transgenic mice (E/Nestin: EGFP). The fibroblasts were infected with retroviruses encoding Brn2, Sox2 and Foxa2 (BSF) following a schematic procedure (FIG. 1A). The kinetics of induced neural progenitors was monitored with the EGFP in the culture. Seven days after retroviral infections, we observed EGFP positive cells in culture, and at 14 days post-infection, we observed colony formation (FIG. 1B). Seven colonies were obtained and only two were confirmed to be expandable clones after subculture. Both of the expandable clones showed identical properties (data not shown). Compared to the primary cortical neural progenitor cells (WT-NPCs), the resulting cells (named iDPs) retained high expression levels of Foxa2, Brn2 and Sox2 (FIG. 10A-FIG. 10B). Meanwhile, endogenous Foxa2, Brn2 and Sox2 genes expression was also up-regulated, suggesting that the endogenous gene network had been initiated. We characterized the iDPs through the expression levels of several key neural progenitor marker genes in skin fibroblasts (Fbb), WT-NPCs and iDPs by real-time RT-PCR analysis (for sequences of the primer pairs, see Table 2). The iDPs expressed high levels of neural progenitor markers, including Sox1, PAX6, ZBTB16, Sox3, CD133 and Nestin (FIG. 1C). Importantly, the iDPs also expressed high levels of Aldh1A1, Corin (Lrp4), Lmx1a, Msx1, Ngn2, Otx2, Mash1, Pitx3 and Nkx6.1 (FIG. 1D). These genes were previously reported to specifically express in dopaminergic neuron proliferative progenitor cells[20,23,27,28]. In contrast, unlike the primary forebrain neural progenitors (NPs), the iDPs expressed the minimum levels of FoxG1, GSX2, and Nkx2.1 (FIG. 1E), indicative of a forebrain identity[10,29]. These results suggest that fibroblasts could acquire the mesencephalic regional identity and dopaminergic neural fate through the forced expression of transcription factors Brn2, Sox2, and Foxa2.

TABLE 2

Primer pairs for SYBR-Green-based quantitative Real-Time RT-PCR

| Genes | Forward Primers (5'→3') | Reverse Primers (5'→3') |
|---|---|---|
| Aldh1A1 | GAGTGTGACGTGCTTCCAGA (SEQ ID NO.: 11) | TGGTCCCAGTTGATCATGGC (SEQ ID NO.: 12) |
| Pitx3 | TGCGCTGTCGTTATCGGAC (SEQ ID NO.: 13) | GGTAGCGATTCCTCTGGAAGG (SEQ ID NO.: 14) |
| Lmx1α | ACGGCCTGAAGATGGAGGA (SEQ ID NO.: 15) | CAGAAACCTGTCCGAGATGAC (SEQ ID NO.: 16) |
| Nkx6-1 | CTGCACAGTATGGCCGAGATG (SEQ ID NO.: 17) | CCGGGTTATGTGAGCCCAA (SEQ ID NO.: 18) |
| Msx1 | TGCTGCTATGACTTCTTTGCC (SEQ ID NO.: 19) | GCTTCCTGTGATCGGCCAT (SEQ ID NO.: 20) |
| Corin | TGGAGGTGCCTATCAGAGAGA (SEQ ID NO.: 21) | GTGAGATCCAGTAACGCATTCA (SEQ ID NO.: 22) |
| Mash1 | GCAACCGGGTCAAGTTGGT (SEQ ID NO.: 23) | GTCGTTGGAGTAGTTGGGGG (SEQ ID NO.: 24) |
| Ngn2 | GACATTCCCGGACACACACC (SEQ ID NO.: 25) | CTCCTCGTCCTCCTCCTCGT (SEQ ID NO.: 26) |
| Foxg1 | CAAGGCTGACGCACTTGGA (SEQ ID NO.: 27) | CTTGCCGTTCTTCTTGTCGC (SEQ ID NO.: 28) |
| Otx2 | TATCTAAAGCAACCGCCTTACG (SEQ ID NO.: 29) | AAGTCCATACCCGAAGTGGTC (SEQ ID NO.: 30) |
| Gsx2 | CATCATCAAGGACTCCTCACGG (SEQ ID NO.: 31) | GACATCACCAACGGGGACG (SEQ ID NO.: 32) |
| Nkx2-1 | ATGAAGCGCCAGGCTAAGG (SEQ ID NO.: 33) | GGTTTGCCGTCTTTGACTAGG (SEQ ID NO.: 34) |
| GFAP | CTGGAACAGCAAAACAAGGCGCTGG (SEQ ID NO.: 35) | TCCAGCCTCAGGTTGGTTTCATC (SEQ ID NO.: 36) |
| Glast | ACCAAAAGCAACGGAGAAGAG (SEQ ID NO.: 37) | GGCATTCCGAAACAGGTAACTC (SEQ ID NO.: 38) |
| Nestin | CCCTGAAGTCGAGGAGCTG (SEQ ID NO.: 39) | CTGCTGCACCTCTAAGCGA (SEQ ID NO.: 40) |
| Olig1 | TCTTCCACCGCATCCCTTCT (SEQ ID NO.: 41) | CCGAGTAGGGTAGGATAACTTCG (SEQ ID NO.: 42) |
| Olig2 | TCCCCAGAACCCGATGATCTT (SEQ ID NO.: 43) | CGTGGACGAGGACACAGTC (SEQ ID NO.: 44) |
| Ng2 | AGGGGTTCAGCTTTTCGGATT (SEQ ID NO.: 45) | AGTGTTATCATTCTCCGGGTAG (SEQ ID NO.: 46) |
| S100β | TGGTTGCCCTCATTGATGTCT (SEQ ID NO.: 47) | CCCATCCCCATCTTCGTCC (SEQ ID NO.: 48) |
| Sox1 | GAGATGATCAGCATGTACCTGCC (SEQ ID NO.: 49) | GTAGTGCTGTGGCAGCGAGT (SEQ ID NO.: 50) |
| Pax6 | TGGCAAACAACCTGCCTATG (SEQ ID NO.: 51) | TGCACGAGTATGAGGAGGTCT (SEQ ID NO.: 52) |
| CD133 | TGTTGTTGGCGCAAATGTGG (SEQ ID NO.: 53) | TGTTCCTTGAGCAGATAGGGA (SEQ ID NO.: 54) |
| Sox3 | CAGCTCGAGAGAACGCATCA (SEQ ID NO.: 55) | ACGGGGTTCTTGAGTTCAGT (SEQ ID NO.: 56) |
| Zbtb16 | CTGGGACTTTGTGCGATGTG (SEQ ID NO.: 57) | CGGTGGAAGAGGATCTCAAACA (SEQ ID NO.: 58) |
| L-myc | TTCTACGACTATGACTGCGGA (SEQ ID NO.: 59) | TGATGGAAGCATAATTCCTGCC (SEQ ID NO.: 60) |

TABLE 2-continued

Primer pairs for SYBR-Green-based quantitative Real-Time RT-PCR

| Genes | Forward Primers (5'→3') | Reverse Primers (5'→3') |
|---|---|---|
| Brn2 (endo) | AGCTGGAGAAGGAGGTGGTGAGAG (SEQ ID NO.: 61) | CACCTGCTACCTGATATAGGATAGTCCAGTG (SEQ ID NO.: 62) |
| Brn2 (tg) | AGCTGGAGAAGGAGGTGGTGAGAG (SEQ ID NO.: 63) | TTTATCGTCGACCACTGTGCTGG (SEQ ID NO.: 64) |
| Sox2 (endo) | CCTCCGGGACATGATCAGCATGTA (SEQ ID NO.: 65) | CGGCATCACGGTTTTTGCGT (SEQ ID NO.: 66) |
| Sox2 (tg) | CCTCCGGGACATGATCAGCATGTA (SEQ ID NO.: 67) | TTTATCGTCGACCACTGTGCTGG (SEQ ID NO.: 68) |
| Foxa2 | TCAACCACCCCTTCTCTATCAACAACC (SEQ ID NO.: 69) | TGGGTAGTGCATGACCTGTTCGTAGG (SEQ ID NO.: 70) |
| Lmx1a (tg) | GATCCCTTCCGACAGGGTCTCAC (SEQ ID NO.: 71) | AGACTGCCTTGGGAAAAGCG (SEQ ID NO.: 72) |
| Foxa2 (tg) | TCAACCACCCCTTCTCTATCAACAACC (SEQ ID NO.: 73) | AGACTGCCTTGGGAAAAGCG (SEQ ID NO.: 74) | iDPs Expressed Specific Dopaminergic Progenitor Markers and Possess Dopaminergic Neuronal-Restricted Differentiation Potential Ploysialic acid-neural cell adhesion molecule (PSA-NCAM), doublecortin (DCX) and Corin (Lrp4) have been used to identify and isolate neuronal-restricted precursors from ESC-derived neural derivatives[28,30,31]. We characterized the iDPs that we developed through the immunostaining of cells with specific antibodies against PSA-NCAM, DCX and Corin, and observed that the iDPs specifically expressed all three of the marker genes in addition to the NPC marker gene Nestin (FIG. 2A). This suggests that the iDPs are dopaminergic neuron-restricted precursors. We further validated whether the iDPs are dopaminergic neuronal lineage-restricted by differentiating the iDPs into neurons in the presence of SHH and FGF8 stimulation followed by the treatment of BDNF, GDNF and ascorbic acid (AA) for neuronal maturation. Separately, astrocyte and oligodendrocyte differentiation were induced by 10% serum and PDGF/forskolin, respectively. All β-tubulin positive neurons derived from iDPs were TH positive (FIG. 2B), suggesting dopaminergic neuronal lineage-restricted fate for the iDPs. In contrast, no GFAP and O4 positive cells were observed after astrocyte and oligodendrocyte differentiation, indicating that the iDPs had committed to the neuronal lineage (FIG. 2C). As a positive control, when WT-NPCs were put in the same astrocyte and oliogodendrocyte differentiation conditions, astrocyte and oliogodendrocyte developed (FIG. 2C). Unlike WT-NPCs, the iDPs also expressed much lower levels of glial-lineage related genes, such as Glast, olig/2, NG2, GFAP and S100β (FIG. 2D). Since these genes are critical regulators for glial-lineage development, the low expression profile of these genes further validated that the iDPs had given up their glia differentiation potentials and committed to a neuronal fate.

Figure 3B:
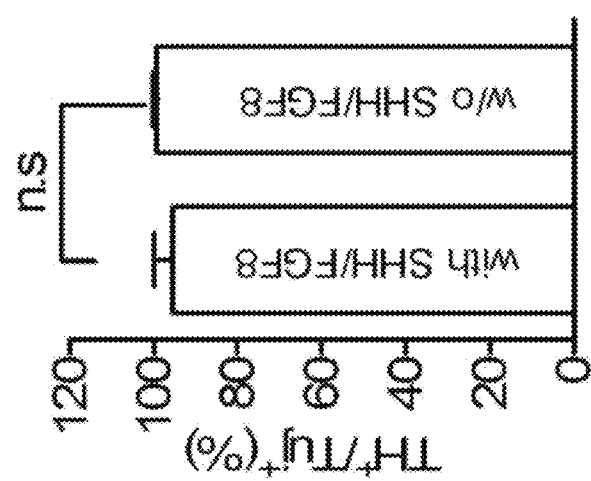
FIG. 3A-FIG. 3C. iDPs possess mesencephalic regional identity and differentiate into DA neurons independent of SHH and FGF8 signaling pathway iDPs were treated with SHH and FGF8 for 6 days, and then terminally differentiated in the presence of BDNF, GDNF, IGF1, TGF-β3, dbcAMP and ascorbic acid for another 3 weeks (FIG. 3A, upper panel). Alternatively, iDPs were directly terminally differentiated in the presence of BDNF, GDNF, IGF1, TGF-β3, dbcAMP and ascorbic acid for another 3 weeks (FIG. 3A, lower panel). Cells were fixed and then subjected to immunostaining with βIII-Tubulin (green) and Tyrosine hydroxylase (TH, red), and nuclear staining with DAPI (blue) (FIG. 3A). The percentage of TH$^+$ neurons of total neurons (Tuj$^+$) differentiated from iDPs was shown. No significant difference (n.s) was observed (FIG. 3B). After differentiation, MAP2$^+$ neurons (green) from iDPs were closely associated with presynaptic puncta labeled by synaptophysin (red). In contrast, an adjacent cell of different morphology appeared negative for synaptophysin, suggesting a specific staining for synaptophysin (FIG. 3C, panels C1-C3). Arrows in FIG. 3C panel C4, a large magnification image of box area in FIG. 3C panel C3, shows the presynaptic puncta. (Scale bars: 20 μm)
Figure 3A:
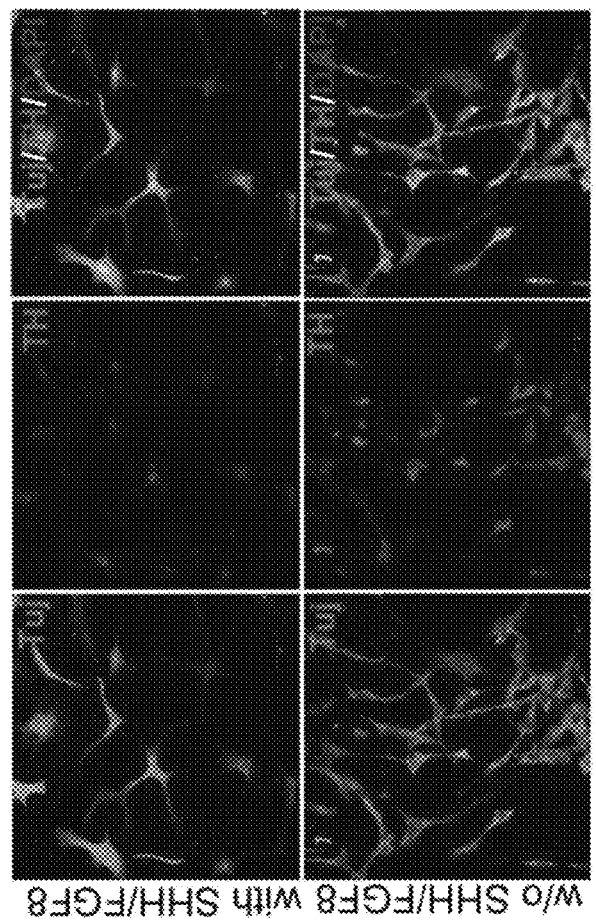
Figure 3C:
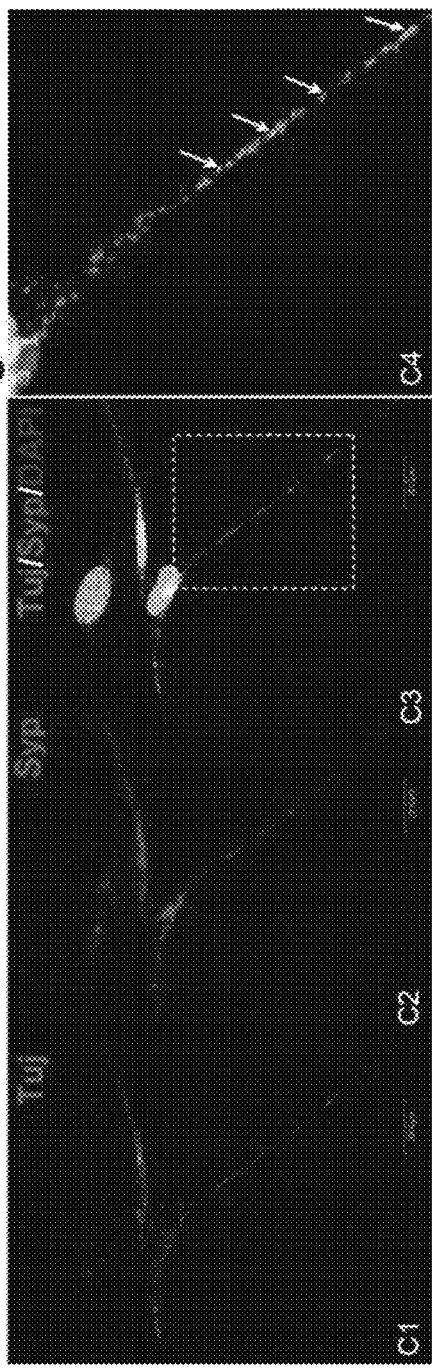
Figure 4A:
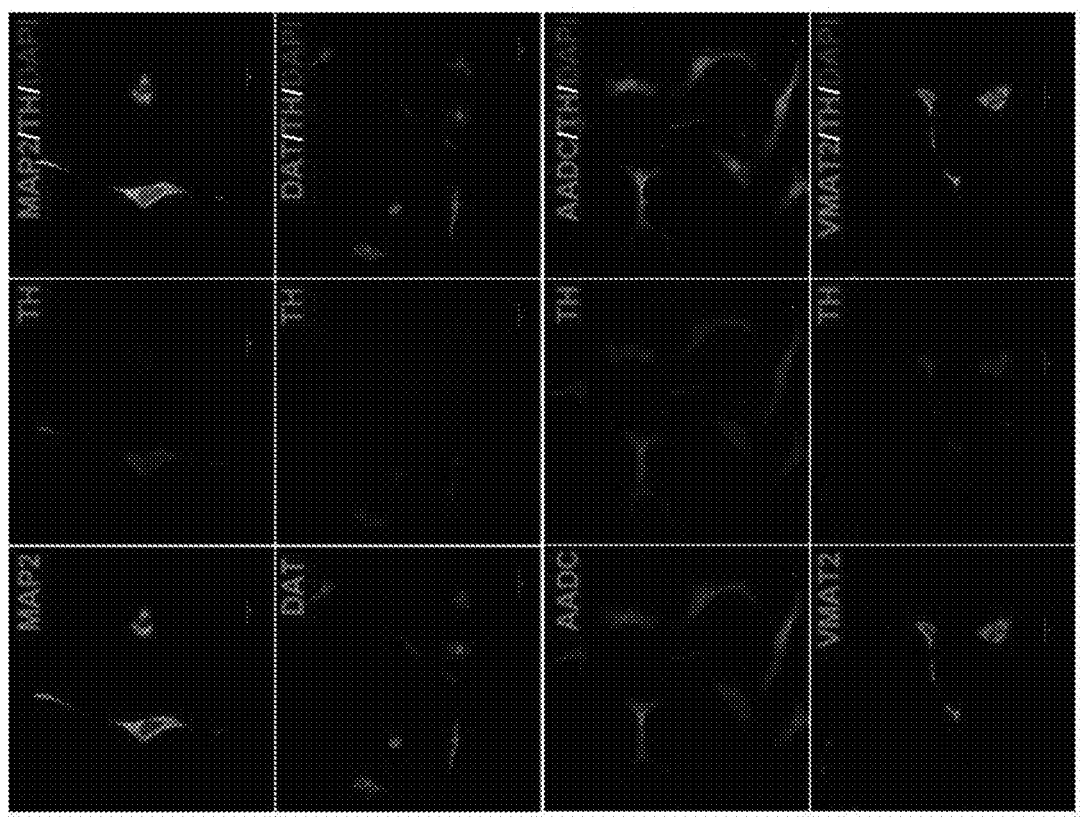
Figure 4E:
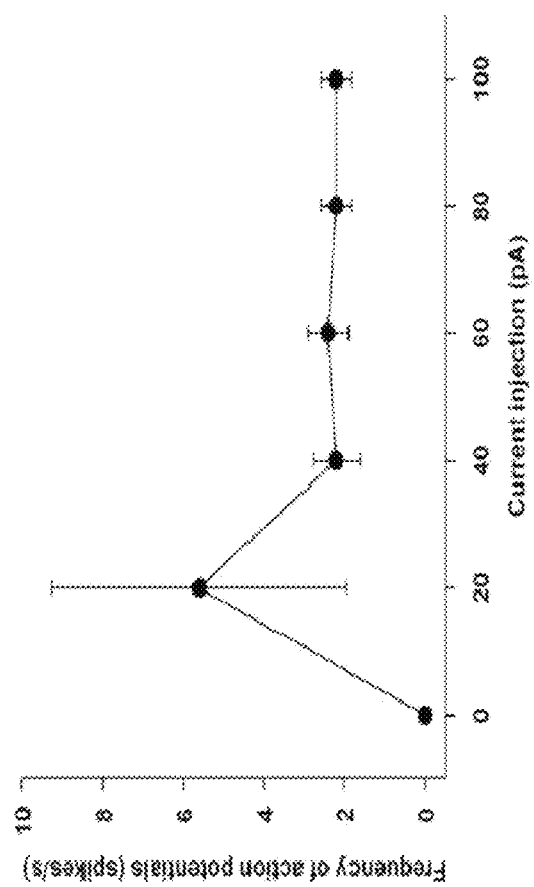
Figure 4F:
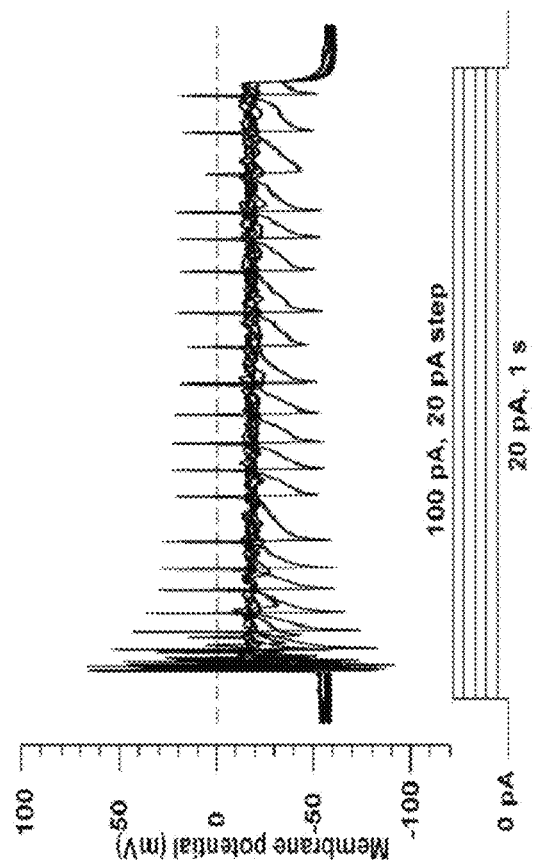

Next, the differentiation efficiency of iDPs into dopaminergic neurons was tested. A previously described neuronal differentiation protocol[14] was adopted in the test and it was found that more than 90% of the Tuj+ neurons were TH+ dopaminergic neurons (FIG. 3A). Surprisingly, the efficiency for the iDPs to differentiate into dopaminergic neurons remained high in the absence of the pre-patterning morphogens SHH and FGF8 (FIG. 3B), strongly suggesting the dopaminergic neural fate of iDPs. The iDP-derived neurons also expressed synaptophysin involved in neurotransmitter exocytosis and neuroendocrine'. The synaptophysin staining appeared positive in cells of typical neuronal morphology. In contrast, an adjacent cell of different morphology appeared negative for synaptophysin, suggesting a specific staining for synaptophysin (FIG. 3C, panels C1-C3). Furthermore, the synaptophysin had punctate distribution (FIG. 3C, panel C4), indicative of the synaptic formation in vitro. Notably, the iDP-derived DA neurons also exhibited immunoreactivities for aromatic L-amino acid decarboxylase (AADC), the dopamine transporter (DAT) and the brain-specific isoform of the vesicular monoamine transporter (VMAT2) (FIG. 4A), which are three major functionally relevant proteins in dopaminergic neurons. Importantly, the DA neurons derived from iDPs exhibited functional membrane properties of mature neuron. In voltage clamp mode, voltage-gated K+ currents and Na+ currents can be evoked from a holding potential of −80 mV to test potentials range from −70 mV to +70 mV in 10-mV steps (FIG. 4B, FIG. 4C and FIG. 4D). In current clamp mode, action potentials can be evoked in all iDPs tested by injection currents from 20 pA to 100 pA in 20-pA steps (FIG. 4E and FIG. 4F, n=5). Those results strongly suggest that iDPs can effectively differentiate and generate mature and functional DA neurons.

Conditional Expression of L-Myc Induced Self-Renewal of iDPs

Figure 5A:
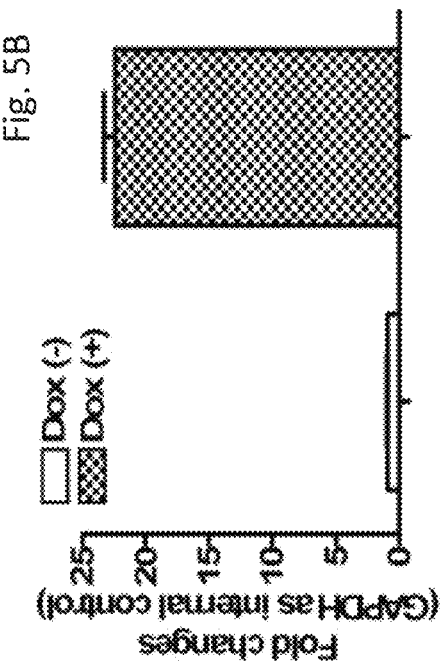
FIG. 5A-FIG. 5D. Proliferation and self-renewal of iDPs were enhanced by conditional expression of L-Myc Schematic diagram of Tet-On/Off advanced system for L-Myc overexpression in iDPs (FIG. 5A). Dox-regulated expression of myc (isoform L-myc) in iDPs by real-time RT-PCR analysis with primers specific for L-myc (see Table 2), and GAPDH-specific primer pairs were used for internal control (FIG. 5B). Immunofluorescence staining for Ki67 (red) of cells grown in Dox (+) or Dox (−) media for 72 h, and nuclei were stained with DAPI (blue) (FIG. 5C, left panel). Results are shown as the percentage of Ki67$^+$ cells of total cells (FIG. 5C, right panel). ##denotes p<0.001 compared to cells cultured with Dox (−) medium for 72 h. iDPs cultured with Dox (+) or Dox (−) media, respectively, were subjected to immunostaining with Corin and DCX (red) antibodies, and nuclear staining with DAPI (blue) (FIG. 5D). (Scale bars: 20 μm)
Figure 5B:
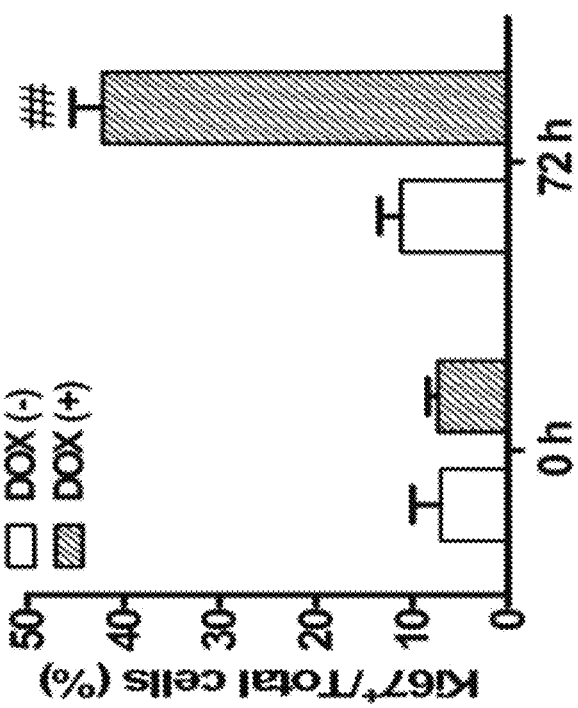
Figure 5C:
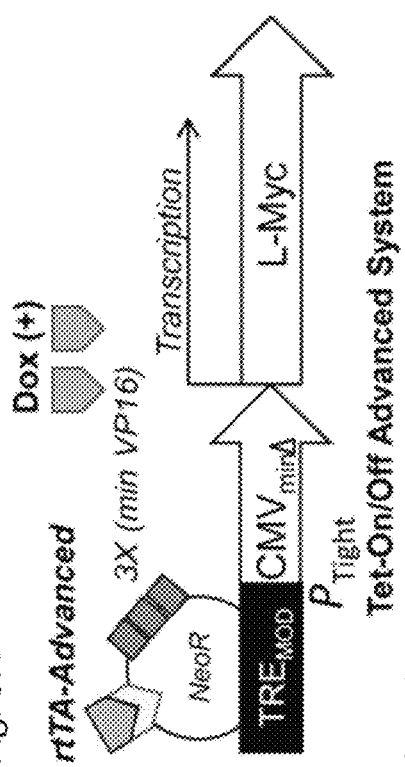
Figure 5D:
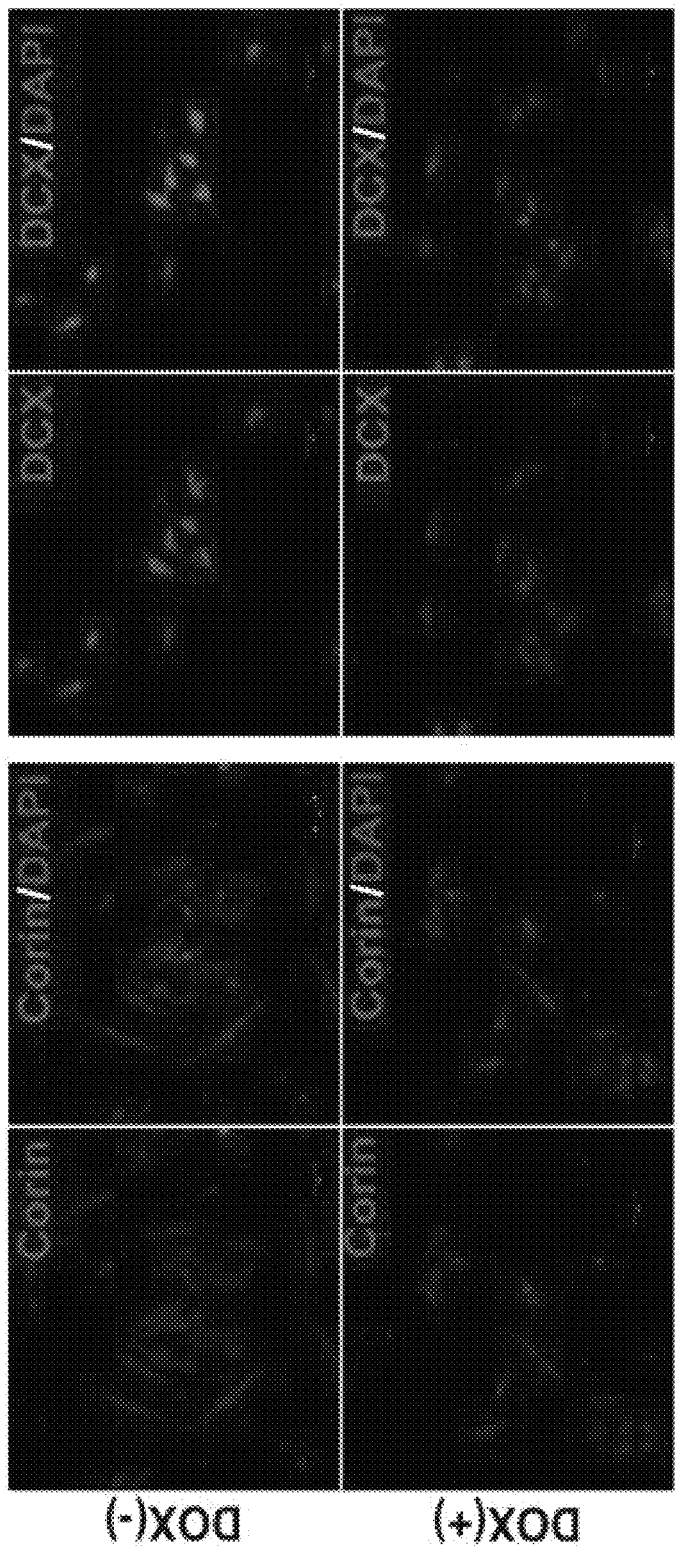

During the generation of iDPs, we observed that iDPs exhibited limited ability of self-renewal and clonogenicity, restricting cell expansion required for cell transplantation. We overcame this disadvantage by utilizing a Tet-On/Off system to transduce L-Myc, which is a transformation-deficient, safe and efficient approach that enhances self-renewal[33,34] in iDPs. The conditional expression of L-Myc was under the control of doxycycline (Dox) (FIG. 5A and FIG. 5B). The proportion of Ki67 positive cells significantly increased after DOX treatment for 72 hours (FIG. 5C), whereas the expression levels of DP marker genes Corin and DCX were not affected by the DOX treatment. These results confirmed that using L-Myc to induce self-renewal in iDPs is a safe, effective and efficient strategy for cell expansion intended for cell transplantation.

Figure 6A:
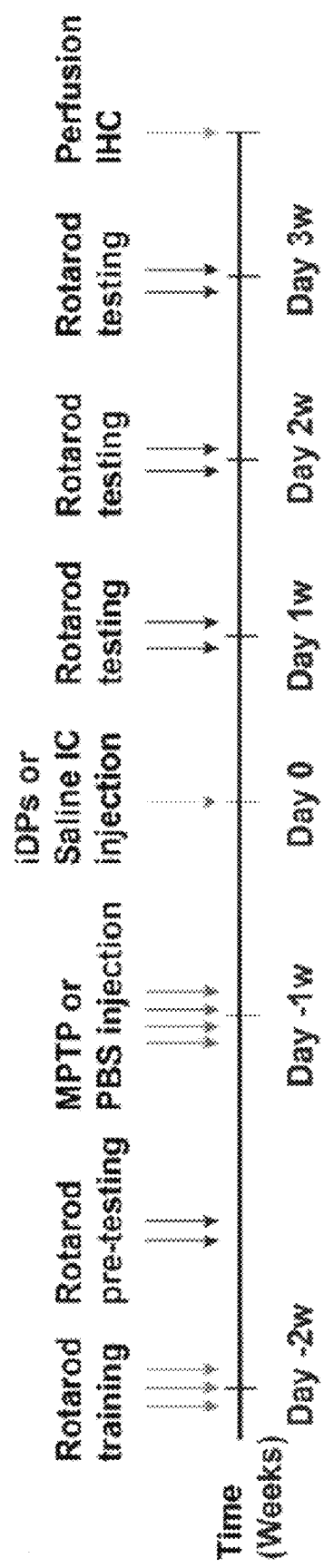
FIG. 6A-FIG. 6C. Grafted iDPs survive, differentiate into dopaminergic lineage and partially reverse MPTP striatal pathology
Figure 6B:
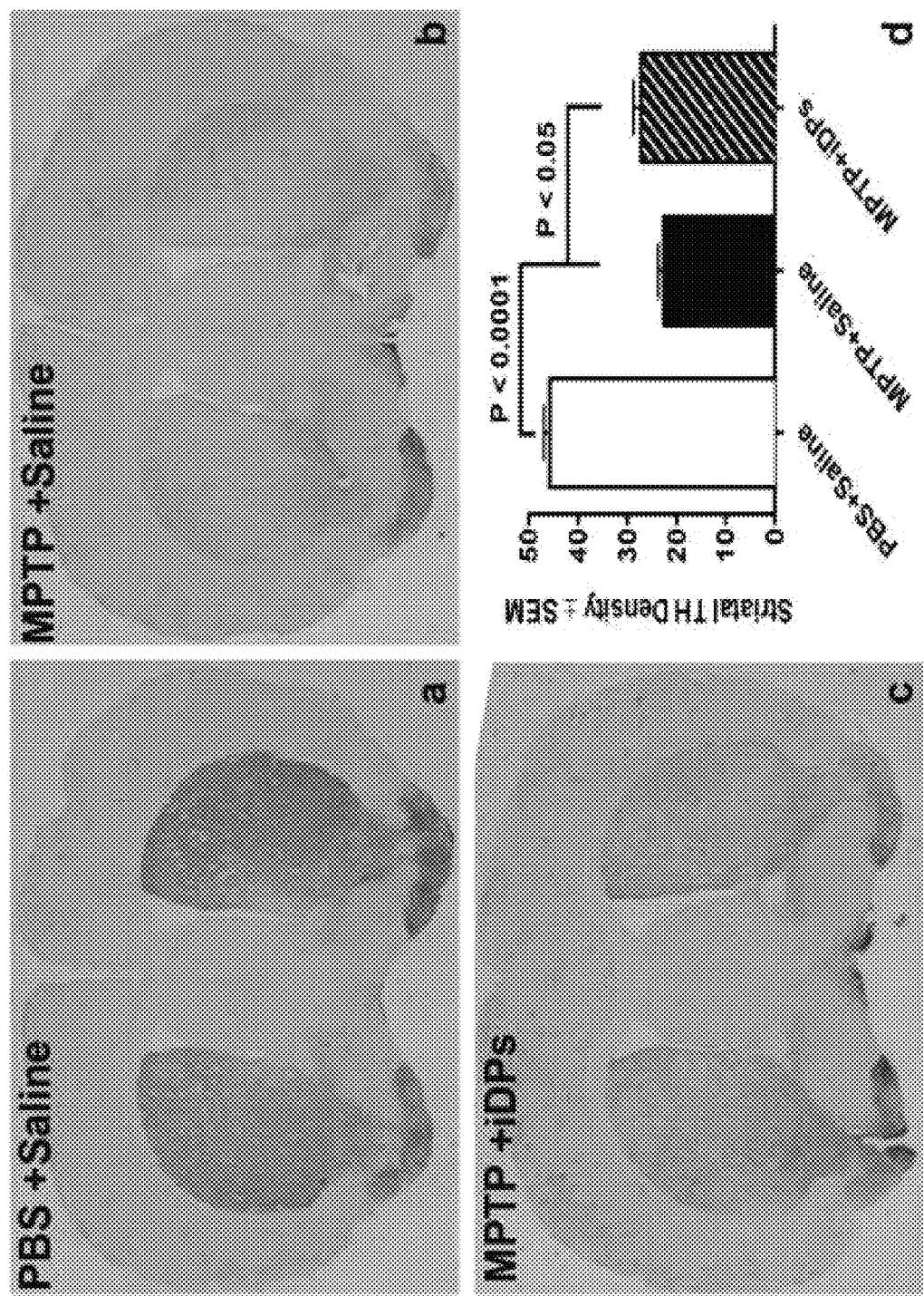
Figure 6C:
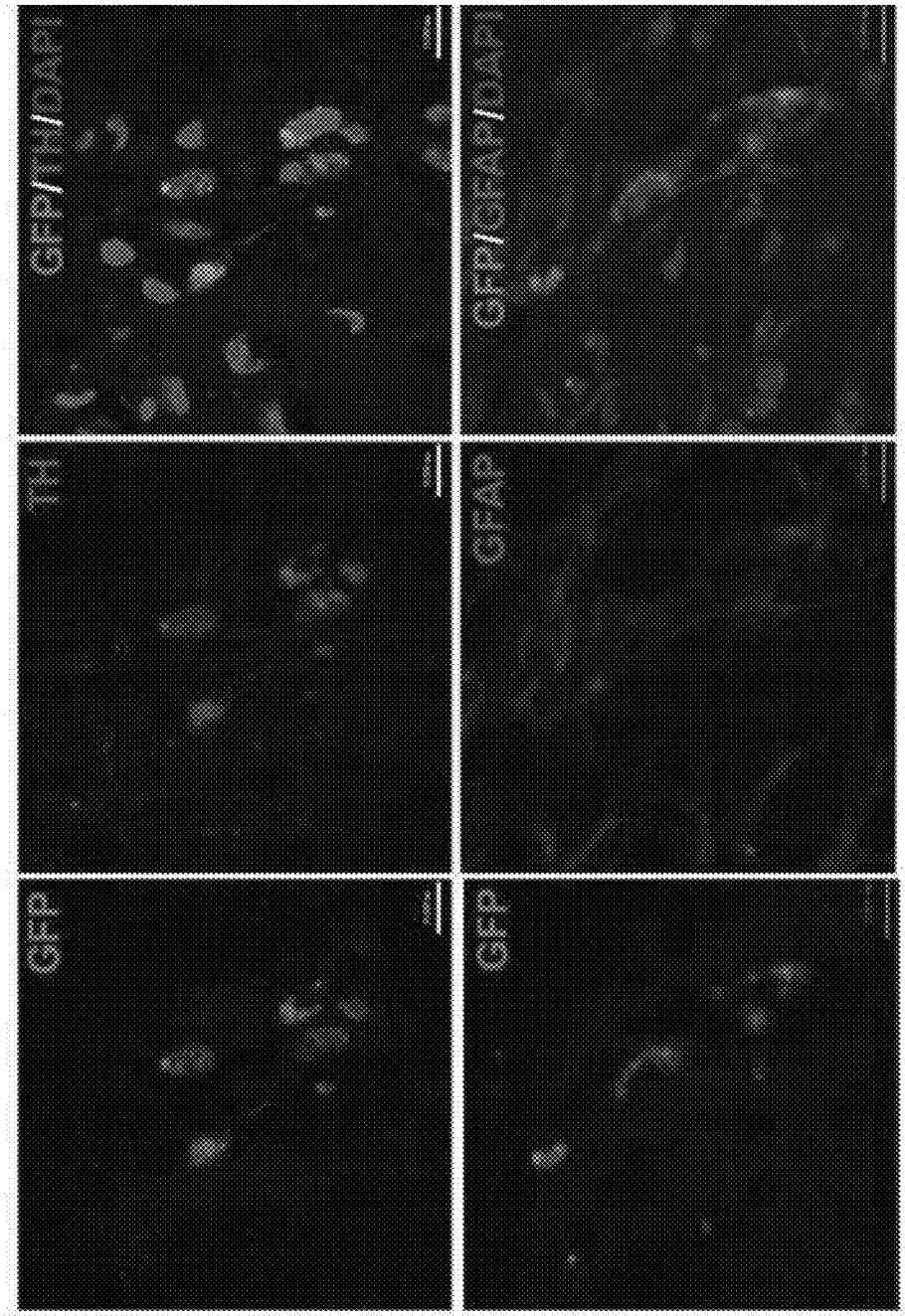

Grafted iDPs Survived, Differentiated into Dopaminergic Lineage and Functionally Alleviated Motor Deficits in a MPTP Mouse Model of PD We tested whether the iDPs with conditional L-Myc expression will be safe, and can survive, terminally differentiate into specific dopaminergic neurons in vivo. First, we labeled iDPs with lentiviral vector expressing green fluorescent protein (GFP), and further enriched GFP cells by the puromycin resistance in vector (FIG. 11A). GFP iDPs were then injected into the striatum of a SCID mouse brain as illustrated in FIG. 11B. At 6 weeks following transplantation, we observed that the grafted GFP iDP-derived cells were distributed predominantly around the injection site (FIG. 11C), and the iDP-grafted mice showed no tumor formation at the injection site (FIG. 11D). These results suggest that engineered iDPs are safe for cell transplantation. To evaluate the functionalities of iDPs in vivo, we used a MPTP mouse model of PD as we previously described[35], and performed cell transplantation in PD mouse model as experimental timeline illustrated in FIG. 6A. The mice were trained with rotarod and two trials were performed before MPTP intoxication to establish baseline performance. At one week after MPTP intoxication, iDPs were engrafted on both side of striatum through intracranial (IC) injection. The mice were monitored for 3 weeks for motor functions and then sacrificed for immunohistochemistry. The densities of TH$^+$ DA neuron axonal termini in the striatum were determined by digital image analysis as previously described[36]. The MPTP treatment significantly decreased the densities of TW striatal termini, suggesting substantial loss of DA neuronal termini in striatum (FIG. 6B). Densitometric analysis of TH$^+$ striatal termini by week 3 showed 50% loss of TW striatal termini. However, engraftment of MPTP mice with iDPs increased striatal termini densities by 20% (40% total loss, FIG. 6B). Interestingly, a majority of the iDP-derived cells were Tuj and TH double positive, but not GFAP positive cells (FIG. 6C), suggesting that the grafted cells survived in vivo for three weeks, and were preferentially differentiated into DA neurons but not astrocytes. Next, we evaluated the effect of iDPs engraftment on motor function of the MPTP mice. All mice group had similar baseline locomotor performance during pre-MPTP testing (FIG. 7A). Rotarod testing of MPTP mice by week 2 showed 55% reduction of locomotor functions. Engraftment of MPTP mice with iDPs increased rotarod performance (FIG. 7B, FIG. 7C). By week 3 (4 weeks after MPTP intoxication), the MPTP mice showed 24% motor deficits compared with PBS group. The iDPs engraftment group had beneficial locomotor effects but not significant recovery of motor deficits (P=0.059, FIG. 7C). Together, these data suggest that iDPs engraftment after the development of MPTP lesion increase motor function in mice.

Human iDP Upon Ectopic Expression of Brn2, Sox2 and Foxa2

Brn2, Sox2 and Foxa2 in fibroblast cells obtained from a PD patient and a 105d fetus were then ectopically expressed and transdifferentiated into iDPs according to the same protocol as mouse cells. The transdifferentiated cells also showed iDP phenotypes such as Corin and DCX expression and colocalization (FIG. 12A-FIG. 12B). Significantly, this suggested that autologous iDPs can be prepared from patients of Parkinson's disease (PD), and then be used in in vitro study and/or cell replacement therapy in vivo.

DISCUSSION

Stem cell-based therapy holds a promising future for the treatment of neurodegenerative disorders, particularly in the case of PD. To achieve cell-based therapy for PD, significant efforts have been made to differentiate human embryonic stem cells (ESCs) and induced pluripotent stem cells (iPSCs) to midbrain DA neurons following morphogenic stimulation[37-40]. Recently, direct conversion of cells of one lineage into another has served as an alternative strategy for engraftable cell sources. As a result, induced DA neurons[7,41] and induced neural stem/progenitor cells (iNPCs)[10-13] were generated and showed promise for DA neuron generation. However, the differentiation efficiency, safety, and the specificity of these cells remain a challenge. In the present study, we reported a novel cocktail of three transcription factors (Brn2/Brn4, Sox2 and Foxa2/Lmx1a) that successfully converted mouse skin fibroblasts into neural progenitors. The resulting iDPs were dopaminergic neuronal-restricted and independent of the pre-patterning by SHH/FGF8 (FIG. 1A-FIG. 3C). Most importantly, DA neurons derived from iDPs expressed the mature DA neuron markers in vitro, exhibited electrophysiological properties of mature DA neurons (FIG. 4A-FIG. 4F), and survived in vivo for 6 weeks without tumor formation (FIG. 11A-FIG. 11D), suggesting the iDPs can serve as a safe and efficient cell source for PD treatment.

Previous studies have employed Brn2/Brn4 and Sox2 as neural fate determinants for direct reprogramming of neural progenitor cells from fibroblasts[10,13,17,19], but additional factors may be required to achieve the regional specification and neuronal-lineage restriction[10,19]. Foxa2 and Lmx1a appear to be critical factors that support the regulatory networks required for midbrain DA specification and the transcriptional control of midbrain dopaminergic development. To selectively generate the dopaminergic precursors, we decided to express Foxa2 and Lmx1a in 5F-iNPCs previously developed by our laboratory. The expression of Foxa2 and Lmx1a endowed 5F-iNPCs with midbrain identity and dramatically increased the yield of TH$^+$ neurons (FIG. 8A-FIG. 8E, FIG. 9A-FIG. 9B), suggesting that these two factors could be used to improve the iNPCs-based cell therapy in PD.

Foxa2 and Lmx1a/b are known to cooperatively regulate the proliferation, specification, and differentiation of midbrain dopaminergic progenitors. More specifically, Foxa2 and Lmx1a/b are key transcription factors downstream of strong morphogens (SHH and Wnt1, respectively) that synergistically control the midbrain dopaminergic differentiation by forming two regulatory loops[23,42]. Previous studies on Foxa1/2 predominantly concentrated on the specification of midbrain progenitor identity and their regulatory roles on Lmx1a/b and Helt[26,43-45]. Foxa2 expression is restricted to the mesencephalic floor plate where it plays both SHH-dependent and -independent roles in the specification of floor plate from which DA neurons originate[25,46]. However, it is unclear whether Foxa2 may be a more potent determinant of midbrain DA progenitors than Lmx1a and SHH, or whether Foxa2 could serve as a reprogramming factor favoring the generation of DA neurons. In contrast, given the synergistic control by Foxa2 and Lmx1a/b of the midbrain dopaminergic differentiation, it is unlikely that either is sufficient by itself.

In this study, we have tested novel sets of transcription factors that included Brn2 and Sox2 with one or both of Foxa2 and Lmx1a in the reprogramming of fibroblasts as illustrated in the procedure (FIG. 1A). We observed that all combinations resulted in the clonogenicity at 14 day post-infection (data not shown). Thus, either the combination of Brn2, Sox2 and Foxa2, or the combination of Brn2, Sox2 and Lmx1a can be used to transdifferentiate fibroblasts.

Furthermore, the combination of Brn2, Sox2 and Foxa2 successfully converted fibroblasts into stable and expansible iDPs. The iDPs expressed the specific neural progenitor markers, and also exhibited the midbrain identity characterized by the marker genes for dopaminergic neural progenitor cells, such as Aldh1A1, Corin (Lrp4), Lmx1a, Msx1, Ngn2, Otx2, Mash1, Pitx3 and Nkx6.1 (FIG. 1A-FIG. 1E). Among these markers, Aldh1A1 and Corin have been used to specifically mark DPs in the brain and isolate DPs from ES cell-derivatives[28,47]. In addition, DCX and PSA-NCAM have been used to isolate the neuronal lineage-restricted progenitors[24,30,31]. Otx2 prevents the serotonin fate of the progenitors by repressing Nkx2.2[48], and Foxa2 negatively regulates Helt to inhibit the GABAergic neuron differentiation in the ventral midbrain[43-45]. Because the reprogramming factors Brn2 and Sox2 could not generate DA-specified iNPCs, our results suggest that Foxa2 can work cooperatively with Brn2 and Sox2 to drive the direct conversion of fibroblasts into iNPCs with midbrain progenitor identity.

It should be noted that given Brn2 and Brn4 have previously been used interchangeably in several transdifferentiation studies, here a Brn4, Sox2 and Foxa2 combination (or Brn4, Sox2 and Lmx1a; or Brn2, Brn4, Sox2 and Foxa2; or Brn2, Brn4, Sox2 and Lmx1a; or Brn2, Brn4, Sox2, Foxa2 and Lmx1a) can also be used to transdifferentiate fibroblasts.

Our present study demonstrates that ectopic expression of Foxa2 positively regulates Lmx1a, Otx2 and other key transcription factors responsible for DA neuron development, and negatively regulates transcription factors related to glial cell development (FIG. 2A-FIG. 2D). Thus, the resulting iDPs are committed to the dopaminergic lineage with minimum glial cells differentiation potential (FIG. 2A-FIG. 2D). Terminal differentiation in the presence of BDNF, GDNF and AA could steer the iDPs into mature and functional DA neurons independent of SHH/FGF8 stimulation (FIG. 3A-FIG. 3C and FIG. 4A-FIG. 4F). This role of Foxa2 is consistent with a previous report that shows Foxa2 can execute the midbrain floor plate program via SHH-independent and -dependent mechanisms[46].

In vivo grafted NSCs/NPCs often terminally differentiate into astrocytes rather than functional neurons in response to injury[5,16]. Our strategy in engineering iDPs with controllable L-Myc expression (FIG. 5A-FIG. 5D) is a confirmation of the way to efficiently, safely and practically control the self-renewal of iDPs[33,34]. When the iDPs were transplanted into the striatum of MPTP PD mouse model following the timeline illustrated in FIG. 6A, we observed that MPTP injection damaged TH$^+$ neurons in the striatum, whereas grafted iDPs significantly recovered the striatal TH density after cell transplantation, and very few of them terminally differentiated into astrocytes. Indeed, the majority of cells differentiated into DA neurons at 6 weeks post-transplantation, and no tumor or cell outgrowths were observed, and the partially recovery of motor function in PD mouse model after cell transplantation further suggest that the iDPs may serve as a useful cell source for PD treatment.

Collectively, we demonstrated that Brn2/Brn4, Sox2 and Foxa2/Lmx1a could successfully convert mouse skin fibroblasts into induced neural progenitors, and Foxa2/Lmx1a confers the induced neural progenitors with the specification of midbrain identity and DA lineage. The success of this work could also provide an important foundation for a cellular model to investigate the pathogenesis of PD when patient skin fibroblasts are reprogrammed into iDPs with Brn2/Brn4, Sox2 and Foxa2/Lmx1a in vitro. Finally, the managed expansion of the engineered iDPs further provides a promising therapeutic cell source for PD.

Methods

Cell Preparation, Retroviral Packaging, Infection and Direct Reprogramming

Mouse skin fibroblasts were isolated from adult Nestin-EGFP transgenic mice (kindly provided by Richard J Miller from Northwestern University, Chicago, IL) aged 5.5-7.0 weeks as previously described[13], with approval of the University of Nebraska Medical Center Institutional Animal Care and Use Committee and following National Institutes of Health (NIH) ethical guidelines. Fibroblasts were cultured in Dulbecco's modified Eagle's medium supplemented with 10% FBS, 1×Non-Essential Amino Acid, 100 U/mL penicillin, 100 μg/mL streptomycin at 37° C. in a 5% $CO_2$ humidified atmosphere. Fibroblasts were used within passage 2-5 to avoid replicative senescence. Mouse Brn2 ORF (EcoRI+Not I), Foxa2 ORF (BamHI+Xho I) were cloned into pMXs-retroviral vectors (Cellbiolabs, RTV-010), and pMXs-Sox2 was purchased from Addgene (Plasmid #13367). Retroviruses (pMXs) were generated with Plat-E packaging cells as previously described[49]. In brief, Plat-E cells were seeded at $3.6 \times 10^6$ cells per 100-mm dish. 24 hours after seeding, 15 μg DNA of pMXs-based retroviral vectors encoding Sox2, Brn2 and Foxa2 were introduced into Plat-E cells using 15 μL of Lipofectamine™ LTX transfection reagent (Invitrogen). The medium was replaced with 5 mL of DMEM containing 5% FBS 24 hours after transfection. Fibroblasts from Nestin-EGFP transgenic mice were seeded at $2 \times 10^5$ cells per 35-mm dish. At 48-hour and 72-hour post-transfection, virus-containing supernatants from these Plat-E cultures were recovered and filtered through a 0.45-μm cellulose acetate filter. Equal volumes of the supernatants were mixed and supplemented with 10 μg/mL polybrene. Cells were incubated in virus/polybrene-containing supernatants overnight. The medium was changed 3 days after infection to NeuroCult® NSC Basal (Stem Cell Technologies, Inc., Vancouver, BC V5Z 1B3, Canada) Medium supplemented with NeuroCult® NSC Proliferation Supplements (Stem Cell Technologies, Inc.), 20 ng/mL basic fibroblast growth factor (bFGF, BioWalkersville), and 20 ng/mL epidermal growth factor (EGF, BioWalkersville). After 9-14 days, the predicted iDP colonies were monitored by fluorescence microscope.

Quantitative Real-Time RT-PCR

Total mRNA was isolated with TRIzol Reagent (Invitrogen) and RNeasy Mini Kit (QIAGEN Inc., Valencia, CA) using the manufacturer's recommendations. The reverse transcription was performed using Transcription 1$^{st}$ Strand cDNA Synthesis Kit (Roche, USA). The RT-PCR analyses for the detection of neural stem cell-specific mRNAs were performed using SYBR® Select Master Mix (Life Technologies, Los Angeles, CA) with 0.5 μL of cDNA, corresponding to 1 μL of total RNA in a 15 μL final volume, 1.5 μL $H_2O$, 7.5 μL SYBR Green, 5.5 μL oligonucleotide primer pairs (synthesized at Fisher) at 1 mM (See Table 2). PCR program: 1. 50° C. for 2 min, 2. 95° C. for 2 min; 3. 95° C. for 15 sec, 4. specific annealing temperature for 15 sec, 5. 72° C. for 1 min. Steps 2-4 were repeated 40 times. All samples were amplified in triplicate and the mean was used for further analysis.

Immunocytochemistry

The cultured cells were fixed in 4% formaldehyde for 20 min at room temperature and then washed with PBS for three times. The fixed cells were permeabilized with 0.2%

Triton X-100 in PBS for 10 min, and blocked with 2% BSA in PBS for 1 hour at room temperature. Cells were incubated with primary antibodies as listed in Table 2 overnight, and then washed with PBS for three times and incubated for 2 hours at room temperature with secondary antibodies (See Table 3). Fluorescent images were obtained using a Zeiss 710 Confocal Laser Scanning Microscope (Carl Zeiss, Oberkochen, Germany).

Differentiation

For astrocyte differentiation, the iDP culture medium was replaced by DMEM/F-12 with 10% FBS, and cultured for 7 days, with the medium changed every other day. For oligodendrocyte differentiation, iDPs were cultivated in DMEM/F12 with 1×N2, 10 ng/mL PDGF (R&D Systems, Minneapolis, MN), 10 ng/mL FGF-2 and 10 µM forskolin (Sigma-Aldrich, Saint Louis, MO) for 4 days. Afterwards, PDGF and forskolin were replaced by 30 ng/mL 3, 3, 5-triiodothyronine (T3) hormone and 200 mM ascorbic acid (all from Sigma-Aldrich, Saint Louis, MO) for another 7 days. For neuronal differentiation, SHH/FGF8 independent protocol: iDPs were plated on poly-L-Ornithine/laminin-coated coverslips in 24-well plate with DMEM/F12 supplemented with 1×N2, 1×B27, 1.0 mM Glutamax, 0.11 mM β-mercaptoethanol, 1.0 mM dibutyrylcAMP (Sigma), 0.2 mM ascorbic acid (Sigma), 10 ng/mL brain-derived neurotrophic factor (BDNF) (Peprotech), and 10 ng/mL glial cell line-derived neurotrophic factor (GDNF) (Peprotech) for 4 weeks. The medium was changed every 3-4 days. Unless otherwise indicated, all reagents were purchased from Invitrogen (Carlsbad, CA, USA); SHH/FGF8 dependent protocol: Cells were plated on poly-L-Ornithine/laminin-coated coverslips in 24-well plate with DMEM/F12 containing with 1×N2, 10 ng/mL bFGF (Peprotech), 100 ng/mL SHH (Peprotech), 100 ng/mL FGF8 (Peprotech) for 6 days, and then switched to DMEM/F12 containing 1×N2, 1×B27, 1.0 mM Glutamax, 0.11 mM β-mercaptoethanol, 1.0 mM dibutyrylcAMP (Sigma), 0.2 mM ascorbic acid (Sigma), 10 ng/mL brain-derived neurotrophic factor (BDNF) (Peprotech), and 10 ng/mL glial cell line-derived neurotrophic factor (GDNF) (Peprotech) for another 4 weeks, and the medium was changed every 3-4 days.

Retroviral Infection, Isolation, and Expansion of iDPs

L-Myc was cloned into the Tet-All retroviral-vector, which contained both reverse tetracycline-controlled transactivator (rtTA) and tetracycline response element (TRE) promoter. The original backbones for the Tet-All vector were pRetroX-Tight and pRetro-rtAT-Advanced from Clontech Laboratories (Mountain View, CA, USA). The retrovirus encoding L-Myc was packaged in Plat-E cells, and iDPs were infected with the virus and screened with neomycin (neo).

Recording of Action Potentials and Total Currents

Action potentials and total currents were recorded by the whole cell patch-clamp technique using Axonpatch 200B patch-clamp amplifier (Axon Instruments, Sunnyvale, CA). pClamp 10.2 program was used for data acquisition. The patch-pipette solution was composed of (in mM): 105 K-aspartate, 20 KCl, 1 $CaCl_2$, 5 MgATP, 10 HEPES, 10 EGTA, and 25 Glucose (pH 7.2; 320 mOsm/L). The bath solution consisted of (in mM): 140 NaCl, 5.4 KCl, 0.5 $MgCl_2$, 2.5 $CaCl_2$, 5.5 HEPES, 11 Glucose, and 10 Sucrose (pH 7.4; 330 mOsm/L). The same pipette and bath solutions were used for action potentials and total currents measurement. Resistance of the patch pipette was 3-5 MΩ. Series resistance of 6-13 MΩ was electronically compensated 80-90%. Action potentials were elicited by a series of 1-s depolarizing currents injection from 20 pA to 100 pA with 20-pA increments. Total currents were evoked from a holding potential of −80 mV by stepping to voltages between −70 and +70 mV in 10 mV increment for 500 ms. Recorded traces were sampled at 10 kHz and filtered at 5 kHz. All experiments were done at room temperature.

MPTP Intoxication and iDPs Engraftment

Adult male 8-week-old C57BL/6J mice were purchased from Jackson Laboratories (Bar Harbor, ME) and housed on a 12:12 hour light/dark cycle with ad libitum access to food and water in the animal facilities at the University of Nebraska Medical Center. All animal procedures were conducted according to protocols approved by the Institutional Animal Care and Use Committee at the University of Nebraska Medical Center. Mice were randomly assigned to treatment groups before motor function and behavior training (FIG. 6A). MPTP intoxication was performed as previously described[35]. Briefly, mice received four subcutaneous injections, one every 2 hours of either vehicle (phosphate buffered saline (PBS) at 10 ml/kg) or MPTP-HCL (20 mg/kg, free base in PBS; Sigma-Aldrich Co, St. Louis, MO, USA). MPTP handling and safety measures were in accordance with the published guidelines'. For iDPs engraftment, at 7 days after MPTP intoxication, mice were anesthetized with Ketamine (120 mg/kg) and xylazine (16 mg/kg) by i.p, placed in a stereotaxic apparatus (Stoelting, Wood Dale, IL, www.stoeltingco.com) for IC injection (FIG. 6A). A linear skin incision was made over the bregma, and two 1-mm burr holes were drilled in the skull 0.2 mm posterior and 3.5 mm lateral to the bregma using a hand-held driller. iDPs (0.25 million per injection) were labeled with GFP expressing retrovirus and injected into the striatum of both hemispheres. Saline was used as a control for iDPs injection. Coordinates for inoculation were set as: 0.22 mm posterior to bregma, 3.25 mm lateral from the Sagittal midline, and a depth of 2.9 mm in vertical line. A Hamilton 10-µl syringe (Fisher) was used for cell injection. Mice were sacrificed 21 days post-injection after intracardiac perfusion and brains were quickly removed. Immunohistochemistry for $TH^+$ nerve terminals and quantification were performed in a blinded fashion as previously described[35,51].

Motor Function and Behavior Tests

Rotarod test was used to evaluate the recovery of MPTP-induced motor deficits by the engrafted iDPs. The apparatus was fitted with a 7-cm diameter rod and was interfaced with automatic timing instrumentation (Rotamex, Columbus Instruments, Inc., Columbus, OH, USA). Mice were habituated and trained to perform on the accelerating rotarod at 2-12 rpm for 5 min for four daily sessions in three consecutive days prior to the administration of MPTP. Twice before MPTP-intoxication, all mice were evaluated at 10 rpm for a maximum of 90 s per trial to obtain a pre-treatment baseline performance. After iDPs engraftment, mice were re-evaluated on the rotarod twice a week for 3 weeks. Weekly post-treatment rotarod performance was calculated as average of two trials and as a ratio relative to animal group's baseline performance. Scores from MPTP mice with or without iDPs engraftment were normalized to the mean performance of the PBS control group[35,51].

Statistical Analysis

Data were expressed as means±SD and statistically evaluated by analysis of variance (ANOVA) followed by the Tukey's test for paired observations unless specified. Significance was considered as a p value of <0.05. All assays were performed at least twice, with triplicate samples in each experiment.

Cell Labeling, Transplantation and Histology iDPs with controllable L-Myc (Tet-On/Off advanced system) were transduced by lentiviruses packaged by pLenti-CMV-GFP-Puro with psPAX2 and pMD2. G (Addgene) in 293T cells using Lipofectamine® LTX Reagent with PLUS™ Reagent (Invitrogen™). Titers of lentiviral preparations were determined using 293T cells and ranged between $10^7$-$10^8$ IFU/ml. iDPs were expanded in NeuroCult® NSC basal medium supplemented with NeuroCult® NSC Proliferation supplements (Stem Cell Technologies, Inc.), 20 ng/mL bFGF (BioWalkersville), and 20 ng/mL EGF (BioWalkersville) and screened by adding Dox (4 µg/ml) and G418 (400 ng/ml). Four-week-old male C.B.-17 SCID mice were purchased from the Charles River Laboratory. All mice were housed in the animal facilities at the University of Nebraska Medical Center. All procedures were conducted according to protocols approved by the Institutional Animal Care and Use Committee (IACUC) of the University of Nebraska Medical Center. Briefly, mice were anesthetized with Ketamine (120 mg/kg) and xylazine (16 mg/kg) by i.p, placed in a stereotaxic apparatus (Stoetling, Wood Dale, IL) for intracranial injection in the left cerebral hemisphere. GFP-expressing iDPs ($0.5\times10^6$/5 µL) were injected with a 10-µl syringe into the striatum of mouse brain. Coordinates for inoculation were set as: 0.5-0.8 mm posterior to bregma, 3.5 mm lateral form the sagittal midline, a depth and angle of 3.6 mm and 35° from the vertical line. Mice were anesthetized and perfused with 4% paraformaldehyde (PFA) 6 weeks after injection, and brains were immediately removed and then placed in 4% PFA for postfixation overnight. After dehydration in 30% sucrose solution, brains were frozen and cut on a cryostat (30 µm), and sections were then scanned using a Leica Confocal Microscope and Metamorph analysis software (Molecular Devices). In addition, fixed brains were embedded in paraffin, and sections were stained with hematoxylin and eosin (H&E), and images were acquired and analyzed by Ventana's Coreo Au Slider Scanner.

TABLE 3

$1^{st}$ and $2^{nd}$ antibodies used for immunofluorescence

| | Isotype | Dilution | Source |
|---|---|---|---|
| $1^{st}$ Antibody | | | |
| GFAP | Rabbit Ig G | 1:1,000 | DAKO |
| MAP2 | Mouse Ig G | 1:1,000 | Sigma |
| MAP2 | Rabbit Ig G | 1:1,000 | Millipore |
| Nestin (10C2) | Mouse Ig G | 1:1,000 | ThermoFisher |
| O4 | Mouse Ig G | 1:1,000 | R&D Systems |
| Synaptophysin | Rabbit Ig G | 1:1,000 | abcam |
| Msx GFP | Mouse Ig G | 1:800 | Millipore |
| Anti-Tyrosine Hydroxylase (TH) | Sheep Ig G | 1:2,000 | Jackson ImmunoResearch |
| Anti-Tyrosine Hydroxylase (TH) | Rabbit Ig G | 1:1,000 | Calbiochem® |
| βIII-Tubulin | Mouse Ig G | 1:1,500 | Sigma |
| βIII-Tubulin | Rabbit Ig G | 1:1,500 | Sigma |
| DOPA Decarboxylase | Rabbit Ig G | 1:500 | abcam |
| DAT | Rabbit Ig G | 1:1,000 | Biocompare |
| VMAT2 (9E11) | Mouse Ig G1 | 1:100 | NOVUS Biologicals |
| Ki67 | Rabbit Ig G | 1:1,000 | abcam |
| Corin (Lrp4) | Rabbit Ig G | 1:1,000 | R&D Systems |
| Doublecortin (DCX) | Goat Ig G | 1:1,000 | Santa Cruz Biotechnology |
| PSA-NCAM | Rabbit Ig G | 1:1,000 | Millipore |

TABLE 3-continued $1^{st}$ and $2^{nd}$ antibodies used for immunofluorescence

| | Isotype | Dilution | Source |
|---|---|---|---|
| $2^{nd}$ Antibodies | | | |
| Alexa Fluor® 488 | Goat anti-Rabbit Ig G | 1:1,000 | Molecular Probes |
| | Goat anti-Mouse Ig G | 1:1,000 | Molecular Probes |
| | Rabbit anti-Goat Ig G | 1:1,000 | Molecular Probes |
| | Rabbit anti-Mouse Ig | 1:1,000 | Molecular Probes |
| | Donkey anti-goat Ig G | 1:1,000 | Molecular Probes |
| | Donkey anti-Sheep Ig G | 1:1,000 | Jackson ImmunoResearch |
| Alexa Fluor® 594 | Goat anti-Rabbit Ig G | 1:1,000 | Molecular Probes |
| | Donkey anti-goat Ig G | 1:1,000 | Molecular Probes |
| | Donkey anti-Rabbit Ig G | 1:1,000 | Molecular Probes |
| | Donkey anti-Sheep Ig G | 1:1,000 | Jackson ImmunoResearch |
| Alexa Fluor® 568 | Goat anti-Mouse Ig G | 1:1,000 | Molecular Probes |
| Alexa Fluor® 647 | Donkey anti-Rabbit Ig G | 1:1,000 | Molecular Probes |

REFERENCES

1 Dauer, W. & Przedborski, S. Parkinson's disease: mechanisms and models. *Neuron* 39, 889-909 (2003).

2 Lindvall, O. & Kokaia, Z. Stem cells in human neurodegenerative disorders—time for clinical translation? *J Clin Invest* 120, 29-40 (2010).

3 Takahashi, K. & Yamanaka, S. Induction of pluripotent stem cells from mouse embryonic and adult fibroblast cultures by defined factors. *Cell* 126, 663-676 (2006).

4 Yu, J. et al. Induced pluripotent stem cell lines derived from human somatic cells. *Science* 318, 1917-1920 (2007).

5 Vierbuchen, T. et al. Direct conversion of fibroblasts to functional neurons by defined factors. *Nature* 463, 1035-1041 (2010).

6 Ambasudhan, R. et al. Direct reprogramming of adult human fibroblasts to functional neurons under defined conditions. *Cell Stem Cell* 9, 113-118 (2011).

7 Caiazzo, M. et al. Direct generation of functional dopaminergic neurons from mouse and human fibroblasts. *Nature* 476, 224-227 (2011).

8 Kim, J. et al. Functional integration of dopaminergic neurons directly converted from mouse fibroblasts. *Cell Stem Cell* 9, 413-419 (2011).

9 Liu, X. et al. Direct reprogramming of human fibroblasts into dopaminergic neuron-like cells. *Cell Res* 22, 321-332 (2012).

10 Lujan, E., Chanda, S., Ahlenius, H., Sudhof, T. C. & Wernig, M. Direct conversion of mouse fibroblasts to self-renewing, tripotent neural precursor cells. *Proc Natl Acad Sci USA* 109, 2527-2532 (2012).

11 Ring, K. L. et al. Direct reprogramming of mouse and human fibroblasts into multipotent neural stem cells with a single factor. *Cell Stem Cell* 11, 100-109 (2012).

12 Thier, M. et al. Direct conversion of fibroblasts into stably expandable neural stem cells. *Cell Stem Cell* 10, 473-479 (2012).

13 Tian, C. et al. Direct conversion of dermal fibroblasts into neural progenitor cells by a novel cocktail of defined factors. *Curr Mol Med* 12, 126-137 (2012).

14 Li, W. et al. Rapid induction and long-term self-renewal of primitive neural precursors from human embryonic stem cells by small molecule inhibitors. *Proc Natl Acad Sci USA* 108, 8299-8304 (2011).

15 Holmin, S., Almqvist, P., Lendahl, U. & Mathiesen, T. Adult nestin-expressing subependymal cells differentiate to astrocytes in response to brain injury. *Eur J Neurosci* 9, 65-75 (1997).

16 Johansson, C. B. et al. Identification of a neural stem cell in the adult mammalian central nervous system. *Cell* 96, 25-34 (1999).

17 Han, D. W. et al. Direct reprogramming of fibroblasts into neural stem cells by defined factors. *Cell Stem Cell* 10, 465-472 (2012).

18 Lai, S. et al. Direct reprogramming of induced neural progenitors: a new promising strategy for AD treatment. *Transl Neurodegener* 4, 7 (2015).

19 Zou, Q. et al. Direct conversion of human fibroblasts into neuronal restricted progenitors. *J Biol Chem* 289, 5250-5260 (2014).

20 Ang, S. L. Transcriptional control of midbrain dopaminergic neuron development. *Development* 133, 3499-3506 (2006).

21 Ferri, A. L. et al. Foxa1 and Foxa2 regulate multiple phases of midbrain dopaminergic neuron development in a dosage-dependent manner. *Development* 134, 2761-2769 (2007).

22 Xi, J. et al. Specification of midbrain dopamine neurons from primate pluripotent stem cells. *Stem Cells* 30, 1655-1663 (2012).

23 Chung, S. et al. Wnt1-lmx1a forms a novel autoregulatory loop and controls midbrain dopaminergic differentiation synergistically with the SHH-FoxA2 pathway. *Cell Stem Cell* 5, 646-658 (2009).

24 Ono, Y. et al. Differences in neurogenic potential in floor plate cells along an anteroposterior location: midbrain dopaminergic neurons originate from mesencephalic floor plate cells. *Development* 134, 3213-3225 (2007).

25 Nakatani, T., Kumai, M., Mizuhara, E., Minaki, Y. & Ono, Y. Lmx1a and Lmx1b cooperate with Foxa2 to coordinate the specification of dopaminergic neurons and control of floor plate cell differentiation in the developing mesencephalon. *Dev Biol* 339, 101-113 (2010).

26 Lin, W. et al. Foxa1 and Foxa2 function both upstream of and cooperatively with Lmx1a and Lmx1b in a feedforward loop promoting mesodiencephalic dopaminergic neuron development. *Dev Biol* 333, 386-396 (2009).

27 Prakash, N. et al. Nkx6-1 controls the identity and fate of red nucleus and oculomotor neurons in the mouse midbrain. *Development* 136, 2545-2555 (2009).

28 Chung, S. et al. ES cell-derived renewable and functional midbrain dopaminergic progenitors. *Proc Natl Acad Sci USA* 108, 9703-9708 (2011).

29 Gaspard, N. et al. An intrinsic mechanism of corticogenesis from embryonic stem cells. *Nature* 455, 351-357 (2008).

30 Mo, Z. et al. Human cortical neurons originate from radial glia and neuron-restricted progenitors. *J Neurosci* 27, 4132-4145 (2007).

31 Friling, S. et al. Efficient production of mesencephalic dopamine neurons by Lmx1a expression in embryonic stem cells. *Proc Natl Acad Sci USA* 106, 7613-7618 (2009).

32 Cassiman, D. et al. Synaptophysin: A novel marker for human and rat hepatic stellate cells. *Am J Pathol* 155, 1831-1839 (1999).

33 Nakagawa, M., Takizawa, N., Narita, M., Ichisaka, T. & Yamanaka, S. Promotion of direct reprogramming by transformation-deficient Myc. *Proc Natl Acad Sci USA* 107, 14152-14157 (2010).

34 Kim, K. S. et al. Self-renewal induced efficiently, safely, and effective therapeutically with one regulatable gene in a human somatic progenitor cell. *Proc Natl Acad Sci USA* 108, 4876-4881 (2011).

35 Hutter-Saunders, J. A., Gendelman, H. E. & Mosley, R. L. Murine motor and behavior functional evaluations for acute 1-methyl-4-phenyl-1,2,3,6-tetrahydropyridine (MPTP) intoxication. *J Neuroimmune Pharmacol* 7, 279-288 (2012).

36 Benner, E. J. et al. Therapeutic immunization protects dopaminergic neurons in a mouse model of Parkinson's disease. *Proc Natl Acad Sci USA* 101, 9435-9440 (2004).

37 Lee, S. H., Lumelsky, N., Studer, L., Auerbach, J. M. & McKay, R. D. Efficient generation of midbrain and hindbrain neurons from mouse embryonic stem cells. *Nat Biotechnol* 18, 675-679 (2000).

38 Perrier, A. L. et al. Derivation of midbrain dopamine neurons from human embryonic stem cells. *Proc Natl Acad Sci USA* 101, 12543-12548 (2004).

39 Roy, N. S. et al. Functional engraftment of human ES cell-derived dopaminergic neurons enriched by coculture with telomerase-immortalized midbrain astrocytes. *Nat Med* 12, 1259-1268 (2006).

40 Hargus, G. et al. Differentiated Parkinson patient-derived induced pluripotent stem cells grow in the adult rodent brain and reduce motor asymmetry in Parkinsonian rats. *Proc Natl Acad Sci USA* 107, 15921-15926 (2010).

41 Pfisterer, U. et al. Direct conversion of human fibroblasts to dopaminergic neurons. *Proc Natl Acad Sci USA* 108, 10343-10348 (2011).

42 Yan, C. H., Levesque, M., Claxton, S., Johnson, R. L. & Ang, S. L. Lmx1a and lmx1b function cooperatively to regulate proliferation, specification, and differentiation of midbrain dopaminergic progenitors. *J Neurosci* 31, 12413-12425 (2011).

43 Miyoshi, G., Bessho, Y., Yamada, S. & Kageyama, R. Identification of a novel basic helix-loop-helix gene, Heslike, and its role in GABAergic neurogenesis. *J Neurosci* 24, 3672-3682 (2004).

44 Guimera, J., Weisenhorn, D. V. & Wurst, W. Megane/Heslike is required for normal GABAergic differentiation in the mouse superior colliculus. *Development* 133, 3847-3857 (2006).

45 Nakatani, T., Minaki, Y., Kumai, M. & Ono, Y. Helt determines GABAergic over glutamatergic neuronal fate by repressing Ngn genes in the developing mesencephalon. *Development* 134, 2783-2793 (2007).

46 Bayly, R. D., Brown, C. Y. & Agarwala, S. A novel role for FOXA2 and SHH in organizing midbrain signaling centers. *Dev Biol* 369, 32-42 (2012).

47 Wallen, A. et al. Fate of mesencephalic AHD2-expressing dopamine progenitor cells in NURR1 mutant mice. *Exp Cell Res* 253, 737-746 (1999).

48 Prakash, N. et al. A Wnt1-regulated genetic network controls the identity and fate of midbrain-dopaminergic progenitors in vivo. *Development* 133, 89-98 (2006).

49 Morita, S., Kojima, T. & Kitamura, T. Plat-E: an efficient and stable system for transient packaging of retroviruses. *Gene Ther* 7, 1063-1066 (2000).

50 Jackson-Lewis, V. & Przedborski, S. Protocol for the MPTP mouse model of Parkinson's disease. *Nat Protoc* 2, 141-151 (2007).

51 Hutter-Saunders, J. A. et al. BL-1023 improves behavior and neuronal survival in 1-methyl-4-phenyl-1,2,3,6-tetrahydropyridine-intoxicated mice. *Neuroscience* 180, 293-304 (2011).

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

INCORPORATION BY REFERENCE

All publications, patents and patent applications referenced in this specification are incorporated herein by reference in their entirety for all purposes to the same extent as if each individual publication, patent or patent application were specifically indicated to be so incorporated by reference.

What is claimed is:

1. A method of transdifferentiating a somatic cell to an induced dopaminergic precursor cell (iDP) in vitro, comprising steps of:
   (a) introducing into the somatic cell one or more expression vectors carrying genes of (1) one or both of Brn2 and Brn4, or a variant thereof, (2) Sox2, or a variant thereof, and (3) one or both of Foxa2 and Lmx1a, or a variant thereof, and
   (b) culturing the somatic cell under a condition to express the genes in the somatic cell, wherein the iDP expresses, relative to the somatic cell, high levels of neural progenitor markers Sox1, PAX6, ZBTB16, Sox3, CD133 and Nestin, high levels of ventral mesencephalon markers Aldh1A1, Corin (Lrp4), Lmx1a, Msx1, Ngn2, Otx2, Mash1, Pitx3 and Nkx6.1 and minimum levels of telencephalon related markers FoxG1, GSX2, and Nkx2.1, and the iDP is a dopaminergic neuronal lineage-restricted progenitor possessing dopaminergic neuronal-restricted differentiation potential.

2. The method of claim 1, wherein the expression vectors carry the genes of Brn2 or a variant thereof, Sox2 or a variant thereof, and Foxa2 or a variant thereof.

3. The method of claim 1, wherein the somatic cell is a fibroblast.

4. The method of claim 3, wherein the somatic cell is present in vitro.

5. The method of claim 1, wherein the somatic cell is from a patient in need of cell or tissue replacement therapy with iDP.

6. The method of claim 5, wherein the patient has Parkinson's disease, depression, dementia, or schizophrenia.

7. A method of identifying an agent that regulates dopaminergic neuron development, comprising subjecting a population of the iDPs produced according to claim 1 to a test agent, wherein a change in differentiation of the iDPs to dopaminergic neuron is indicative of a regulatory role of the test agent in dopaminergic neuron development.

8. The method of claim 7, wherein the change is one or more of: cell growth, cell survival, or gene expression change in one or more of tyrosine hydroxylase (TH), Sox1, PAX6, ZBTB16, Sox3, CD133, Nestin, Aldh1A1, Corin (Lrp4), Lmx1a, Msx1, Ngn2, Otx2, Mash1, Pitx3 and Nkx6.1, ploysialic acid-neural cell adhesion molecule (PSA-NCAM), and/or doublecortin (DCX).

9. The method of claim 7, wherein the iDPs are transdifferentiated from a patient's somatic cells, wherein the patient has Parkinson's disease, depression, dementia or schizophrenia, and wherein the method identifies agents for the treatment of Parkinson's disease, depression, dementia or schizophrenia.

* * * * *